US009120083B2

(12) United States Patent
Wyndham et al.

(10) Patent No.: US 9,120,083 B2
(45) Date of Patent: Sep. 1, 2015

(54) POROUS INORGANIC/ORGANIC HYBRID PARTICLES HAVING HIGH ORGANIC CONTENT AND ENHANCED PORE GEOMETRY FOR CHROMATOGRAPHIC SEPARATIONS

(75) Inventors: Kevin D. Wyndham, Douglas, MA (US); John E. O'Gara, Ashland, MA (US); Nicole L. Lawrence, Stafford Springs, CT (US)

(73) Assignee: Waters Technologies Corporation, Milford, MA (US)

( * ) Notice: Subject to any disclaimer, the term of this patent is extended or adjusted under 35 U.S.C. 154(b) by 1648 days.

(21) Appl. No.: 12/516,964

(22) PCT Filed: Feb. 21, 2008

(86) PCT No.: PCT/US2008/002312
§ 371 (c)(1),
(2), (4) Date: Jan. 22, 2010

(87) PCT Pub. No.: WO2008/103423
PCT Pub. Date: Aug. 28, 2008

(65) Prior Publication Data
US 2012/0141789 A1 Jun. 7, 2012

Related U.S. Application Data

(60) Provisional application No. 60/902,655, filed on Feb. 21, 2007.

(51) Int. Cl.
*B32B 5/16* (2006.01)
*B32B 33/00* (2006.01)
(Continued)

(52) U.S. Cl.
CPC .............. *B01J 20/283* (2013.01); *B01J 20/103* (2013.01); *B01J 20/28004* (2013.01);
(Continued)

(58) Field of Classification Search
USPC ..................................... 428/403–407; 96/290
See application file for complete search history.

(56) References Cited

U.S. PATENT DOCUMENTS 5,403,908 A 4/1995 Watanabe et al.
2002/0070168 A1* 6/2002 Jiang et al. .................... 210/656
(Continued)

OTHER PUBLICATIONS

WO-PCT/IB/326—International Preliminary Report on Patentability issued for PCT/US2008/002312, Aug. 26, 2009, Waters Investments Limited.
(Continued)

*Primary Examiner* — Holly Le
(74) *Attorney, Agent, or Firm* — Locke Lord LLP; Nicholas J. DiCeglie, Jr.

(57) ABSTRACT

Novel particles and materials for chromatographic separations, processes for preparation and separations devices containing the chromatographic particles and materials are provided by the instant invention. In particular, the invention provides a porous inorganic/organic hybrid particle, wherein the inorganic portion of the hybrid particle is present in an amount ranging from about 0 molar % to not more than about 49 molar %, wherein the pores of the particle are substantially disordered. The invention also provides a porous inorganic/organic hybrid particle, wherein the inorganic portion of the hybrid particle is present in an amount ranging from about 25 molar % to not more than about 50 molar %, wherein the pores of the particle are substantially disordered and wherein the particle has a chromatographically enhancing pore geometry (CEPG). Methods for producing the hybrid particles, separations devices comprising the hybrid particles and kits are also provided.

42 Claims, 5 Drawing Sheets

(51) Int. Cl.
  *B01J 20/283* (2006.01)
  *B01J 20/28* (2006.01)
  *B01J 20/30* (2006.01)
  *B01J 20/32* (2006.01)
  *B01J 20/284* (2006.01)
  *B01J 20/10* (2006.01)

(52) U.S. Cl.
  CPC ......... *B01J 20/284* (2013.01); *B01J 20/28019* (2013.01); *B01J 20/28042* (2013.01); *B01J 20/28057* (2013.01); *B01J 20/28069* (2013.01); *B01J 20/28078* (2013.01); *B01J 20/3064* (2013.01); *B01J 20/3085* (2013.01); *B01J 20/3092* (2013.01); *B01J 20/3206* (2013.01); *B01J 20/3219* (2013.01); *B01J 20/3225* (2013.01); *B01J 20/3259* (2013.01); *B01J 20/3268* (2013.01); *B01J 2220/82* (2013.01); *Y10T 428/2982* (2015.01)

(56) References Cited

U.S. PATENT DOCUMENTS

| | | |
|---|---|---|
| 2004/0048067 A1 | 3/2004 | O'Gara |
| 2005/0230298 A1 | 10/2005 | Jiang et al. |
| 2006/0194919 A1 | 8/2006 | Lichtenhan et al. |

OTHER PUBLICATIONS

International Search Report (PCT/ISA/210) Issued in PCT/US2008/02312, Aug. 28, 2008, Waters Investements Limited.

\* cited by examiner

POROUS INORGANIC/ORGANIC HYBRID PARTICLES HAVING HIGH ORGANIC CONTENT AND ENHANCED PORE GEOMETRY FOR CHROMATOGRAPHIC SEPARATIONS

This application is the U.S. national phase, pursuant to 35 U.S.C. §371, of PCT international application Ser. No. PCT/US2008/002312, filed Feb. 21, 2008, designating the United States and published in English on Aug. 28, 2008 as publication no. WO 2008/103423 A1, which claims priority to U.S. provisional application Ser. No. 60/902,655, Feb. 21, 2007. The entire contents of the aforementioned patent applications are incorporated herein by this reference.

BACKGROUND OF THE INVENTION

Packing materials for liquid chromatography (LC) are generally classified into two types: organic materials, e.g., polydivinylbenzene and inorganic materials typified by silica. Many organic materials are chemically stable against strongly alkaline and strongly acidic mobile phases, allowing flexibility in the choice of mobile phase pH. However, organic chromatographic materials generally result in columns with low efficiency, leading to inadequate separation performance, particularly with low molecular-weight analytes. Furthermore, many organic chromatographic materials shrink and swell when the composition of the mobile phase is changed. In addition, most organic chromatographic materials do not have the mechanical strength of typical chromatographic silicas.

Due in large part to these limitations, silica ($SiO_2$) is the material most widely used in High Performance Liquid Chromatography (HPLC). The most common applications employ silica that has been surface-derivatized with an organic functional group such as octadecyl ($C_{18}$), octyl ($C_8$), phenyl, amino, cyano, etc. As stationary phases for HPLC, these packing materials result in columns that have high efficiency and do not show evidence of shrinking or swelling.

Silica is characterized by the presence of silanol groups on its surface. During a typical derivatization process such as reaction with octadecyldimethylchlorosilane, at least 50% of the surface silanol groups remain unreacted. These residual silanol groups interact with basic and acidic analytes via ion exchange, hydrogen bonding and dipole/dipole mechanisms. The residual silanol groups create problems including increased retention, excessive peak tailing and irreversible adsorption of some analytes. Another drawback with silica-based columns is their limited hydrolytic stability. First, the incomplete derivatization of the silica leaves patches of bare silica surface which can be readily dissolved under alkaline conditions, generally pH>8.0, leading to the subsequent collapse of the chromatographic bed. Secondly, the bonded phase can be stripped off the surface under acidic conditions, generally pH<2.0, and eluted off the column by the mobile phase, causing loss of analyte retention and an increase in the concentration of surface silanol groups.

To overcome the problems of residual silanol group activity and hydrolytic instability of silica-based stationary phases, many methods have been tried including use of ultra-pure silica, carbonized silica, coating of the silica surface with polymeric materials, endcapping free silanol groups with a short-chain reagent such as trimethylsilane and the addition of suppressors such as amines to the eluent. These approaches have not proven to be completely satisfactory in practice.

Other approaches have focused on "hybrid" silica. Hybrid materials are disclosed in, e.g., U.S. Pat. Nos. 4,017,528, 6,528,167, 6,686,035 and 7,175,913. One approach is disclosed in U.S. Pat. No. 4,017,528 (K. Unger, et al.). A process for preparing a "hybrid" silica is described wherein an alkyl functionality is coupled into both the skeleton structure and the surface of the silica. According to the '528 patent, the hybrid silica can be prepared by two methods. In the first method, a mixture of tetraethoxysilane (TEOS) and an organotriethoxysilane, e.g., alkyltriethoxysilane, is co-hydrolyzed in the presence of an acid catalyst to form a liquid material containing polyorganoethoxysiloxane (POS) oligomers, e.g., polyalkylethoxysiloxane oligomers. Then, the POS is suspended in an aqueous medium and gelled into porous particles in the presence of a base catalyst. In the second method, the material is prepared by a similar procedure except that the suspension droplet is a mixture of organotriethoxysilane, e.g., alkyltriethoxysilane and polyethoxysiloxane (PES) oligomers; the latter is prepared by partial hydrolysis of TEOS.

There are several problems associated with the '528 hybrid material. First, these hybrid materials contain numerous micropores, i.e., pores having a diameter below about 34 Å. It is known that such micropores inhibit solute mass transfer, resulting in poor peak shape and band broadening.

Second, the pore structure of the '528 hybrid material is formed because of the presence of ethanol (a side product of the gelation process) within the suspension oil droplets. The pore volume is controlled by the molecular weight of the POS or PES. The lower the molecular weight of the POS or PES, the more ethanol is generated during the gelation reaction and subsequently a larger pore volume is produced. However, part partition. If the amount of the ethanol generated within the suspension droplets is too great, the partition of the ethanol will cause the structure of the droplets to collapse, forming irregularly-shaped particles as opposed to spherical particles. Therefore, the strategy to control the pore volume of the hybrid material described in the '528 patent has certain limitations, particularly for preparing highly spherical hybrid materials with a pore volume greater than about 0.8 $cm^3/g$. It is well known in the art that irregularly-shaped materials are generally more difficult to pack than spherical materials. It is also known that columns packed with irregularly-shaped materials generally exhibit poorer packed bed stability than spherical materials of the same size.

Thirdly, the '528 hybrid materials are characterized by an inhomogeneous particle morphology, which contributes to undesirable chromatographic properties, including poor mass transfer properties for solute molecules. This is a consequence of the gelation mechanism, where the base catalyst reacts rapidly near the surface of the POS droplet, forming a "skinned" layer having very small pores. Further gelation in the interior of the droplet is then limited by the diffusion of catalyst through this outer layer towards the droplet center, leading to particles having skeletal morphologies and hence pore geometries, e.g., "shell shaped", which can vary as a function of location between the particle center and outer layer.

U.S. Pat. No. 6,248,686 (Inagaki, et al.) describes porous organic/inorganic materials that act as useful molecular sieves and adsorbents in catalyst materials. The materials of the '686 patent have a pore volume wherein 60% or more of the total pore volume in the porous material has a pore diameter in a range of +/−40% of the pore diameter revealing the maximum peak in a pore size distribution curve or at least one peak is present at a diffraction angle that preferably corresponds to a d value of at least 1 nm in an x-ray diffraction pattern.

The '686 patent indicates that the porous organic/inorganic materials described therein have a structure in which the pores are regularly arranged at an interval of at least 1 nm and have a uniform pore diameter. The methods used to calculate the regularly arranged pores include nitrogen gas adsorption and x-ray diffraction. However, the pore ordering that is characteristic of the materials described in the '686 patent results in disadvantages. For example, just as with the hybrid materials of the '528 patent, the diameter below about 34 Å. It is known that such micropores inhibit solute mass transfer, resulting in poor peak shape and band broadening.

A common attribute of hybrid particles is the incorporation of an inorganic component ($SiO_2$) from hydrolytic condensation reactions. The $SiO_2$ amount is typically greater than or equal to 50 mol % of the composition. Hybrid particles with $SiO_2$ content over 50% are utilized in a variety of applications, including a material for chromatographic separations and may suffer from various problems, including chemical stability problems due to acidic or basic conditions, increased swelling and increased porosity.

SUMMARY OF THE INVENTION

The present invention is based, at least in part, on the discovery that porous inorganic/organic hybrid particles having a higher organic content (less inorganic content, e.g., $SiO_2$) have advantageous chromatographic selectivities, hydrophilic/lipophilic balance (HLB) and surface charge as compared to known particles. Additionally, particles with higher organic content have increased chemical stability, which allows for chromatography to be performed under high concentrations of base. These particles also display increased mechanical stability, reduced swelling and reduced micropore surface area (MSA).

The present invention provides novel particles and chromatographic materials for chromatographic separations, processes for its preparation and separations devices containing the chromatographic material, wherein the inorganic silica is low in content and wherein the pores of such particles are substantially disordered. Porous inorganic/organic hybrid particles having substantially disordered pores have the advantages of a chromatographically enhancing pore geometry and large pore diameters, which make them more useful for a number of chromatographic processes, most notably HPLC.

Thus in one aspect, the invention provides a porous inorganic/organic hybrid particle, wherein the inorganic portion of the hybrid particle is present in an amount ranging from about 0 molar % to not more than about 25 molar %, wherein the pores of the particle are substantially disordered.

In another aspect, the invention provides a porous inorganic/organic hybrid particle, wherein the inorganic portion of the hybrid particle is present in an amount ranging from about 25 molar % to not more than about 50 molar %, wherein the pores of the particle are substantially disordered and wherein the particle has a chromatographically enhancing pore geometry (CEPG).

In a related aspect, the invention provides a porous inorganic/organic hybrid particle, comprising $SiO_2$ in an amount ranging from about 0 molar % to not more than about 25 molar %, wherein the pores of the particle are substantially disordered.

In another related aspect, the invention provides a porous inorganic/organic hybrid particle, comprising $SiO_2$ in an amount ranging from about 25 molar % to not more than about 50 molar %, wherein the pores of the particle are substantially disordered and wherein the particle has a chromatographically enhancing pore geometry (CEPG).

In another aspect, the invention provides a porous inorganic/organic hybrid material comprising porous inorganic/organic hybrid particles of the instant invention as described herein.

In another aspect, the invention provides a porous inorganic/organic hybrid material comprising a combination of the porous inorganic/organic hybrid particles of the instant invention as described herein.

The invention also provides methods for producing the porous inorganic/organic hybrid particles of the instant invention as described herein. Thus, in one aspect, the invention provides a method of producing a porous inorganic/organic hybrid particle, wherein the inorganic portion of the hybrid particle is present in an amount ranging from about 0 molar % to not more than about 25 molar %, wherein the pores of the particle are substantially disordered, as well as a method for producing a porous inorganic/organic hybrid particle, wherein the inorganic portion of the hybrid particle is present in an amount ranging from about 25 molar % to not more than about 50 molar %, wherein the pores of the particle are substantially disordered and wherein the particle has a chromatographically enhancing pore geometry (CEPG). The methods comprise the steps of:

a) hydrolytically condensing one or more monomers selected from the group consisting of organoalkoxysilanes and tetraalkoxysilanes, with one or more monomers selected from the group consisting of organoalkoxysilanes, tetraalkoxysilanes, metal oxide precursors and ceramic presursors, to produce a polyorganoalkoxysiloxane;

b) further condensing the polyorganoalkoxysiloxane to form a spherical porous particle; and c) subjecting the resulting particle to hydrothermal treatment.

In a related aspect, the invention provides a method for producing a porous inorganic/organic hybrid particle comprising $SiO_2$ in an amount ranging from about 0 molar % to not more than about 25 molar %, wherein the pores of the particle are substantially disordered, as well as a method for producing a porous inorganic/organic hybrid particle comprising $SiO_2$ in an amount ranging from about 25 molar % to not more than about 50 molar %, wherein the pores of the particle are substantially disordered and wherein the particle has a chromatographically enhancing pore geometry (CEPG).

In one aspect, the method comprises the steps of:

a) hydrolytically condensing one or more monomers selected from the group consisting of organoalkoxysilanes and tetraalkoxysilanes, to produce a polyorganoalkoxysiloxane;

b) further condensing the polyorganoalkoxysiloxane to form a spherical porous particle; and c) subjecting the resulting particle to hydrothermal treatment.

In another aspect, the method comprises the steps of:

(a) hydrolytically condensing an alkenyl-functionalized organosilane with a tetraalkoxysilane;

(b) copolymerizing the product of step (a) with an organic olefin monomer; and (c) further condensing the product of step (b) to form a spherical porous particle.

In a related aspect, the method comprises the steps of:

(a) copolymerizing an organic olefin monomer with an alkenyl-functionalized organosilane; and (b) hydrolytically condensing the product of step (a) with a tetraalkoxysilane in the presence of a non-optically active porogen; and (c) further condensing the product of step (b) to form a spherical porous particle.

The invention also provides the porous inorganic/organic hybrid particles of the instant invention as described herein, produced by any of the foregoing methods.

The invention also provides separations devices incorporation the porous inorganic/organic hybrid particles of the instant invention as described herein. Thus, in one aspect, the invention provides a separations device having a stationary phase comprising porous inorganic/organic hybrid particles as described herein.

In another aspect, the invention provides a chromatographic column having improved lifetime, comprising a) a column having a cylindrical interior for accepting a packing material, and b) a packed chromatographic bed comprising porous inorganic/organic hybrid particles as described herein.

In yet another aspect, the invention describes a separations device having a stationary phase comprising the porous inorganic/organic hybrid material, wherein the porous inorganic/organic hybrid material comprises porous inorganic/organic hybrid particles as described herein.

In another aspect, the invention provides a chromatographic column having improved lifetime, comprising a) a column having a cylindrical interior for accepting a packing material, and b) a packed chromatographic bed comprising the porous inorganic/organic hybrid material, wherein the porous inorganic/organic hybrid material comprises porous inorganic/organic hybrid particles as described herein.

The invention also provides for a kit comprising the porous inorganic/organic hybrid particles as described herein, or the porous inorganic/organic hybrid material comprising porous inorganic/organic hybrid particles as described herein, and instructions for use.

DETAILED DESCRIPTION OF THE INVENTION

Figure 1:
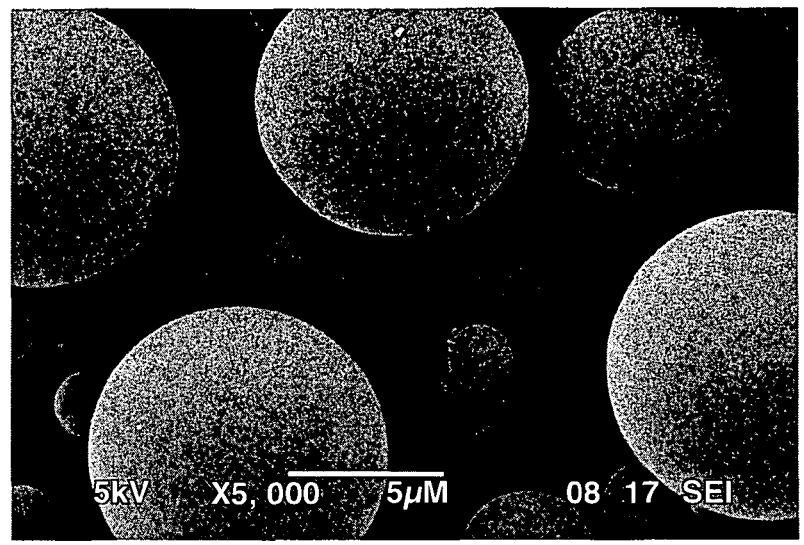
FIG. 1. SEM image of product 4g; Bar=5 μm.

The present invention will be more fully illustrated by reference to the definitions set forth below.

The term "chiral moiety" is intended to include any functionality that allows for chiral or stereoselective syntheses. Chiral moieties include, but are not limited to, substituent groups having at least one chiral center, natural and unnatural amino-acids, peptides and proteins, derivatized cellulose, macrocyclic antibiotics, cyclodextrins, crown ethers, and metal complexes.

The language "chromatographically-enhancing pore geometry" includes the geometry of the pore configuration of the presently-disclosed porous inorganic/organic hybrid particles, which has been found to enhance the chromatographic separation ability of the material, e.g., as distinguished from other chromatographic media in the art. For example, a geometry can be formed, selected or constructed, and various properties and/or factors can be used to determine whether the chromatographic separations ability of the material has been "enhanced", e.g., as compared to a geometry known or conventionally used in the art. Examples of these factors include high separation efficiency, longer column life and high mass transfer properties (as evidenced by, e.g., reduced band spreading and good peak shape.) These properties can be measured or observed using art-recognized techniques. For example, the chromatographically-enhancing pore geometry of the present porous inorganic/organic hybrid particles is distinguished from the prior art particles by the absence of "ink bottle" or "shell shaped" pore geometry or morphology, both of which are undesirable because they, e.g., reduce mass transfer rates, leading to lower efficiencies.

Chromatographically-enhancing pore geometry is found in hybrid particles containing only a small population of micropores. A small population of micropores is achieved in hybrid particles when all pores of a diameter of about <34 Å contribute less than about 110 m$^2$/g to the specific surface area of the particle. Hybrid materials with such a low micropore surface area (MSA) give chromatographic enhancements including high separation efficiency and good mass transfer properties (as evidenced by, e.g., reduced band spreading and good peak shape). Micropore surface area (MSA) is defined as the surface area in pores with diameters less than or equal to 34 Å, determined by mulitpoint nitrogen sorption analysis from the adsorption leg of the isotherm using the BJH method. As used herein, the acronyms "MSA" and "MPA" are used interchangeably to denote "micropore surface area".

The terms "as made" and "freshmade" are used interchangeably and refer to particles obtained after the gelation process but prior to hydrothermal treatment.

"Hybrid", i.e., as in "porous inorganic/organic hybrid particles" includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium oxides, or ceramic material; in a particular embodiment, the inorganic portion of the hybrid material is silica. The language "inorganic portion" may also be used herein to describe the siloxane groups of a organosiloxane. For example, in the formula $O_{1.5}SiCH_2CH_2SiO_{1.5}$, the inorganic portion of this formula are the two $SiO_{1.5}$ groups, while the organic portion is the $C_2H_4$ unit. As noted above, exemplary hybrid materials are shown in U.S. Pat. Nos. 4,017,528, 6,528,167, 6,686,035 and 7,175,913.

The term "monolith" is intended to include a collection of individual particles packed into a bed formation, in which the shape and morphology of the individual particles are maintained. The particles are advantageously packed using a material that binds the particles together. Any number of binding materials that are well known in the methacrylate, urethanes, alkenes, alkynes, amines, amides, isocyantes, or epoxy groups, as well as condensation reactions of organoalkoxysilanes, tetraalkoxysilanes, polyorganoalkoxysiloxes, polyethoxysiloxanes, and ceramic precursors.

The term "metal oxide precursor" is intended include any compound that contains a metal and results in the formation of a metal oxide, e.g., alumina, silica, titanium oxide, zirconium oxide, and cerium oxide.

The term "ceramic precursor" is intended include any compound that results in the formation of a ceramic material.

The term "substantially disordered" refers to a lack of pore ordering based on x-ray powder diffraction analysis. Specifically, "substantially disordered" is defined by the lack of a peak at a diffraction angle that corresponds to a d value (or d-spacing) of at least 1 nm in an x-ray diffraction pattern.

"Surface modifiers" include (typically) organic functional groups which impart a certain chromatographic functionality to a chromatographic stationary phase. The porous inorganic/organic hybrid particles possess both organic groups and silanol groups which may additionally be substituted or derivatized with a surface modifier.

The term "functionalizing group" includes organic functional groups which impart a certain chromatographic functionality to a chromatographic stationary phase.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl and the like. As used herein, the term "nitro" means-term "hydroxyl" means —OH. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alicyclic group" includes closed ring structures of three or more carbon atoms. Alicyclic groups include cycloparaffins or naphthenes which are saturated cyclic hydrocarbons, cycloolefins, which are unsaturated with two or more double bonds, and cycloacetylenes which have a triple bond. They do not include aromatic groups. Examples of cycloparaffins include cyclopropane, cyclohexane and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower —$CF_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "alkyl" includes saturated aliphatic groups, including straight-chain alkyl groups, branched-chain alkyl groups, cycloalkyl (alicyclic) groups, alkyl substituted cycloalkyl groups and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more preferably 18 or fewer. Likewise, particular cycloalkyls have from 4-10 carbon atoms in their ring structure and more preferably have 4-7 carbon atoms in the ring structure. The term "lower alkyl" refers to alkyl groups having from 1 to 6 carbons in the chain and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine and the like. Aryl groups also include polycyclic fused aromatic groups such as naphthyl, quinolyl, indolyl and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula —NR$_a$R$_b$, in which R$_a$ and R$_b$ are each independently hydrogen, alkyl, aryl, or heterocyclyl, or R$_a$ and R$_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of R$_a$ and R$_b$, is further substituted with an amino group.

Porous Inorganic/Organic Hybrid Particles and Materials

The present invention provides novel porous inorganic/organic hybrid particles particles of the invention are characterized by low inorganic content and pores that are substantially disordered. Porous inorganic/organic hybrid particles having substantially disordered pores have the advantages of a chromatographically enhancing pore geometry and pore diameters of suitable size (e.g., relatively larger pore diameters), which make them more suitable/useful for a number of chromatographic processes, most notably HPLC.

Thus, in a first aspect, the invention provides a porous inorganic/organic hybrid particle, wherein the inorganic portion of the hybrid particle is present in an amount ranging from about 0 molar % to not more than about 25 molar %, wherein the pores of the particle are substantially disordered.

In a second aspect, the invention provides a porous inorganic/organic hybrid particle, wherein the inorganic portion of the hybrid particle is present in an amount ranging from about 25 molar % to not more than about 50 molar %, wherein the pores of the particle are substantially disordered and wherein the particle has a chromatographically enhancing pore geometry (CEPG).

The inorganic portion of the hybrid materials of the invention may be alumina, silica (SiO$_2$), titanium oxide, zirconium oxide, cerium oxide, or ceramic materials. The hybrid materials of the invention in which the inorganic portion is SiO$_2$ is particularly advantageous.

Thus, in a third aspect, the invention provides a porous inorganic/organic hybrid particle, comprising SiO$_2$ in an amount ranging from about 0 molar % to not more than about 25 molar %, wherein the pores of the particle are substantially disordered. In certain embodiments, the porous inorganic/organic hybrid particle has a chromatographically enhancing pore geometry (CEPG).

In a fourth aspect, the invention provides a porous inorganic/organic hybrid particle, comprising SiO$_2$ in an amount ranging from about 25 molar % to not more than about 50 molar %, wherein the pores of the particle are substantially disordered and wherein the particle has a chromatographically enhancing pore geometry (CEPG).

In various embodiments of aforementioned first and third aspects of the invention, the amount of the inorganic portion/SiO$_2$ ranges from: about 0 molar % to not more than about 1 molar %; about 0 molar % to not more than about 2 molar %; about 0 molar %; about 0 molar % to not more than about 5 molar %; about 0 molar % to not more than about 6 molar %; about 0 molar % to not more than about 7 molar %; about 0 molar % to not more than about 8 molar %; about 0 molar % to not more than about 9 molar %; about 0 molar % to not more than about 10 molar %; about 0 molar % to not more than about 11 molar %; about 0 molar % to not more than about 12 molar %; about 0 molar % to not more than about 13 molar %; about 0 molar % to not more than about 14 molar %; about 0 molar % to not more than about 15 molar %; about 0 molar % to not more than about 16 molar %; about 0 molar % to not more than about 17 molar %; about 0 molar % to not more than about 18 molar %; about 0 molar % to not more than about 19 molar %; about 0 molar % to not more than about 20 molar %; about 0 molar % to not more than about 21 molar %; about 0 molar % to not more than about 22 molar %; about 0 molar % to not more than about 23 molar %; about 0 molar % to not more than about 24 molar %; and about 0 molar % to not more than about 25 molar.

In various embodiments of the aforementioned second and fourth aspects of the invention, the amount of the inorganic portion/SiO$_2$ ranges from: about 25 molar % to not more than about 26 molar %; about 25 molar % to not more than about 27 molar %; about 25 molar % to not more than about 28 molar %; about 25 molar % to not more than about 29 molar %; about 25 molar % to not more than about 30 molar %; about 25 molar % to not more than about 31 molar %; about 25 molar % to not more than about 32 molar %; about 25 molar % to not more than about 33 molar %; about 25 molar % to not more than about 34 molar %; about 25 molar % to not more than about 35 molar %; about 25 molar % to not more than about 36 molar %; about 25 molar % to not more than about 37 molar %; about 25 molar % to not more than about 38 molar %; about 25 molar % to not more than about 39 molar %; about 25 molar % to not more than about 40 molar %; about 25 molar % to not more than about 41 molar %; about 25 molar % to not more than about 42 molar %; about 25 molar % to not more than about 43 molar %; about 25 molar % to not more than about 44 molar %; about 25 molar % to not more than about 45 molar %; about 25 molar % to not more than about 46 molar %; about 25 molar % to not more than about 47 molar %; about 25 molar % to not more than about 48 molar %; about 25 molar % to not more than about 49 molar %; and about 25 molar % to not more than about 50 molar %.

In one embodiment, the organic content is from about 10 to about 40% carbon. In another embodiment, the organic content is from about 15 to about 35% carbon. In yet another embodiment, the invention provides a porous inorganic/organic hybrid particle, wherein the organic content is from about 25 to about 40% carbon. In a further embodiment, the organic content is from about 25 to about 35% carbon.

In one embodiment, the porous inorganic/organic hybrid particle of the invention has formula I:

$$(SiO_2)_d/[R^2((R)_p(R^1)_q SiO_t)_m] \quad (I)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0, t is 0.5, 1.0, or 1.5;

d is 0 to about 0.9;

m is an integer from 1-20; wherein R, $R^1$ and $R^2$ are optionally substituted; provided that: (1) when $R^2$ is absent, m=1 and $$t = \frac{(4-(p+q))}{2},$$

when $0 < p+q \leq 3$; and (2) when $R^2$ is present, m=2-20 and $$t = \frac{(3-(p+q))}{2},$$

when $p+q \leq 2$.

In certain embodiments, $R^2$ is absent, t=1.5 when p+q=1; or t=1 when p+q=2. In other embodiments, $R^2$ is present, p=0, q is 0 or 1 and t=1.5 when q=0; or t=1 when q=1.

In certain embodiments, $R^2$ is absent. In other embodiments, $R^2$ is present. In embodiments of formula I in which $R^2$ is present, the invention provides a porous inorganic/organic hybrid particle of formula I, wherein p is 0, q is 0, t is 1.5, m is 2, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^2$ is attached to two or more silicon atoms. In a further embodiment, d is 0. In another embodiment, d is 0.11. In still another embodiment, d is 0.33. In certain embodiments, d is 0.83.

In other embodiments of formula I in which $R^2$ is present, the invention provides a porous inorganic/organic hybrid particle of formula I, wherein d is 0, q is 0, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; and wherein each $R^2$ is attached to two or more silicon atoms. In a further embodiment, p is 0, 1, or 2. In another further embodiment, t is 1.0 or 1.5. In another embodiment, m is 1 or 2.

Certain particular embodiments of formula I in which $R^2$ is present are set forth in the following table (product numbers refer to the numbers used in the examples set forth below):

| Product | Formula | d | p | q | t | m |
|---|---|---|---|---|---|---|
| 4a-4s | $(O_{1.5}SiCH_2CH_2SiO_{1.5})$ | 0 | 0 | 0 | 1.5 | 2 |
| 13b, 13d-13g | $(SiO2)_{0.25}(O_{1.5}SiCH_2CH_2SiO_{1.5})_{0.75}$ | 0.33 | 0 | 0 | 1.5 | 2 |
| 13c | $(SiO2)_{0.1}(O_{1.5}SiCH_2CH_2SiO_{1.5})_{0.9}$ | 0.11 | 0 | 0 | 1.5 | 2 |
| 13a | $(SiO2)_{0.45}(O_{1.5}SiCH_2CH_2SiO_{1.5})_{0.55}$ | 0.83 | 0 | 0 | 1.5 | 2 |
| 11a-i, l-q, t-w | $(O_{1.5}SiCH_2CH_2SiO_{1.5})_x(YSiO_{1.5})_{1-x}$ | 0 | 0, 1 | 0 | 1.5, 1.5 | 2, 1 |
| 11a-i, l-q, t | $(O_{1.5}SiCH_2CH_2SiO_{1.5})_x(YSiO_{1.5})_{1-x}$ | 0 | 0, 1 | 0 | 1.5, 1.5 | 2, 1 |
| 11j | $(O_{1.5}SiCH_2CH_2SiO_{1.5})_x(YSiO_{1.5})_w(ZSiO_{1.5})_{1-x-w}$ | 0 | 0, 1, 1 | 0, 0, 0 | 1.5, 1.5, 1.5 | 2, 1, 1 |
| 11k, s | $(O_{1.5}SiCH_2CH_2SiO_{1.5})_x(O_{1.5}Si-Y-SiO_{1.5})_{1-x}$ | 0 | 0, 0 | 0, 0 | 1.5, 1.5 | 2, 2 |
| 11e | $(O_{1.5}SiCH_2CH_2SiO_{1.5})_x(Y_2SiO_1)_{1-x}$ | 0 | 0, 2 | 0, 0 | 1.5, 1.0 | 2, 1 |
| 11r | $(O_{1.5}SiCH_2CH_2SiO_{1.5})_x(FSiO_{1.5})_{1-x}$ | 0 | 0, 0 | 0, 0 | 1.5, 1.5 | 2, 1 |

In another embodiment, the porous inorganic/organic hybrid particle of the invention has formula II:

$$(SiO_2)_d/[(R)_p(R^1)_q SiO_t] \quad (II)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 0.9:

p and q are each independently 0.0 to 3.0, provided that when p+q=1 then t=1.5; when p+q=2 then t=1; or when p+q=3 then t=0.5.

In yet another embodiment, the porous inorganic/organic hybrid particle of the invention has formula III:

$$(SiO_2)_d/[R^2((R^1)_r SiO_t)_m] \quad (III)$$

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 0.9;

r is 0, 1 or 2, provided that when r=0 then t=1.5; when r=1 then t=1; or when r=2, then t=0.5; and m is an integer from 1-20.

In various embodiments, the invention provides a porous inorganic/organic hybrid particle of formulas I and II, wherein R is $C_1$-$C_{18}$ alkoxy, $C_1$-$C_{18}$ alkyl, or $C_1$-$C_{18}$ alkyl. In various embodiments, the invention provides a porous inorganic/organic hybrid particle of formulas I, II and III, wherein $R^1$ is $C_1$-$C_{18}$ alkoxy, $C_1$-$C_{18}$ alkyl, or $C_1$-$C_{18}$ alkyl. In various embodiments, the invention provides a porous inorganic/organic hybrid particle of formulas I and III, wherein $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl.

In yet another embodiment, the porous inorganic/organic hybrid particle of the invention has formula IV:

$$(A)_x(B)_y(C)_z \tag{IV}$$

wherein the order of repeat units A, B, and C may be random, block, or a combination of random and block; A is an organic repeat unit which is covalently bonded to one or more repeat units A or B via an organic bond; B is an organosiloxane repeat unit which is bonded to one or more repeat units B or C via an inorganic siloxane bond and which may be further bonded to one or more repeat units A or B via an organic bond; C is an bond; x and y are positive numbers, and z is a non negative number, wherein z=0, then $0.002 \leq x/y \leq 210$, and when $z \neq 0$, then $0.0003 \leq y/z \leq 500$ and $0.002 \leq x/(y+z) \leq 210$.

In a related embodiment, the porous inorganic/organic hybrid particle of the invention has formula V:

$$(A)_x(B)_y(B^*)_{y^*}(C)_z \tag{V}$$

wherein the order of repeat units A, B, B*, and C may be random, block, or a combination of random and block; A is an organic repeat unit which is covalently bonded to one or more repeat units A or B via an organic bond; B is an organosiloxane repeat unit which is bonded to one or more repeat units B or B* or C via an inorganic siloxane bond and which may be further bonded to one or more repeat units A or B via an organic bond, B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization; C is an inorganic repeat unit which is bonded to one or more repeat units B or B* or C via an inorganic bond; x and y are positive numbers and z is a non negative number, wherein when z=0, then $0.002 \leq x/(y+y^*) \leq 210$, and when $z \neq 0$, then $0.0003 \leq (y+y^*)/z \leq 500$ and $0.002 \leq x/(y+y^*+z) \leq 210$.

Repeat unit A may be derived from a variety of organic monomer reagents possessing one or more polymerizable moieties, capable of undergoing polymerization, e.g., a free radical-mediated polymerization. A monomers may be oligomerized or polymerized by a number of processes and mechanisms including, but not limited to, chain addition and step condensation processes, radical, anionic, cationic, ring-opening, group transfer, metathesis, and photochemical mechanisms.

A may also be one of the following:

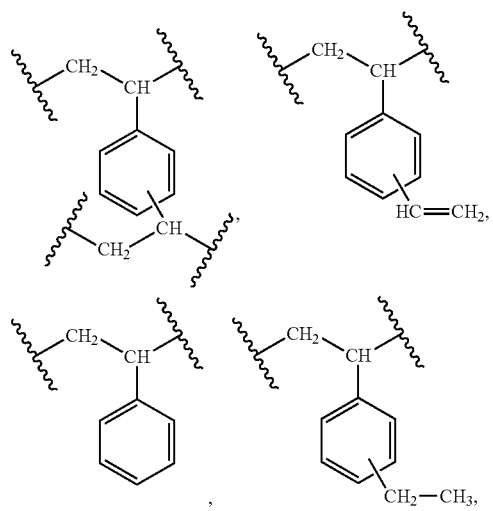

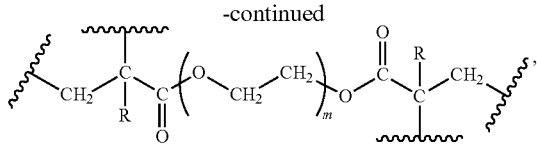

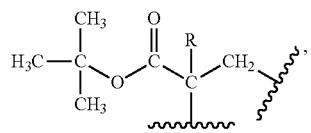

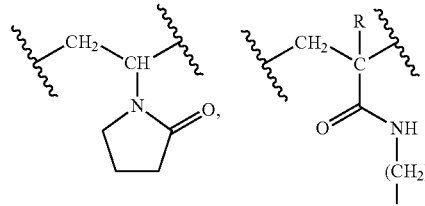

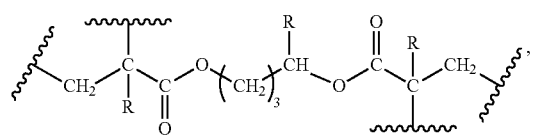

wherein each R is independently H or a $C_1$-$C_{10}$ alkyl group (e.g, methyl, ethyl, or propyl); m is an integer of from 1 to about 20; n is an integer of from 0 to 10; and Q is hydrogen, $N(C_{1-6}alkyl)_3$, $N(C_{1-6}alkyl)_2(C_{1-6}alkyl-SO_3)$, or $C(C_{1-6}hydroxyalkyl)_3$.

Repeat unit B may be derived from several mixed organic-inorganic monomer reagents possessing two or more different polymerizable moieties, capable of undergoing polymerization, e.g., a free radical-mediated (organic) and hydrolytic (inorganic) polymerization. B monomers may be oligomerized or polymerized by a number of processes and mechanisms including, but not limited to, chain addition and step condensation processes, radical, anionic, cationic, ring-opening, group transfer, metathesis, and photochemical mechanisms.

B may also be one of the following:

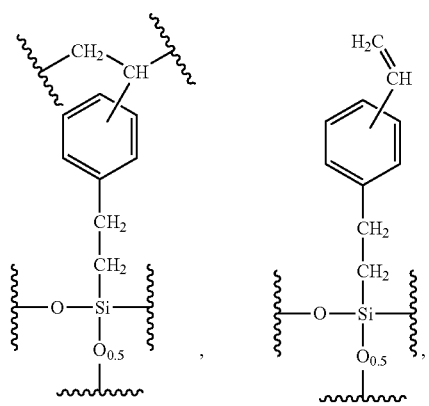

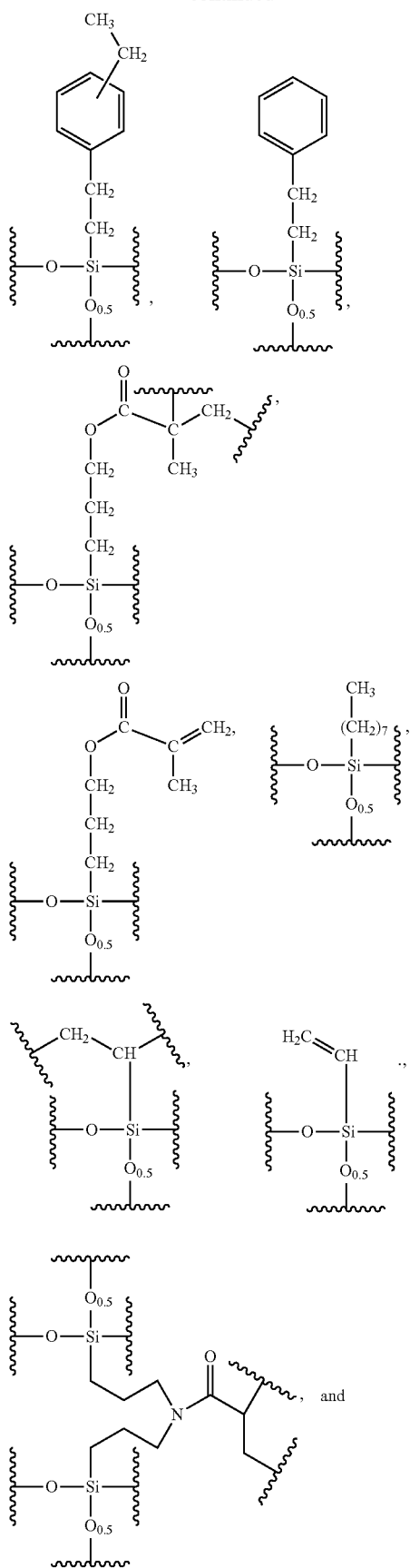

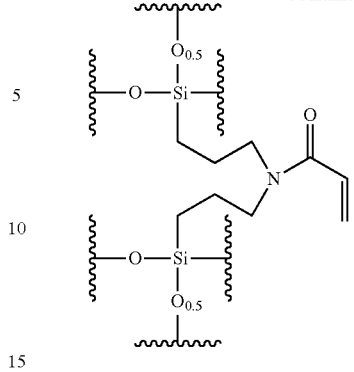

Repeat unit C may be —SiO$_2$— and may be derived from an alkoxysilane, such as tetraethoxysilane (TEOS) or tetramethoxysilane (TMOS).

In one embodiment, A is a substituted ethylene group, B is a oxysilyl-substituted alkyl group, and C is a oxysilyl group, for example the following:

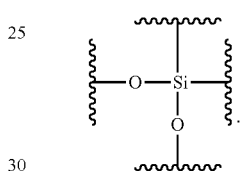

A specific embodiment of a porous hybrid particle of the invention is of formula IV is:

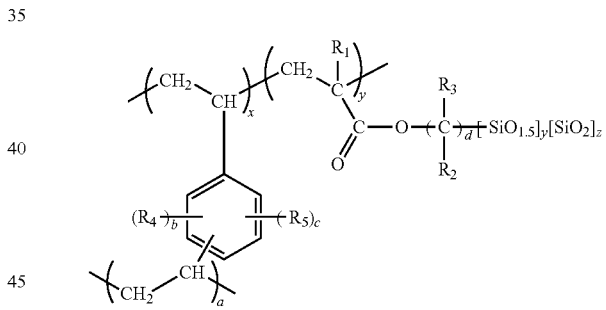

wherein $R_1$ is H, F, Cl, Br, I, lower alkyl (e.g., CH$_3$ or CH$_2$CH$_3$);

$R_2$ and $R_3$ are each independently H, F, Cl, Br, I, alkane, substituted alkane, alkene, substituted alkene, aryl, substituted aryl, cyano, ether, substituted ether, embedded polar group;

$R_4$ and $R_5$ are each independently H, F, Cl, Br, I, alkane, substituted alkane, alkene, substituted alkene, aryl, substituted aryl, ether, substituted ether, cyano, amino, substituted amino, diol, nitro, sulfonic acid, cation or anion exchange groups, $0 \leq a \leq 2x$, $0 \leq b \leq 4$, and $0 \leq c \leq 4$, provided that $b+c \leq 4$ when $a=1$;

$1 \leq d \leq 20$, $0.0003 \leq y/z \leq 500$ and $0.002 \leq x/(y+z) \leq 210$.

In still another embodiment, the porous inorganic/organic hybrid particles are spherical. In a further embodiment, the spherical particle has a non-crystalline or amorphous molecular ordering. In a further embodiment, the spherical particle has a non-periodic pore structure.

In other embodiments, the porous inorganic/organic hybrid particle has a surface area of about 40 to 1100 m²/g. In certain instances, the particle has a surface area of about 80 to 500 m²/g. In other instances, the particle has a surface area of about 800 to 1100 m²/g.

In one embodiment, the porous inorganic/organic hybrid particle has micropore volumes of about 0.2 to 1.5 cm³/g. In certain instances, the particle has micropore volumes of about 0.6 to 1.3 cm³/g.

In another embodiment, the porous inorganic/organic hybrid particle has a micropore surface area of less than about 110 m²/g. In certain instances, the particle has a micropore surface area of less than about 105 m²/g. In other instances, the particle has a micropore surface area of less than about 80 m²/g. In still other instances, the particle has a micropore surface area of less than about 50 m²/g.

In one embodiment, the invention provides a porous inorganic/organic hybrid particle, wherein the particle has an average pore diameter of about 20 to 5000 Å, e.g., 20 to 2000 Å, e.g., 20 to 1000 Å. In a further embodiment, the particle has an average pore diameter of about 30 to 300 Å. In another embodiment, the particle has an average pore diameter of about 60 to 200 Å. In a further embodiment, the particle has an average pore diameter of about 80 to 140 Å.

In another embodiment, the particle has an average size of about 0.1 µm to about 300 µm. In a further embodiment, the particle has an average size of about 0.1 µm to about 30 µm.

In certain embodiments, the particle is hydrolytically stable at a pH of about 1 to about 14. In one embodiment, the particle is hydrolytically stable at a pH of about 10 to about 14. In another embodiment, the particle is hydrolytically stable at a pH of about 1 to about 5.

In one embodiment, the invention provides a porous inorganic/organic hybrid particle as described herein, wherein the particle is formed by hydrolytic condensation of one or more monomers selected from the group consisting of:

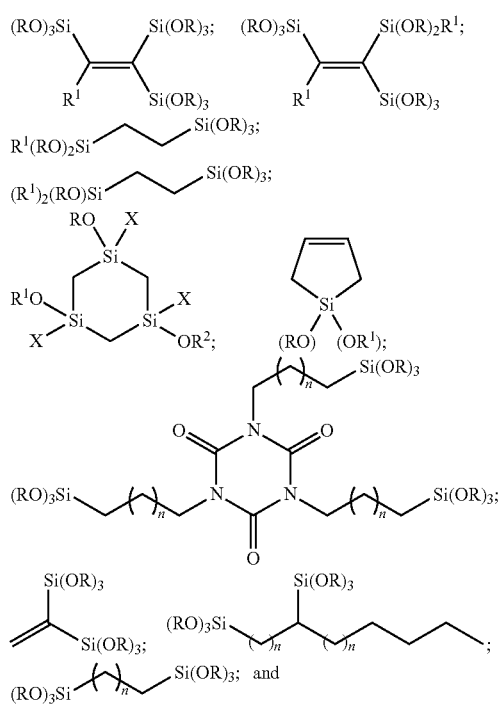

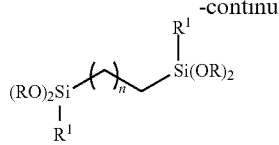

wherein R, $R^1$ and $R^2$ are as defined previously; X is $C_1$-$C_{18}$ alkoxy or $C_1$-$C_{18}$ alkyl; and n is 1-8.

In a further embodiment, the monomer is 1,2-bis(triethoxysilyl)ethane:

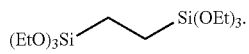

In another further embodiment, the monomer is 1,2-bis(methyldiethoxysilyl)ethane:

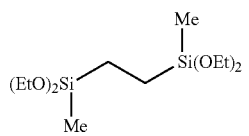

or 1,8-bis(triethoxysilyl)octane:

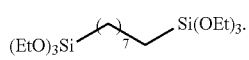

In other embodiment, the invention provides a porous inorganic/organic hybrid particle as described herein, wherein the particles have been surface modified with a surface modifier having the formula $Z_a(R')_b Si$—R", where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R" is a functionalizing group.

In another embodiment, the particles have been surface modified by coating with a polymer.

In certain embodiments, R' is selected from the group consisting of methyl, ethyl, propyl, isopropyl, butyl, t-butyl, sec-butyl, pentyl, isopentyl, hexyl and cyclohexyl. In other embodiments, R is selected from the group consisting of alkyl, alkenyl, alkynyl, aryl, cyano, amino, diol, nitro, ester, a cation or anion exchange group, an alkyl or aryl group containing an embedded polar functionality and a chiral moiety.

In one embodiment, R" is a $C_1$-$C_{30}$ alkyl group. In a further embodiment, R" comprises a chiral moiety. In another further embodiment, R" is a $C_1$-$C_{20}$ alkyl group.

In certain embodiments, the surface modifier is selected from the group consisting of octyltrichlorosilane, octadecyltrichlorosilane, octyldimethylchlorosilane and octadecyldimethylchlorosilane. Preferably, the surface modifier is selected from the group consisting of octyltrichlorosilane and octadecyltrichlorosilane.

In another embodiment, the particles have been surface modified by a combination of organic group and silanol group modification.

In still another embodiment, the particles have been surface modified by a combination of organic group modification and coating with a polymer. In a further embodiment, the organic group comprises a chiral moiety.

In yet another embodiment, the particles have been surface modified by a combination of silanol group modification and coating with a polymer.

In other embodiments, the particles have been surface modified via formation of an organic covalent bond between the particle's organic group and the modifying reagent.

In still other embodiments, the particles have been surface modified by a combination of organic group modification, silanol group modification and coating with a polymer.

In another embodiment, the particles have been surface modified by silanol group modification.

In another aspect, the invention provides a porous inorganic/organic hybrid material, comprising porous inorganic/organic hybrid particles as described herein. In one embodiment, the particles of the material are spherical.

In another aspect, the invention provides a porous inorganic/organic hybrid material, comprising porous inorganic/organic hybrid particles having a chromatographically enhancing pore geometry, wherein the material comprises a combination of the particles described herein.

In certain embodiments, the invention provides a porous inorganic/organic hybrid material, wherein the material is a monolith.

Another aspect of the invention provides a porous inorganic/organic hybrid material, which comprises porous inorganic/organic hybrid particles of the instant invention as described herein. In one embodiment, the porous inorganic/organic hybrid material comprises porous inorganic/organic hybrid particles having a chromatographically enhancing pore geometry. In another embodiment, the material invention as described herein. The porous hybrid inorganic/organic materials of the invention include monoliths.

Separation Devices and Kits

Another aspect provides a variety of separations devices having a stationary phase comprising the porous inorganic/organic hybrid particles and the a porous inorganic/organic hybrid materials as described herein. The separations devices include, e.g., chromatographic columns, thin layer plates, filtration membranes, sample cleanup devices and microtiter plates.

The porous inorganic/organic hybrid particles and the a porous inorganic/organic hybrid materials impart to these devices improved lifetimes because of their improved stability. Thus, in a particular aspect, the invention provides a chromatographic column having improved lifetime, comprising a) a column having a cylindrical interior for accepting a packing material, and b) a packed chromatographic bed comprising the porous inorganic/organic hybrid particles and the a porous inorganic/organic hybrid materials as described herein.

The invention also provides for a kit comprising the porous inorganic/organic hybrid particles as described herein, or the porous inorganic/organic hybrid material comprising porous inorganic/organic hybrid particles, as described herein, and instructions for use. In one embodiment, the instructions are for use with a separations device, e.g., chromatographic columns, thin layer plates, filtration membranes, sample cleanup devices and microtiter plates.

Synthesis of Particles of the Invention

The invention also provides methods for producing the porous inorganic/organic hybrid particles described herein. In particular, the invention provides methods for producing a porous inorganic/organic hybrid particle, comprising an inorganic portion in an amount ranging from about 0 molar % to not more than about 25 molar %, wherein the pores of the particle are substantially disordered, as well as a porous inorganic/organic hybrid particle, comprising an inorganic portion in an amount ranging from about 25 molar % to not more than about 50 molar %, wherein the pores of the particle are substantially disordered and wherein the particle has a chromatographically enhancing pore geometry (CEPG).

The method comprises the steps of:

a) hydrolytically condensing one or more monomers selected from the group consisting of organoalkoxysilanes and tetraalkoxysilanes with one or more monomers selected from the group consisting of organoalkoxysiilanes, tetraalkoxysilanes, metal oxide precursors, and ceramic precursors to produce a polyorganoalkoxysiloxane;

b) further condensing the polyorganoalkoxysiloxane to form a spherical porous particle; and c) subjecting the resulting particle to hydrothermal treatment.

In an embodiment of the foregoing method when preparing a porous inorganic/organic hybrid particle, comprising the inorganic portion in an amount ranging from about 0 molar % to not more than about 25 molar %, wherein the pores of the particle are substantially disordered, the hydrolytic condensing of one or more monomers excludes tetraalkoxysilanes.

In one embodiment, the metal oxide precursors are selected from the group consisting of the oxide, hydroxide, ethoxide, methoxide, propoxide, isopropoxide, butoxide, sec-butoxide, tert-butoxide, iso-butoxide, phenoxide, ethylhexyloxide, 2-methyl-2-butoxide, nonyloxide, isooctyloxide, glycolates, carboxylate, acetate, oxylate, nitrate, chlorides, and mixtures thereof of titanium, zirconium, cerium or aluminum. Preferably, the metal oxide precursors are methyl titanium triisopropoxide, methyl titanium triphenoxide, titanium allylacetoacetatetriisopropoxide, titanium methacrylate triisopropoxide, titanium methacryloxyethylacetoacetate triisopropoxide, pentamethylcyclopentadienyl titanium trimethoxide, pentamethylcyclopentadienyl titanium trichloride, zirconium methacryloxyethylacetoacetate tri-n-propoxide, cerium chloride, cerium acetate, and cerium oxalate.

In another aspect, the invention provides methods for producing a porous inorganic/organic hybrid particle, comprising $SiO_2$ in an amount ranging from about 0 molar % to not more than about 25 molar %, wherein the pores of the particle are substantially disordered, as well as a porous inorganic/organic hybrid particle, comprising $SiO_2$ in an amount ranging from about 25 molar % to not more than about 50 molar %, wherein the pores of the particle are substantially disordered and wherein the particle has a chromatographically enhancing pore geometry (CEPG).

The method comprises the steps of:

a) hydrolytically condensing one or more monomers selected from the group consisting of organoalkoxysilanes and tetraalkoxysilanes, to produce a polyorganoalkoxysiloxane;

b) further condensing the polyorganoalkoxysiloxane to form a spherical porous particle; and c) subjecting the resulting particle to hydrothermal treatment; to thereby produce a porous inorganic/organic hybrid particle of the invention.

In certain embodiments, the invention provides a method of producing a particle comprising $SiO_2$ in an amount ranging from about 0 molar % to not more than about 25 molar %, wherein the pores of the particle are substantially disordered, wherein the one or more monomers exclude tetraalkoxysilanes.

In one embodiment, the invention provides methods for producing a porous inorganic/organic hybrid particle, comprising $SiO_2$ in an amount ranging from about 0 molar % to not more than about 25 molar %, wherein the pores of the particle are substantially disordered, comprising the steps of:

a) hydrolytically condensing one or more monomers selected from the group consisting of organoalkoxysilanes and tetraalkoxysilanes, to produce a polyorganoalkoxysiloxane;

b) further condensing the polyorganoalkoxysiloxane to form a spherical porous particle; and c) subjecting the resulting particle to hydrothermal treatment; to thereby produce a porous inorganic/organic hybrid particle of the invention.

In certain embodiments, the condensing step comprises treating an aqueous emulsion of the polyorganoalkoxysiloxane with base to form a spherical particle.

In another embodiment, the invention provides a method of producing a porous inorganic/organic hybrid particle as described above, further comprising treating the spherical porous particle with acid.

In still another embodiment, the invention provides a method of producing a the aqueous emulsion of the polyorganoalkoxysiloxane with one or more additional aliquots of base to form a spherical particle. In a further embodiment, the invention provides a method further comprising treating the spherical porous particle with acid.

In certain embodiments, the invention provides a method, wherein the particle has a chromatographically enhancing pore geometry (CEPG).

In one embodiment, the foregoing methods produce the porous inorganic/organic hybrid particle having formula I, II, or II described above.

In certain embodiments, the invention provides a method, further comprising preparing an aqueous suspension of the polyorganoalkoxysiloxane and gelling in the presence of a base catalyst to produce the porous inorganic/organic hybrid particle In certain embodiments of the method, step a) or step b) is acid-catalyzed or base-catalyzed. In one embodiment, step a) is acid catalyzed. In another embodiment, step b) is base catalyzed. In a further embodiment, the base-catalyzed reaction is an oil-in-water emulsification reaction.

Thus, in an advantageous embodiment, step b) further comprises treating an aqueous emulsion of the polyorganoalkoxysiloxane with base. In a further advantageous embodiment, following treatment with base, the particle produced in step b) is treated with acid. In an alternative advantageous embodiment, the treatment of the aqueous emulsion of the polyorganoalkoxysiloxane with base in step b) is followed by treatment with one or more additional aliquots of base and then the resulting particles are treated with acid.

Suitable acids for use with the methods of the invention include hydrochloric acid, hydrobromic acid, hydrofluoric acid, hydroiodic acid, sulfuric acid, formic acid, acetic acid, trichloroacetic acid, trifluoroacetic acid and phosphoric acid. Suitable bases for use with the methods of the invention include alkyl amines, ammonium hydroxide, hydroxide salts of the group I and group II metals, carbonate and hydrogen carbonate salts of the group I metals and alkoxide salts of the group I and group II metals. Alkyl amines include, e.g., trimethyl amine, triethyl amine, diisopropyl ethyl amine, etc. Tris(hydroxymethyl)methylamine is a particular alkyl amine.

In certain embodiments, steps a) and b) are performed in a solvent selected from the group consisting of water, methanol, ethanol, propanol, isopropanol, butanol, tert-petroleum ethers, diethyl ether, dialkyl ethers, tetrahydrofuran, acetonitrile, ethyl acetate, pentane, hexane, heptane, benzene, toluene, xylene, N,N-dimethylformamide, dimethyl sulfoxide, 1-methyl-2-pyrrolidinone, methylene chloride, chloroform and combinations thereof.

In another aspect, the invention provides a method of producing a porous inorganic/organic hybrid particle of formula IV or formula V, comprising the steps of:

(a) hydrolytically condensing an alkenyl-functionalized organosilane with a tetraalkoxysilane;

(b) copolymerizing the product of step (a) with an organic olefin monomer; and (c) further condensing the product of step (b) to form a spherical porous particle.

In still another aspect, the invention provides a method of preparing a porous inorganic/organic hybrid particle of formula IV or formula V described above, comprising the steps of:

(a) copolymerizing an organic olefin monomer with an alkenyl-functionalized organosilane; and (b) hydrolytically condensing the product of step (a) with a tetraalkoxysilane in the presence of a non-optically active porogen; and (c) further condensing the product of step (b) to form a spherical porous particle.

In certain embodiments, the copolymerizing step is free radical-initiated and wherein the hydrolytically condensing step is an acid- or base-catalyzed.

In one embodiment, the invention provides a method as described above, further comprising subjecting the resulting particle to hydrothermal treatment.

In certain embodiments, the spherical porous particles produced in step b) or step c) are sized to generate a particle size distribution that is distinct from the particle size distribution of the spherical porous particles produced in step b) or step c).

In other embodiments, the spherical particle has a non-crystalline or amorphous molecular ordering. In a further embodiment, the spherical particle has a non-periodic pore structure.

In certain embodiments, the invention provides a method of producing the particles of the invention, wherein the particle has a surface area of about 40 to 1100 $m^2/g$. In a further embodiment, the particle has a surface area of about 80 to 500 $m^2/g$.

In one embodiment, the invention provides a method of producing the particles of the invention wherein the particle has micropore volumes of about 0.2 to 1.5 $cm^3/g$. In a further embodiment, the particle has micropore volumes of about 0.6 to 1.3 $cm^3/g$.

In another embodiment, the invention provides a method of producing the particles of the invention wherein the particle has a micropore surface area of less than about 110 $m^2/g$. In a further embodiment, the particle has a micropore surface area of less than about 105 $m^2/g$. In another embodiment, the particle has a micropore surface area of less than about 80 $m^2/g$. In a further embodiment, the particle has a micropore surface area of less than about 50 $m^2/g$.

In another embodiment, the invention provides a method of producing the particles of the invention wherein the particle has an average pore diameter of about 20 to 500 Å. In a further embodiment, the particle has an average pore diameter of about 30 to 180 Å.

In certain instances, the particle has an average pore diameter of about 60 to 200 Å. Preferably, the particle has an average pore diameter of about 80 to 140 Å.

In other instance, the particle has an average size of about 0.1 µm to about 300 µm, preferably about 0.1 µm to about 30 µm.

In another embodiment, the invention provides a method of producing the particles of the invention wherein the particle is hydrolytically stable at a pH of about 1 to about 14. In certain instances, the particle is hydrolytically stable at a pH of about 10 to about 14. In other instances, the particle is hydrolytically stable at a pH of about 1 to about 5.

In one embodiment, the invention provides a method of producing the particles of the invention wherein the organic content is from about 25 to about 40% carbon. In a further embodiment, the organic content is from about 25 to about 35% carbon.

In certain instances, the invention provides a method of producing the particles of the invention wherein R is $C_1$-$C_{18}$ alkoxy, $C_1$-$C_{18}$ alkyl, or $C_1$-$C_{18}$ alkyl.

In another embodiment, $R^1$ is $C_1$-$C_{18}$ alkoxy $C_1$-$C_{18}$ alkyl, or $C_1$-$C_{18}$ alkyl.

In other embodiments, $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl.

In one embodiment, the invention provides a method of producing the porous inorganic/organic hybrid particle has formula I wherein p is 0, q is 0, t is 1.5, m is 2, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^2$ is attached to two or more silicon atoms. In a further embodiment, d is 0. In another further embodiment, d is 0.11. In still another further embodiment, d is 0.33. In yet another further embodiment, d is 0.83.

In another embodiment, the invention provides a method of producing the porous inorganic/organic hybrid particle has formula I wherein d is 0, q is 0, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^2$ is attached to two or more silicon atoms. In a further embodiment, p is 0, 1, or 2. In another embodiment, t is 1.0 or 1.5. In another embodiment, m is 1 or 2.

In one embodiment, the invention provides a method of producing the porous inorganic/organic hybrid particle of the invention wherein the one or more monomers are selected from the group consisting of:

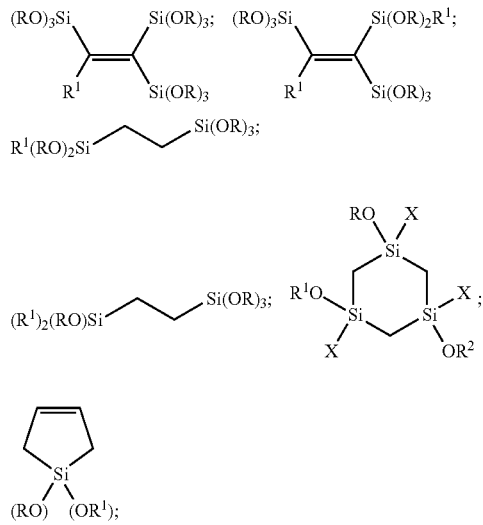

wherein R, $R^1$ and $R^2$ are as defined previously; X is $C_1$-$C_{18}$ alkoxy or $C_1$-$C_{18}$ alkyl; and n is 1-8.

In certain embodiments, the monomer is 1,2-bis(triethoxysilyl)ethane:

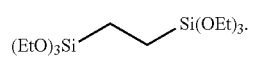

In other embodiments, the monomer is 1,2-bis(methyldiethoxysilyl)ethane:

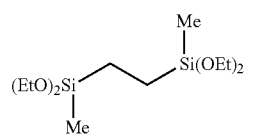

or 1,8-bis(triethoxysilyl)octane:

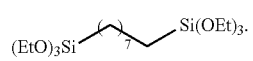

The freshmade particles resulting from step b) are advantageously sized to generate a particle size distribution that is distinct from the particle size distribution of the freshmade spherical porous particles resulting form step b). Any number of well known sizing techniques may be used. Such sizing techniques are described, for example, in W. Gerhartz, et al. (editors) *Ullmann's Encyclopedia of Industrial Chemistry*, 5$^{th}$ edition, Volume B2: Unit Operations I, VCH Verlagsgesellschaft mbH, (Weinheim, Fed. Rep. Germ. 1988). Particles are advantageously sized to a diameter range of about 0.5 μm to about 300 μm, more advantageously about 1 μm to about 20 μm.

Porous inorganic/organic hybrid particles of the invention can be prepared by the foregoing methods. Further details on the synthesis of the porous inorganic/organic hybrid particles of formulas IV and V can be found, for example, in WO2004/041398-A2. Certain embodiments of the synthesis of the porous inorganic/organic hybrid particles of formulas I-III described above are further described as follows.

Porous spherical particles of hybrid particles may, in a particular embodiment, be prepared by a four-step process. In the first step, an organoalkoxysilane can be prepolymerized by itself, or with one or more organoalkoxysilanes or with 0-49 molar % tetraalkoxysilane such as tetraethoxysilane (TEOS) to form a polyorganoalkoxysiloxe (POS) by co-hydrolyzing in the presence of an acid catalyst. A list of organoalkoxysilanes that may be used in this approach includes (but is not limited to): bis(triethoxysilyl)ethane; bis(triethoxylsilyl)octane; bis(methyldiethoxysilyl)ethane; bis(triethoxysilyl)ethene; bis(trimethoxysilylethyl)benzene; ethyltriethoxysilane; diethyldiethoxysilane; mercaptopropyltriethoxysilane; methyltriethoxysilane; vinyltriethoxysilane; hexyltriethoxysilane; chloropropyltriethoxysilane; phenylethyltrimethoxysilane; octadecyltrimethoxysilane; octyltrimethoxysilane; 3,3,3-trifluoropropyltrimethoxysilane; and 3-cyanobutyltriethoxysilane. The use of reactive organoalkoxysilanes that have been shown to react by protodesilylation, deprotection, or decompose may also be useful in introducing porosity into hybrid particles. A list of organoalkoxysilanes that may protodesilylate, deprotect or decompose to introduce porosity into hybrid particles includes (but is not limited to); phenyltriethoxysilane; methacryloxypropyltrimethoxysilane; acetyloxyethyltrimethoxysilane, chloroethyltriethoxysilane, and fluorotriethoxysilane.

In the second step, the POS is suspended in an aqueous medium in the presence of a surfactant or a combination of surfactants and gelled into porous spherical particles of hybrid particles. The process of gelation can be controlled using a single addition of base catalyst or multiple additions of base catalyst, a combination of base and acid catalyst, or the multi-addition of base catalyst followed by acid catalyst.

In the third step, the pore structure of the hybrid particles is modified by hydrothermal treatment, producing an intermediate hybrid product which may be used for particular purposes itself, or may be further processed below. The above three steps of the process allow much better control of the particle sphericity, morphology, pore volume and pore sizes than those described in the prior art, and thus provide the chromatography-enhancing pre geometry.

In one embodiment of the invention, the surface organic groups of the hybrid particles may be derivatized or modified in a subsequent step via formation of an organic covalent bond between the particle's organic group and the modifying reagent. Alternatively, the surface silanol groups of the hybrid particles are derivatized or modified into siloxane functional groups, such as by reacting with an organotrihalosilane, e.g., octadecyltrichlorosilane, or a halopolyorganosilane, e.g., octadecyldimethylchlorosilane. Alternatively, the surface organic and silanol groups of the hybrid particles are both derivatized or modified. The surface of the thus-prepared material is then covered by the organic groups, e.g., alkyl, embedded during the gelation and the organic groups added during the derivatization process or processes. The surface coverage by the overall organic groups is higher than in conventional silica-based packing materials and, therefore, the surface concentration of the remaining silanol groups in the hybrid particles is smaller. The resulting material, used as a stationary phase for LC, shows excellent peak shape for basic analytes and better stability to Where the prepolymerization step involves co-hydrolyzing a mixture of the two or more components in the presence of an acid catalyst, the content of the organoalkoxysilane, e.g., organotrialkoxysilane can be varied, e.g., from about 0.03 to about 1.0 mole per mole, or more preferably, about 0.2 to about 0.5 mole per mole, of the tetraalkoxysilane. The amount of the water used for the hydrolysis can be varied, e.g., from 1.10 to 1.35 mole per mole of the silane. The silane, water and the ethanol mixture, in the form of a homogeneous solution, is stirred and heated to reflux under a flow of argon. After it is refluxed for a time sufficient to prepolymerize to form polyorganoalkoxysiloxane (POS), e.g., polyalkylalkoxysiloxane, the solvent and the side product, mainly ethanol, is distilled off from the reaction mixture. Thereafter, the residue is heated at an elevated temperature, e.g., in the range of 45 to 85° C. under an atmosphere of an inert gas, e.g., nitrogen, argon, etc., for a period of time, e.g., 0.5 to 48 h. The residue is further heated at 95° C. to 120° C., e.g., for 1 to 3 h at atmospheric pressure or under reduced pressure, e.g., $10^{-2}$-$10^{-3}$ torr, to remove any volatile species.

In the second step, the POS is suspended into fine beads in a solution containing water and an alcohol, such as ethanol or butanol, at 55° C. by agitation. The volume percent of alcohol in the solution is varied from 10 to 20%. A surfactant such Triton® X-100, Triton® X-165, as sodium dodecylsulfate (SDS), ammonia docecylsulfate or TRIS docecylsulfate, is added into the suspension as the suspending agent. The surfactants, are believed to be able to orient at the hydrophobic/hydrophilic interface between the POS beads and the aqueous phase to stabilize the POS beads. The surfactants are also believed to enhance the concentration of water and the base catalyst on the surface of the POS beads during the gelation step, through their hydrophilic groups, which induces the gelling of the POS beads from the surface towards the center. Use of surfactants to modulate the surface structure of the POS beads stabilizes the shape of the POS beads throughout the gelling process and minimizes or suppresses formation of particles having an irregular shapes, e.g., "shell shaped", and inhomogeneous morphology.

It is also possible to suspend a solution containing POS and a porogen in the aqueous phase, instead of POS alone. The porogen, which is insoluble in the aqueous phase, remains in the POS beads during the gelation step and functions as a porogen. Porogen include, e.g., toluene and mesitylene. By controlling the relative amount of toluene in the POS/toluene solution, the pore volume of the final hybrid particles can be more precisely controlled. This allows the preparation of hybrid particles having large pore volume, e.g., 0.25-1.5 cm$^3$/g.

The gelation step is initiated by adding the basic catalyst, e.g., ammonium hydroxide into the POS suspension. Thereafter, the reaction mixture is agitated to drive the reaction to completion. Ammonium hydroxide and sodium hydroxide are particular. The particles are isolated and washed with water. The condensation can be furthered by redispersing the particles in an aqueous acid suspension at reflux for 1-4 days. The use of hydrochloric acid is particular. The thus-prepared freshmade hybrid particles are filtered and washed with water and methanol free of ammonium ions, then dried.

In one embodiment, the pore structure of the as-prepared hybrid material is modified by hydrothermal treatment, which enlarges the openings of the pores as well as the pore diameters, as confirmed by nitrogen ($N_2$) sorption analysis. The hydrothermal treatment is performed by preparing a slurry containing the as-prepared hybrid material and a solution of a base in water, heating the slurry in an autoclave at an elevated temperature, e.g., 100 to 200° C., for a period of 10 to 30 h. The use of an alkyl amine such as trimethylamine (TEA) or Tris(hydroxymethyl)methyl amine or the use of sodium hydroxide is advantageous. The thus-treated hybrid material is cooled, filtered and washed with water and methanol, then dried at 80° C. under reduced pressure for 16 h.

In certain embodiments, following hydrothermal treatment, the surfaces of the particles are modified with various agents. Such "surface modifiers" include (typically) organic functional groups which impart a certain chromatographic functionality to a chromatographic stationary phase. The porous inorganic/organic hybrid particles possess both organic groups and silanol groups which may additionally be substituted or derivatized with a surface modifier.

The surface of the hydrothermally treated hybrid particles contains organic groups, which can be derivatized by reacting with a reagent that is reactive towards the particles' organic group. For example, vinyl groups on the particle can be reacted with a variety of olefin reactive reagents such as bromine ($Br_2$), hydrogen ($H_2$), free radicals, groups on the particle can be reacted with a variety of alcohol reactive reagents such as isocyanates, carboxylic acids, carboxylic acid chlorides and reactive organosilanes as described below. Reactions of this type are well known in the literature, see, e.g., March, *J. Advanced Organic Chemistry*, $3^{rd}$ Edition, Wiley, New York, 1985; Odian, G. *The Principles of Polymerization*, $2^{nd}$ Edition, Wiley, New York, 1981.

In addition, the surface of the hydrothermally treated hybrid particles also contains silanol groups, which can be derivatized by reacting with a reactive organosilane. The surface derivatization of the hybrid particles is conducted according to standard methods, for example by reaction with octadecyltrichlorosilane or octadecyldimethylchlorosilane in an organic solvent under reflux conditions. An organic solvent such as toluene is typically used for this reaction. An organic base such as pyridine or imidazole is added to the reaction mixture to catalyze the reaction. The product of this reaction is then washed with water, toluene and acetone and dried at 80° C. to 100° C. under reduced pressure for 16 h. The resultant hybrid particles can be further reacted with a short-chain silane such as trimethylchlorosilane to endcap the remaining silanol groups, by using a similar procedure described above.

Surface modifiers such as disclosed herein are attached to the base material, e.g., via derivatization or coating and later crosslinking, imparting the chemical character of the surface modifier to the base material. In one embodiment, the organic groups of the hybrid particle react to form an organic covalent bond with a surface modifier. The modifiers can form an organic covalent bond to the particle's organic group via a number of mechanisms well known in organic and polymer chemistry including but not limited to nucleophilic, electrophilic, cycloaddition, free-radical, carbene, nitrene and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur and the halogens. In addition, carbon-silicon and carbon-oxygen-silicon bonds are defined as organic covalent bonds, whereas silicon-oxygen-silicon bonds that are not defined as organic covalent bonds.

Surface modifiers may be used to create more chromatographically useful materials. For example, through appropriate surface modification, ion-exchange containing hybrids may be prepared. Moreover, in one such embodiment containing imidazolium chloride, the ion-exchange imidazolium chloride groups could be ion-exchanged to, for example, imidazolium carbonate through washing with carbonate solutions. Hybrids with terminal carboxylic acid or sulfonic acid groups may be exchanged by titration with NaOH to yield sodium salts of these acids. These acids can also be exchanged with cerium precursor solutions to yield a cerium adduct (see U.S. Pat. No. 7,256,049 B2). In particular embodiments, the cerium precursors are saturated solutions of cerium acetate, cerium chloride or cerium oxalate in water. In particular embodiments, cerium containing hybrids, or ion-exchanged materials with cerium precursors are useful in phospholipid removal and/or separations, and therefore, such materials would be particularly useful for this purpose in any separation device or application described herein.

The term "functionalizing group" includes organic functional groups which impart a certain chromatographic functionality to a chromatographic stationary phase, including, e.g., octadecyl ($C_{18}$) or phenyl. Such functionalizing groups are incorporated into base material directly, or present in, e.g., surface modifiers such as disclosed herein which are attached to the base material, e.g., via derivatization or coating and later crosslinking, imparting the chemical character of the surface modifier to the base material.

In certain embodiments, silanol groups are surface modified. In other embodiments, organic groups are surface modified. In still other embodiments, the hybrid particle's organic groups and silanol groups are both surface modified or derivatized. In another embodiment, the particles are surface modified by coating with a polymer. In certain embodiments, surface modification by coating with a polymer is used in conjunction with silanol group modification, organic group modification, or both silanol and organic group modification.

More generally, the surface of hybrid particles may be modified by: treatment with surface modifiers including compounds of formula $Z_a(R')_bSi$—R", where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R" is a functionalizing group. In certain instances, such particles have been surface modified by coating with a polymer.

R' includes, e.g., methyl, ethyl, propyl, isopropyl, butyl, t-butyl, sec-butyl, pentyl, isopentyl, hexyl or cyclohexyl; preferably, R' is methyl.

The functionalizing group R" may include alkyl, alkenyl, alkynyl, aryl, cyano, amino, diol, nitro, ester, cation or anion exchange groups, an alkyl or aryl group containing an embedded polar functionalities or chiral moieties. Examples of suitable R" functionalizing groups include chiral moieties, $C_1$-$C_{30}$ alkyl, including $C_1$-$C_{20}$, such as octyl ($C_8$), octadecyl ($C_{18}$) and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, and chiral moieties. Such groups include those of the general formula

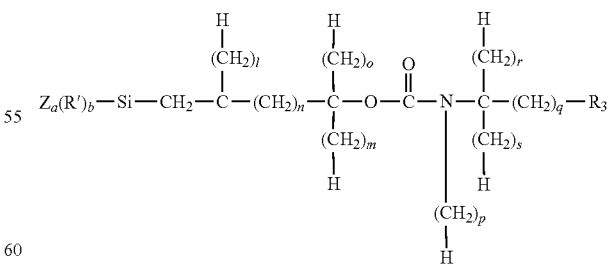

wherein l, m, o, r and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Preferably, the carbamate functionality has the general structure indicated below:

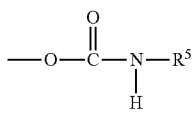

wherein R[5] may be, e.g., cyanoalkyl, t-butyl, butyl, octyl, dodecyl, tetradecyl, octadecyl, or benzyl. Advantageously, R[5] is octyl, dodecyl, or octadecyl.

In certain applications, such as chiral separations, the inclusion of a chiral moiety as a functionalizing group is particularly advantageous.

Polymer coatings are known in the literature and may be provided generally by polymerization or polycondensation of physisorbed monomers onto the surface without chemical bonding of the polymer layer to the support (type I), polymerization or polycondensation of physisorbed monomers onto the surface with chemical bonding of the polymer layer to the support (type II), immobilization of physisorbed pre-polymers to the support (type III) and chemisorption of presynthesized polymers onto the surface of the support (type IV). see, e.g., Hanson, et al., *J. Chromat. A* 656 (1993) 369-380, the text of which is incorporated herein by reference. As noted above, coating the hybrid material with a polymer may be used in conjunction with various surface modifications described in the invention.

Thus, in certain embodiments, the surface modifier is selected from the group consisting of octyltrichlorosilane, octadecyltrichlorosilane, octyldimethylchlorosilane and octadecyldimethylchlorosilane. In a further embodiment, the surface modifier is selected from the group consisting of octyltrichlorosilane and octadecyltrichlorosilane.

In another embodiment, the particles have been surface modified by a combination of organic group and silanol group modification.

In other embodiments, the particles have been surface modified by a combination of organic group modification and coating with a polymer.

In other embodiments, the particles have been surface modified by a combination of silanol group modification and coating with a polymer.

In another embodiment, the particles have been surface modified via formation of an organic covalent bond between the particle's organic group and the modifying reagent.

In certain embodiments, the particles have been surface modified by a combination of organic group modification, silanol group modification and coating with a polymer.

In one embodiment, the particles have been surface modified by silanol group modification.

In another embodiment, the invention provides a method wherein the porous inorganic/organic hybrid particles are modified by further including a porogen, e.g., during hydrolytic condensation. In a further embodiment, the porogen is selected from dibutylphthalate, 1-methyl-2-pyrrolidinone, 1-dodecanol and Triton X-45. In certain embodiments, the porogen is toluene or mesitylene.

In one embodiment, the invention provides a method wherein the porous inorganic/organic hybrid particle resulting from step b) is further modified by including a surfactant or stabilizer, e.g., during hydrolytic condensation. In certain embodiments, the surfactant is Triton X-45, Triton X100, Triton X305, TLS, Pluronic F-87, Pluronic P-105, Pluronic P-123, sodium dodecylsulfate (SDS), ammonia docecylsulfate, TRIS docecylsulfate, or Triton X-165. In certain embodiments, the surfactant is sodium dodecylsulfate (SDS), ammonia docecylsulfate, or TRIS docecylsulfate.

The porous inorganic/organic hybrid particles have a wide variety of end uses in the separation sciences, such as packing materials for chromatographic columns (wherein such columns may have improved stability to alkaline mobile phases and reduced peak tailing for basic analytes, or may be subjected to elevated pH column cleaning or depyrogenation protocols without substantial degradation), thin layer chromatographic (TLC) plates, filtration membranes, microtiter plates, scavenger resins, solid phase organic synthesis supports and the like having a stationary phase which includes porous inorganic/organic hybrid particles having a chromatographically-enhancing pore geometry. The stationary phase may be introduced by packing, coating, impregnation, etc., depending on the requirements of the particular device. In a particularly advantageous embodiment, the chromatographic device is a packed chromatographic column, such as commonly used in HPLC.

The invention also provides for a porous inorganic/organic hybrid particle comprising $SiO_2$ in an amount ranging from about 0 molar % to not more than about 25 molar %, wherein the pores of the particle are substantially disordered, produced by the methods described herein.

The invention also provides for a porous inorganic/organic hybrid particle comprising $SiO_2$ in an amount ranging from about 25 molar % to not more than about 50 molar %, wherein the pores of the particle are substantially disordered and wherein the particle has a chromatographically enhancing pore geometry (CEPG), produced by the methods described herein.

In certain embodiments, the porous inorganic/organic hybrid particle produced by the methods described herein, has a chromatographically enhancing pore geometry (CEPG).

In certain embodiments, the invention provides for the porous inorganic/organic hybrid particle produced by the methods described herein, wherein the porous inorganic/organic hybrid particle has formula I, II, II, IV or V.

Certain embodiments of the synthesis of the porous inorganic/organic hybrid particles of formulas I-III described above are further illustrated in the Examples below.

EXAMPLES

The present invention may be further illustrated by the following non-limiting examples describing the preparation of porous inorganic/organic hybrid particles and their use.

Materials

All reagents were used as received unless otherwise noted. Those skilled in the art will recognize that equivalents of the following supplies and suppliers exist and, as such, the suppliers listed below are not to be construed as limiting.

Characterization

Those skilled in the art will recognize that equivalents of the following instruments and suppliers exist and, as such, the instruments listed below are not to be construed as limiting.

The % C values were measured by combustion analysis (CE-440 Elemental Analyzer; Exeter Analytical Inc., North Chelmsford, Mass.) or by Coulometric Carbon Analyzer (modules CM5300, CM5014, UIC Inc., Joliet, Ill.). Bromine and Chlorine content were determined by flask combustion followed by ion chromatography (Atlantic Microlab, Norcross, Ga.). Zirconium content were determined using ICP-AE (IRIS Advantage, Thermo Electron Corporation, Madison, Wis.). The specific surface areas (SSA), specific pore volumes (SPV) and the average pore diameters (APD) of these materials were measured using the multi-point $N_2$ sorption method (Micromeritics using the BET method, the SPV was the single point value determined for $P/P_0>0.98$ and the APD was calculated from the desorption leg of the isotherm using the BJH method. The micropore surface area (MSA) was determined as the cumulative adsorption pore diameter data for pores <34 Å subtracted from the specific surface area (SSA). Skeletal densities were measured using a Micromeritics AccuPyc 1330 Helium Pycnometer (V2.04N, Norcross, Ga.). Particle sizes were measured using a Beckman Coulter Multisizer 3 analyzer (30-μm aperture, 70,000 counts; Miami, Fla.). The particle diameter (dp) was measured as the 50% cumulative diameter of the volume based particle size distribution. The width of the distribution was measured as the 90% cumulative volume diameter divided by the 10% cumulative volume diameter (denoted 90/10 ratio). Viscosity was determined for these materials using a Brookfield digital viscometer Model DV-II (Middleboro, Mass.). Measurements of pH were made with a Oakton pH100 Series meter (Cole-Palmer, Vernon Hills, Ill.) and were calibrated using Orion (Thermo Electron, Beverly, Mass.) pH buffered standards at ambient temperature immediately before use. Titrations were performed using a Metrohm 716 DMS Titrino autotitrator (Metrohm, Hersau, Switzerland), and are reported as milliequivalents per gram (mequiv/g). Multinuclear ($^{13}$C, $^{29}$Si) CP-MAS NMR spectra were obtained using a Bruker Instruments Avance-300 spectrometer (7 mm double broadband probe). The spinning speed was typically 5.0-6.5 kHz, recycle delay was 5 sec. and the cross-polarization contact time was 6 msec. Reported $^{13}$C and $^{29}$Si CP-MAS NMR spectral shifts were recorded relative to tetramethylsilane using the external standards adamantane ($^{13}$C CP-MAS NMR, δ 38.55) and hexamethylcyclotrisiloxane ($^{29}$Si CP-MAS NMR, δ −9.62). Populations of different silicon environments were evaluated by spectral deconvolution using DMFit software. [Massiot, D.; Fayon, F.; Capron, M.; King, I.; Le Calvé, S.; Alonso, B.; Durand, J.-O.; Bujoli, B.; Gan, Z.; Hoatson, G. *Magn. Reson. Chem.* 2002, 40, 70-76]

X-Ray Powder Diffraction (XRPD) analysis (H&M Analytcial Services, Inc. Allentown, N.J.) were collected under small angle and wide angle XRPD conditions, using a Philips model PW1800 or PW3020, or Siemens model D5000 Θ/Θ diffractometer) in a Bragg-Brentano parafocusing geometry and using Cu radiation at 40 KV/30 mA from a long fine focus tube.

Small angle XRPD measurements were run over the angular range of 0.5° to 6° with a step size of 0.05° and counting times of 600 seconds per step. To reduce the angular divergence and reduce the background, narrow slits were used (divergence slit=0.05 mm, anti-scatter slit=0.1 mm, detector slit=0.05 mm). Under these conditions, the angular divergence of the instrument is approximately 0.05°. Two types of scans were run. The first consisted of the test sample, which was deposited onto a zero background holder and thinned to a layer thickness of approximately 50 μm by use of a methanol slurry. This method has the added advantage of producing a very smooth surface, which is desirable for low angle work.

The second type of test consisted of the test sample mixed with a small amount of Silver Behenate ($C_{22}H_{44}O_2Ag$ produced by Kodak and described in *Powder Diffraction*, 10, 91-95 (1995)). Silver Behenate is an ideal low-angle standard due to its very large lattice parameter that produces a series of diffraction lines at angles as low as 1.513°. To perform the internal calibration using Silver Behenate, the pattern containing the internal standard was first modified to bring the Silver Behenate peaks into their calibrated positions. Once this was done, the unspiked sample was then corrected to bring it into coincidence with the features of the standard pattern that are common to both patterns. This indirect method of internal calibration had to be used Because the strongest peak from the standard and the strongest peak from the test material overlapped. Although this indirect method is not as accurate as the conventional internal standard method, the accuracy is still deemed to be quite good, with an expected error of approximately 0.02°, which is about ten times better than the uncorrected pattern. All patterns were analyzed with the use of the commercial program Jade v6.5 (produced by Materials Data Inc., Livermore, Calif.). Each pattern was corrected for systematic errors by use of the internal standard. The background was then fitted with a parabolic fitting function and stripped. There was no reason to remove the $K\alpha_2$ peak artifact, Because it is so close to the $K\alpha_1$ peak at these low angles that they are indistinguishable. Once the background was removed, the peak positions were then determined by a centroid fitting function. These positions were then refined with the aid of a least squares process that fits the individual peaks to a split Pearson VII function. Wide angle XRPD measurements were performed over the angular range of 10° to 60° using coarse slit sizes and a step size of 0.05° and a counting time of 24 hours per sample. Under these experimental conditions, the minimum detection level is estimated to be about 0.5%.

Example 1

Synthesis of Polyorganosiloxanes

One or more organoalkoxysilanes (all from Gelest Inc., Morrisville, Pa. or United Chemical Technologies, INC., Bristol, Pa.) were mixed with ethanol (anhydrous, J. T. Baker, Phillipsburgh, N.J.) and 0.1 N hydrochloric acid (Aldrich, Milwaukee, Wis.) in a flask. The resulting solution was agitated and refluxed for 16 hours in an atmosphere of argon or nitrogen. Alcohol was removed from the flask by distillation at atmospheric pressure. Residual alcohol and volatile species were removed by heating at 95-120° C. for 1-2 hours in a sweeping stream of argon or nitrogen. The resulting polyorganoalkoxysiloxanes were clear viscous liquids. The chemical formulas are listed in Table 1 for the organoalkoxysilanes used to make the product polyorganoalkoxysiloxanes (POS). Specific amounts are listed in Table 2 for the starting materials used to prepare these products.

TABLE 1

| Product | Organoalkoxysilane A Chemical Formula | Organoalkoxysilane or Alkoxysilane B Chemical Formula | Organoalkoxysilan C Chemical Formula |
|---|---|---|---|
| 1a | $(CH_3CH_2O)_3Si(CH_2)_2Si(OCH_2CH_3)_3$ | — | — |
| 1b, c | $(CH_3CH_2O)_3Si(CH_2)_2Si(OCH_2CH_3)_3$ | $CH_3CH_2Si(OCH_2CH_3)_3$ | — |
| 1d, e | $(CH_3CH_2O)_3Si(CH_2)_2Si(OCH_2CH_3)_3$ | $C_6H_5Si(OCH_2CH_3)_3$ | — |
| 1f | $(CH_3CH_2O)_3Si(CH_2)_2Si(OCH_2CH_3)_3$ | $(CH_3CH_2)_2Si(OCH_2CH_3)_2$ | — |
| 1g, h | $(CH_3CH_2O)_3Si(CH_2)_2Si(OCH_2CH_3)_3$ | $HS(CH_2)_3Si(OCH_2CH_3)_3$ | — |
| 1i | $(CH_3CH_2O)_3Si(CH_2)_2Si(OCH_2CH_3)_3$ | $CH_3Si(OCH_2CH_3)_3$ | — |

TABLE 1-continued

| Product | Organoalkoxysilane A Chemical Formula | Organoalkoxysilane or Alkoxysilane B Chemical Formula | Organoalkoxysilan C Chemical Formula |
|---|---|---|---|
| 1j | $(CH_3CH_2O)_3Si(CH_2)_2Si(OCH_2CH_3)_3$ | $H_2C=CHSi(OCH_2CH_3)_3$ | — |
| 1k | $(CH_3CH_2O)_3Si(CH_2)_2Si(OCH_2CH_3)_3$ | $CH_3(CH_2)_5Si(OCH_3)_3$ | — |
| 1l | $(CH_3CH_2O)_3Si(CH_2)_2Si(OCH_2CH_3)_3$ | $CH_3(CH_2)_5Si(OCH_3)_3$ | $C_6H_5Si(OCH_2CH_3)_3$ |
| 1m | $(CH_3CH_2O)_3Si(CH_2)_2Si(OCH_2CH_3)_3$ | $(CH_3O)_3Si(CH_2)_2C_6H_4(CH_2)_2Si(OCH_3)_3$ | — |
| 1n | $(CH_3CH_2O)_3Si(CH_2)_2Si(OCH_2CH_3)_3$ | $Cl(CH_2)_3Si(OCH_3)_3$ | — |
| 1o | $(CH_3CH_2O)_3Si(CH_2)_2Si(OCH_2CH_3)_3$ | $C_6H_5(CH_2)_2Si(OCH_3)_3$ | — |
| 1p | $(CH_3CH_2O)_3Si(CH_2)_2Si(OCH_2CH_3)_3$ | $CH_3(CH_2)_{17}Si(OCH_3)_3$ | — |
| 1q | $(CH_3CH_2O)_3Si(CH_2)_2Si(OCH_2CH_3)_3$ | $CH_3(CH_2)_7Si(OCH_3)_3$ | — |
| 1r | $(CH_3CH_2O)_3Si(CH_2)_2Si(OCH_2CH_3)_3$ | $CF_3(CH_2)_2Si(OCH_3)_3$ | — |
| 1s | $(CH_3CH_2O)_3Si(CH_2)_2Si(OCH_2CH_3)_3$ | $FSi(OCH_2CH_3)_3$ | — |
| 1t | $(CH_3CH_2O)_3Si(CH_2)_2Si(OCH_2CH_3)_3$ | $(CH_3CH_2O)_3SiCH=CHSi(OCH_2CH_3)_3$ | — |
| 1u | $(CH_3CH_2O)_3Si(CH_2)_2Si(OCH_2CH_3)_3$ | $CH_3(CN)CH(CH_2)_2Si(OCH_2CH_3)_3$ | — |
| 1v, w, x | $(CH_3CH_2O)_3Si(CH_2)_2Si(OCH_2CH_3)_3$ | $Si(OCH_2CH_3)_4$ | — |

TABLE 2

| Product | Organosilane A (g) | Organosilane or Alkoxysilane B (g) | Organosilane C (g) | 0.1N HCl (g) | Ethanol (g) | % C | Viscosity (cP) |
|---|---|---|---|---|---|---|---|
| 1a | 519.0 | 0 | 0 | 134.0 | 653.0 | 34.7 | 70 |
| 1b | 240.0 | 16.3 | 0 | 23.7 | 115.3 | 36.0 | 66 |
| 1c | 1,200 | 162.7 | 0 | 126.0 | 613.2 | 33.9 | 81 |
| 1d | 1,364 | 93.0 | 0 | 126.0 | 613.2 | 34.5 | 210 |
| 1e | 1,200 | 203.4 | 0 | 126.0 | 613.2 | 36.4 | 244 |
| 1f | 483.5 | 24.1 | 0 | 42.0 | 217.7 | 36.5 | 53 |
| 1g | 483.5 | 33.9 | 0 | 42.7 | 217.7 | 36.2 | 274 |
| 1h | 398.9 | 73.6 | 0 | 39.2 | 217.7 | 37.4 | 62 |
| 1i | 483.5 | 24.3 | 0 | 42.7 | 217.7 | 36.7 | 55 |
| 1j | 483.5 | 26.0 | 0 | 42.7 | 217.7 | 36.0 | 52 |
| 1k | 483.5 | 28.1 | 0 | 42.7 | 217.7 | 38.1 | 62 |
| 1l | 483.5 | 14.1 | 16.4 | 38.5 | 212.3 | 36.9 | 83 |
| 1m | 506.6 | 26.8 | 0 | 44.7 | 217.7 | 36.7 | 140 |
| 1n | 483.5 | 32.8 | 0 | 42.7 | 217.7 | 35.5 | 81 |
| 1o | 483.5 | 30.9 | 0 | 42.7 | 178.5 | 39.8 | 72 |
| 1p | 506.7 | 26.8 | 0 | 43.7 | 178.5 | 39.8 | 83 |
| 1q | 483.5 | 32.0 | 0 | 42.7 | 178.5 | 39.5 | 61 |
| 1r | 369.1 | 22.6 | 0 | 29.9 | 166.2 | 37.5 | 71 |
| 1s | 506.6 | 13.0 | 0 | 43.7 | 217.7 | 37.5 | 103 |
| 1t | 436.3 | 21.7 | 0 | 38.5 | 187.5 | 36.0 | 101 |
| 1u | 483.5 | 33.5 | 0 | 31.0 | 178.5 | 37.0 | 63 |
| 1v | 290.1 | 142.0 | 0 | 37.9 | 217.7 | 35.3 | 65 |
| 1w | 398.9 | 78.1 | 0 | 41.0 | 217.7 | 36.9 | 50 |
| 1x | 478.7 | 31.3 | 0 | 43.2 | 217.7 | 35.6 | 290 |

Example 2

Synthesis of Porous Hybrid Freshmade Particles with a Constant Base:POS Weight Ratio An aqueous mixture of Triton® X-100 (X100, Dow Chemical, Midland, Mich.), deionized water and either ethanol (EtOH; anhydrous, J. T. Baker, Phillipsburgh, N.J.) or tert-butyl alcohol (BuOH; J. T. Baker, Phillipsburgh, N.J.) was heated at 55° C. for 0.5 h. In a separate flask, an oil phase solution was prepared by mixing 1a from Example 1 for 0.5 hours with one of the following reagents: toluene (Tol; HPLC grade, J. T. Baker, Phillipsburgh, N.J.), mesitylene (Mes; Aldrich, Milwaukee, Wis.). Under rapid agitation, the oil phase solution was added into the EtOH/water/X100 mixture and was emulsified in the aqueous phase using a rotor/stator mixer (Model 100L, Charles Ross & Son Co., Hauppauge, N.Y.). Thereafter, 30% ammonium hydroxide (NH$_4$OH; J. T. Baker, Phillipsburgh, N.J.) was added into the emulsion. Suspended in the solution, the gelled product was transferred to a flask and stirred at 55° C. for 16 h. Formed particles in the resulting suspension were isolated by centrifugation (Thermo EXD, 4×1 L bottle centrifuge, Milford, Mass.) and were washed by twice resuspending the particles in water before centrifugation. The particles were then dispersed in a 1.3 M HCl solution (8.4-9.0 mL/g) and were refluxed for 2-3 days. Reactions 2a, 2b, 2c, 2d employed an acid reflux of three days and all remaining reactions employed an acid reflux of two days. The resulting particles were isolated on 0.5 μm filtration paper and washed consecutively with copious amounts of water and acetone (HPLC grade, J. T. Baker, Phillipsburgh, N.J.). The particles were then dried at 80° C. under vacuum for 16 hours. Specific amounts of starting materials used to prepare these products are listed in Table 3. The % C values, specific surface areas (SSA), specific pore volumes (SPV) and average pore diameters (APD) of these materials are listed in Table 3.

This set of experiments used a constant Base:POS weight ratio (denoted B:POS, 0.7) and explored a variety of different weight ratios of porogen:POS (denoted P:POS ratio) and cosolvent:POS (denoted C:POS ratio) from 0.2-0.5 and 0.6-1.2, respectively. The use of lower P:POS ratios (reaction 2a, 0.2) led to smaller SPV (0.56 cm$^3$/g) than reactions using higher P:POS ratios (reaction 2f, 0.5; SPV=1.08 cm³/g). By keeping the B:POS, P:POS and C:POS ratios constant, we could scale reactions up (reaction 2h) resulting in similar SPV attributes with reactions performed on a smaller scale (reaction 2a). The use of different cosolvents (reaction 2e) and porogens (reactions 2i, 2j) could also be used to prepare freshmade particles.

TABLE 3

| Product | POS 1a (g) | Porogen (P) | P (g) | Water (g) | Cosolvent (C) | C (g) | X100 (g) | NH₄OH (B) (mL) | B:POS wt ratio | P:POS wt ratio | C:POS wt ratio | % C | SSA (m²/g) | SPV (cm³/g) | APD (Å) |
|---|---|---|---|---|---|---|---|---|---|---|---|---|---|---|---|
| 2a | 58 | Mes | 10.5 | 280 | EtOH | 52 | 5.6 | 44 | 0.7 | 0.2 | 0.9 | 15.2 | 492 | 0.56 | 47 |
| 2b | 58 | Mes | 15.8 | 280 | EtOH | 52 | 5.6 | 44 | 0.7 | 0.3 | 0.9 | 16.7 | 630 | 0.82 | 52 |
| 2c | 58 | Mes | 10.5 | 280 | EtOH | 36 | 5.6 | 44 | 0.7 | 0.2 | 0.6 | 16.3 | 1005 | 0.56 | 28 |
| 2d | 58 | Mes | 10.5 | 280 | EtOH | 68 | 5.6 | 44 | 0.7 | 0.2 | 1.2 | 17.7 | 1038 | 0.87 | 33 |
| 2e | 58 | Mes | 10.5 | 280 | BuOH | 52 | 5.6 | 44 | 0.7 | 0.2 | 0.9 | 16.5 | 788 | 0.51 | 30 |
| 2f | 58 | Mes | 31.5 | 280 | EtOH | 52 | 5.6 | 44 | 0.7 | 0.5 | 0.9 | 17.1 | 690 | 1.08 | 65 |
| 2g | 58 | Mes | 21.0 | 280 | EtOH | 52 | 5.6 | 44 | 0.7 | 0.4 | 0.9 | 17.4 | 657 | 1.02 | 65 |
| 2h | 464 | Mes | 84.0 | 2,880 | EtOH | 416 | 44.8 | 352 | 0.7 | 0.2 | 0.9 | 15.0 | 739 | 0.51 | 32 |
| 2i | 58 | Tol | 10.5 | 280 | EtOH | 52 | 5.6 | 44 | 0.7 | 0.2 | 0.9 | 16.1 | 693 | 0.36 | 31 |
| 2j | 58 | Tol | 21.0 | 280 | EtOH | 52 | 5.6 | 44 | 0.7 | 0.4 | 0.9 | 17.1 | 791 | 0.65 | 36 |

Example 3

Synthesis of Porous Hybrid Freshmade Particles with a Mixed Surfactant Composition and Constant Porogen:POS Weight Ratio An aqueous mixture of Triton® X-100 (X100, Dow Chemical, Midland, Mich.), sodium dodecyl sulfate (SDS, J. T. Baker, Phillipsburgh, N.J. or Sigma Chemical Co., St. Louis, Mo.), deionized water and ethanol (EtOH, anhydrous, J. T. Baker, Phillipsburgh, N.J.) was heated at 55° C. for 0.5 h. In a separate flask, an oil phase solution was prepared by mixing 1a from Example 1 for 0.5 hours with mesitylene (Mes; Aldrich, Milwaukee, Wis.). Under rapid agitation, the oil phase solution was added into the EtOH/water/X100/SDS mixture and was emulsified in the aqueous phase using a rotor/stator mixer (Model 100L, Charles Ross & Son Co., Hauppauge, N.Y.). Thereafter, 30% ammonium hydroxide (NH₄OH; J. T. Baker, Phillipsburgh, N.J.) was added into the emulsion. Suspended in the solution, the gelled product was transferred to a flask and stirred at 55° C. for 16 h. Formed particles in the resulting suspension were isolated by centrifugation (Thermo EXD, 4×1 L bottle centrifuge, Milford, Mass.) and were washed by twice resuspending the particles in water before centrifugation. The particles were then dispersed in a 1.3 M HCl solution (8.4-9.0 mL/g) and were refluxed for 2-4 days. Reactions 3c and 3d employed an acid reflux of four days, reactions 3a, 3e and 3f employed an acid reflux of three days and all remaining reactions employed and acid reflux of two days. Reaction 3j and 3k had the emulsion contained in a single reaction flask and the acid reflux was performed in two separate reaction flasks. The resulting particles were isolated on 0.5 μm filtration paper and washed consecutively with copious amounts of water and acetone (HPLC grade, J. T. Baker, Phillipsburgh, N.J.). The particles were then dried at 80° C. under vacuum for 16 hours. Specific amounts of starting materials used to prepare these products are listed in Table 4. The specific surface areas (SSA), specific pore volumes (SPV), average pore diameters (APD), and the % C of these materials are listed in Table 4.

This set of experiments used a constant Porogen:POS weight ratio (denoted P:POS, 0.4) and explored a variety of different weight ratios of Base:POS (denoted B:POS ratio) and cosolvent:POS (denoted C:POS ratio) from 0.9-3.4 and 0.0-2.6, respectively. Four reactions from this set of experiments failed to produce well-formed particulate products: reaction 3l did not use SDS addition; reaction 3m did not use EtOH as a cosolvent; reactions 3n and 3o both used higher B:POS ratios (3.4) and surfactant concentration and reaction 3n did not incorporate the use of SDS. It was therefore concluded from these experiments that the use of SDS as a cosurfactant, ethanol as a cosolvent and proper B:POS ratio are advantageous for the formation of spherical particulate products.

TABLE 4

| Product | POS 1a (g) | Mes (P) (g) | Water (g) | EtOH (C) (g) | X100 (g) | SDS (g) | NH₄OH (B) (mL) | B:POS wt ratio | P:POS wt ratio | C:POS wt ratio | % C | SSA (m²/g) | SPV (cm³/g) | APD (Å) |
|---|---|---|---|---|---|---|---|---|---|---|---|---|---|---|
| 3a | 29 | 12 | 317 | 15 | 9.0 | 1.0 | 41 | 1.3 | 0.4 | 0.5 | 15.9 | 788 | 0.58 | 34 |
| 3b | 29 | 12 | 317 | 1.0 | 18 | 1.0 | 41 | 1.3 | 0.4 | 0.5 | 17.4 | 1,189 | 0.99 | 35 |
| 3c | 22 | 9.0 | 351 | 53 | 5.1 | 1.0 | 23 | 0.9 | 0.4 | 2.4 | 17.1 | 487 | 0.73 | 69 |
| 3d | 22 | 9.0 | 351 | 53 | 5.1 | 1.0 | 23 | 0.9 | 0.4 | 2.4 | 16.6 | 419 | 0.64 | 70 |
| 3e | 23 | 9.4 | 380 | 19 | 9.3 | 1.0 | 23 | 0.9 | 0.4 | 0.8 | 16.6 | 441 | 0.65 | 66 |
| 3f | 23 | 9.4 | 325 | 51 | 9.3 | 1.0 | 46 | 1.8 | 0.4 | 2.2 | 15.8 | 769 | 0.50 | 31 |
| 3g | 23 | 9.4 | 325 | 30 | 9.3 | 1.0 | 46 | 1.8 | 0.4 | 1.3 | 16.2 | 853 | 0.53 | 29 |
| 3h | 23 | 9.4 | 325 | 40 | 9.3 | 1.0 | 46 | 1.8 | 0.4 | 1.7 | 16.1 | 845 | 0.55 | 30 |
| 3i | 23 | 9.4 | 325 | 60 | 9.3 | 1.0 | 46 | 1.8 | 0.4 | 2.6 | 15.7 | 885 | 0.54 | 29 |
| 3j | 348 | 144 | 3,804 | 184 | 216 | 11.7 | 435 | 1.1 | 0.4 | 0.5 | 16.9 | 1,038 | 0.59 | 28 |
| 3k | 348 | 144 | 3,804 | 184 | 216 | 11.7 | 435 | 1.1 | 0.4 | 0.5 | 16.5 | 1,032 | 0.59 | 28 |
| 3l | 29 | 12 | 317 | 15.3 | 9 | 0 | 41 | 1.3 | 0.4 | 0.5 | — | — | — | — |
| 3m | 41 | 16.7 | 317 | 0 | 5.1 | 0.97 | 84 | 1.8 | 0.4 | 0 | — | — | — | — |

TABLE 4-continued

| Product | POS 1a (g) | Mes (P) (g) | Water (g) | EtOH (C) (g) | X100 (g) | SDS (g) | NH$_4$OH (B) (mL) | B:POS wt ratio | P:POS wt ratio | C:POS wt ratio | % C | SSA (m$^2$/g) | SPV (cm$^3$/g) | APD (Å) |
|---|---|---|---|---|---|---|---|---|---|---|---|---|---|---|
| 3n | 22 | 9 | 268 | 52.9 | 27.8 | 0 | 84 | 3.4 | 0.4 | 2.4 | — | — | — | — |
| 3o | 22 | 9 | 268 | 52.9 | 27.8 | 0.97 | 84 | 3.4 | 0.4 | 2.4 | — | — | — | — |

Example 4

Synthesis of Porous Freshmade Hybrid Particles with a Two-part Base Addition

An aqueous mixture of Triton® X-100 (X100, Dow Chemical, Midland, Mich.), Sodium Dodecyl Sulfate (SDS, J. T. Baker, Phillipsburgh, N.J. or Sigma Chemical Co., St. Louis, Mo.), deionized water and ethanol (EtOH, anhydrous, J. T. Baker, Phillipsburgh, N.J.) was heated at 65° C. for 0.5 h. In a separate flask, an oil phase solution was prepared by mixing 1a from Example 1 for 0.5 hours with mesitylene (Mes; Aldrich, Milwaukee, Wis.). Under rapid agitation, the oil phase solution was added into the EtOH/water/X100/SDS mixture and was emulsified in the aqueous phase using a rotor/stator mixer (Model 100L, Charles Ross & Son Co., Hauppauge, N.Y.). Thereafter, one of 30% ammonium hydroxide (NH$_4$OH; J. T. Baker, Phillipsburgh, N.J.) was added into the emulsion. Suspended in the solution, the gelled product was transferred to a flask and stirred at 65° C. for 16 h. The second half of the 30% ammonium hydroxide was added and the reaction was mixed at 65° C. for an additional 24 hours. Formed particles in the resulting suspension were isolated by centrifugation (Thermo EXD, 4×1 L bottle centrifuge, Milford, Mass.) and were washed by twice resuspending the particles in water before centrifugation (as was performed for reactions 4a, 4b, 4c). Alternatively, particles were isolated on 0.5 μm filtration paper and washed twice with water. The particles were then dispersed in a 1.3 M HCl solution (8.4-9.0 mL/g) and were refluxed for 1.5-4 days. Reaction 4j employed an acid reflux of four days, reactions 4a, 4b, 4d, 4f, 4o, employed an acid reflux of three days, reaction 4p employed an acid reflux of 1.5 days and all remaining reactions employed an acid reflux of two days. The resulting particles were isolated on 0.5 μm filtration paper and were washed consecutively with copious amounts of water and acetone (HPLC grade, J. T. Baker, Phillipsburgh, N.J.). The particles were then dried at 80° C. under vacuum for 16 hours. Specific amounts of starting materials used to prepare these products are listed in Table 5. The specific surface areas (SSA), specific pore volumes (SPV), average pore diameters (APD) and the % C of these materials are listed in Table 5.

This set of experiments used varied Porogen:POS weight ratio (denoted P:POS), combined two day Base:POS weight ratio (denoted B:POS ratio) and cosolvent:POS weight ratio (denoted C:POS ratio) from 0-0.8, 0.8-1.8 and 0.3-1.3, respectively. Reactions that formed products 4q-4s were aimed at determining the importance of surfactants and porogens use on particle morphology and pore properties. Product 4q resulted from a reaction that used surfactants (X100 and SDS) but did not employ the use of a porogen. Product 4r came from a reaction that did not use surfactants but used mesitylene as the porogen. Product 4s resulted from a reaction that did not employ the use of surfactants and did not employ the use of a porogen. The particle morphology of 4q was spherical and similar to other reaction products, while the two reactions that did not use surfactants (4r and 4s) resulted in non-spherical products, as determined by SEM. Product 4r, which resulted from a reaction that used a porogen, had a higher SPV (0.51 cm$^3$/g) than products 4q and 4s (0.26 cm$^3$/g and 0.29 cm$^3$/g, respectively), which came from reactions that did not employ the use of a porogen. It was concluded that the use of surfactants are advantageous for the formation of highly spherical products, and the use of porogens impact the SPV of these materials.

In order to further explore the impact of porogens, a comparison was made of products 4a, 4c, 4d, 4e, 4j and 4q. These reactions were performed using similar reaction conditions, with the exception of modification in the P:POS ratio. A linear trend (R$^2$=0.9578) with increasing SPV with increasing P:POS ratio was determined. The reaction with the highest P:POS ratio (reaction 4c, 0.8) had the highest SPV (0.84 cm$^3$/g). The reaction with the lowest P:POS ratio (reaction 4q, 0) had the lowest SPV (0.26 cm$^3$/g). Products of these reactions were highly spherical as shown by SEM for product 4g (FIG. 1).

TABLE 5

| Product | POS 1a (g) | Mes (P) (g) | Water (g) | EtOH (C) (g) | X100 (g) | SDS (g) | NH$_4$OH (B) (mL) | B:POS wt ratio | P:POS wt ratio | C:POS wt ratio | % C | SSA (m$^2$/g) | SPV (cm$^3$/g) | APD (Å) |
|---|---|---|---|---|---|---|---|---|---|---|---|---|---|---|
| 4a | 23 | 9.4 | 361 | 15 | 9.3 | 0.97 | 46 | 1.8 | 0.4 | 0.7 | 16.8 | 994 | 0.54 | 28 |
| 4b | 23 | 9.4 | 346 | 30 | 9.3 | 0.97 | 46 | 1.8 | 0.4 | 1.3 | 16.7 | 995 | 0.56 | 28 |
| 4c | 23 | 18.2 | 361 | 15 | 9.3 | 0.97 | 46 | 1.8 | 0.8 | 0.7 | 16.1 | 922 | 0.84 | 36 |
| 4d | 23 | 14.1 | 361 | 15 | 9.3 | 0.97 | 46 | 1.8 | 0.6 | 0.7 | 17.3 | 941 | 0.63 | 30 |
| 4e | 23 | 14.1 | 361 | 15 | 9.3 | 0.97 | 46 | 1.8 | 0.6 | 0.7 | 17.1 | 1,016 | 0.76 | 31 |
| 4f | 278 | 169.4 | 4,331 | 180 | 111.2 | 11.69 | 552 | 1.8 | 0.6 | 0.7 | 18.6 | 1,103 | 1.28 | 40 |
| 4g | 277 | 169.4 | 4,331 | 180 | 111.2 | 11.69 | 552 | 1.8 | 0.6 | 0.7 | 17.7 | 1,021 | 0.81 | 33 |
| 4h | 277 | 169.4 | 4,331 | 180 | 111.2 | 11.69 | 552 | 1.8 | 0.6 | 0.7 | 16.9 | 949 | 0.80 | 34 |
| 4i | 277 | 169.4 | 4,331 | 180 | 111.2 | 11.69 | 552 | 1.8 | 0.6 | 0.7 | 16.9 | 950 | 0.85 | 35 |
| 4j | 23 | 14.1 | 361 | 15 | 9.3 | 0.97 | 46 | 1.8 | 0.6 | 0.7 | 16.1 | 849 | 0.69 | 34 |
| 4k | 30 | 18.4 | 361 | 15 | 9.3 | 0.97 | 46 | 1.4 | 0.6 | 0.5 | 16.0 | 885 | 0.79 | 36 |
| 4l | 40 | 24.5 | 361 | 15 | 9.3 | 0.97 | 46 | 1.0 | 0.6 | 0.4 | 17.1 | 871 | 0.92 | 40 |
| 4m | 50 | 30.6 | 361 | 15 | 9.3 | 0.97 | 46 | 0.8 | 0.6 | 0.3 | 17.1 | 893 | 0.97 | 42 |
| 4n | 50 | 30.6 | 361 | 15 | 20.1 | 0.97 | 46 | 0.8 | 0.6 | 0.3 | 18.6 | 1,010 | 0.72 | 31 |
| 4o | 50 | 30.6 | 361 | 15 | 9.3 | 0.97 | 98 | 1.8 | 0.6 | 0.3 | 17.7 | 1,024 | 1.23 | 44 |
| 4p | 50 | 30.6 | 361 | 15 | 20.1 | 0.97 | 98 | 1.8 | 0.6 | 0.3 | 18.3 | 1,127 | 1.35 | 42 |

TABLE 5-continued

| Product | POS 1a (g) | Mes (P) (g) | Water (g) | EtOH (C) (g) | X100 (g) | SDS (g) | NH₄OH (B) (mL) | B:POS wt ratio | P:POS wt ratio | C:POS wt ratio | % C | SSA (m²/g) | SPV (cm³/g) | APD (Å) |
|---|---|---|---|---|---|---|---|---|---|---|---|---|---|---|
| 4q | 23 | 0 | 361 | 15 | 9.3 | 0.97 | 46 | 1.8 | 0 | 0.7 | 16.4 | 517 | 0.26 | 34 |
| 4r | 23 | 14.1 | 361 | 15 | 0 | 0 | 46 | 1.8 | 0.6 | 0.7 | 17.8 | 308 | 0.51 | 119 |
| 4s | 23 | 0 | 361 | 15 | 0 | 0 | 46 | 1.8 | 0 | 0.7 | 17.0 | 442 | 0.29 | 53 |

Example 5

Hydrothermal Processing of Porous Hybrid Particles

Although the spherical morphology and SPV of products prepared in Examples 2, 3 and 4 are comparable to many high quality, commercial packing materials used in HPLC, the APD for most of these products is lower than most commercial packing materials and is indicative of materials that have elevated micropore surface area (MSA). In order to reduce MSA and increase the APD within a more useful range for HPLC, this example illustrates the development of the use of hydrothermal treatments for these materials.

Porous particles of Examples 2, 3 and 4 were mixed with either sodium hydroxide (NaOH; Aldrich, Milwaukee, Wis.) or triethylamine (TEA; Aldrich, Milwaukee, Wis.) in a solution comprised of one or more of the following; water and methanol (MeOH; HPLC grade, J. T. Baker, Phillipsburgh, N.J.), yielding a suspension. The resultant suspension was then transferred to a stainless steel autoclave and heated to between 120-155° C. for 20-41 hours. After the autoclave cooled to room temperature the product was isolated on 0.5 μm filtration paper and washed repeatedly using water and methanol (HPLC grade, J. T. Baker, Phillipsburgh, N.J.) and then dried at 80° C. under vacuum for 16 hours. Specific hydrothermal conditions are listed in Table 6 (mL of base solution/gram of particle, concentration and pH of initial base solutions, reaction temperature, reaction hold time). The specific surface areas (SSA), specific pore volumes (SPV), average pore diameters (APD), micropore surface area (MSA) and the % C of these materials are listed in Table 6.

This set of experiments showed that a variety of reaction conditions could be used to modify the pore attributes of these materials. All products had noticeable reductions in SSA, increases in APD and no significant loss in particle morphology (as determined by SEM), when compared with the precursor materials. It was concluded that the use of hydrothermal treatment was successful in increasing the APD of these materials and reducing the MSA. The APD for these products was within a range that is comparable with commercially available HPLC packing materials. The particle morphology and MSA of these materials was within the range for materials that exhibit chromatographically enhanced pore geometries.

The importance of reaction temperature can be seen by comparing products 5f and 5k, as well as products 5d and 5g. Products 5f and 5k resulted from reactions that used similar reaction conditions and the same feed material (4g), but differed in reaction temperature. Product 5k, which used the higher temperature reaction (150° C.) resulted in a product with decreased SSA and increased APD, when compared to the lower temperature reaction (5f, 130° C.). In an analogous comparison, products 5d and 5g resulted from reactions that used similar reaction conditions and the same feed material (3j), but differed in reaction temperature. The higher temperature reaction (5g, 140° C.) resulted in a product with decreased SSA and increased APD, when compared to the lower temperature reaction (5d, 120° C.).

TABLE 6

| Product | Precursor | Solvent Amount (mL/g) | MeOH Vol % | Base | Conc. (Molarity) | pH | Time (h) | Temp. (° C.) | % C | SSA (m²/g) | SPV (cc/g) | APD (Å) | MSA (m²/g) |
|---|---|---|---|---|---|---|---|---|---|---|---|---|---|
| 5a | 2h | 20 | 0 | NaOH | 0.1 | 11.8 | 20 | 155 | 10.7 | 49 | 0.22 | 92 | 9 |
| 5b | 2g | 20 | 0 | NaOH | 0.5 | 12.6 | 20 | 120 | 15.9 | 166 | 0.85 | 202 | 41 |
| 5c | 2g | 20 | 0 | NaOH | 1.0 | >12.6 | 20 | 120 | 14.9 | 189 | 1.28 | 268 | 55 |
| 5d | 3j | 5 | 0 | TEA | 0.5 | 12.3 | 41 | 120 | 15.8 | 216 | 0.76 | 78 | 49 |
| 5e | 3k | 5 | 10 | TEA | 0.5 | 11.4 | 41 | 120 | 16.8 | 266 | 0.47 | 66 | 76 |
| 5f | 4f | 5 | 0 | TEA | 0.5 | 12.3 | 41 | 130 | 15.7 | 434 | 1.22 | 95 | 16 |
| 5g | 3j | 5 | 0 | TEA | 0.5 | 12.3 | 41 | 140 | 16.6 | 144 | 0.44 | 103 | 27 |
| 5h | 4g | 5 | 0 | TEA | 0.5 | 12.3 | 41 | 145 | 15.1 | 206 | 0.73 | 127 | 30 |
| 5i | 4h, 4i | 5 | 0 | TEA | 0.5 | 12.3 | 41 | 145 | 15.9 | 212 | 0.75 | 128 | 33 |
| 5j | 4g | 5 | 0 | TEA | 0.5 | 12.3 | 41 | 145 | 15.5 | 183 | 0.72 | 143 | 29 |
| 5k | 4f | 5 | 0 | TEA | 0.5 | 12.3 | 41 | 150 | 14.7 | 249 | 1.18 | 175 | 42 |

Example 6

Comparison Example of Controlled Pore Ordered Mesoporous Particles

Surfactant extracted, porous hybrid particles of the formula $O_{1.5}SiCH_2CH_2SiO_{1.5}$ were prepared following the procedure reported by Inagaki (U.S. Pat. No. 6,248,686, Sample 39). In this reaction 0.432 g of hexadecyltrimethylammonium chloride (1.35 mmol, Fluka, Aldrich, Milwaukee, Wis.), 30 g water and 1.5 g of a 6 N NaOH (Aldrich, Milwaukee, Wis.) solution were mixed in a 100 mL beaker for 2 minutes using magnetic stirring. 2.03 g of 1,2-bis(trimethoxysilyl)ethane (Gelest, Morrisville, Pa.) was then added and the reaction was vigorously stirred at ambient temperature for 3 hours. Mixing was then stopped for 14 hours and then restarted for 12.5 hours. Mixing was then stopped for 14 hours and then restarted for 6.9 hours. The product was isolated on filter paper and washed twice with 300 mL water before air drying. 1 g of this air dried product was then added to 150 mL of ethanol (J. T. Baker, Phillipsburgh, N.J.) and 3.8 g concentrated HCl (J. T. Baker, Phillipsburgh, N.J.) in a round bottom flask. The mixture was then mixed using magnetic stirring and was heated to 50° C. for 6 hours. The product 6a was isolated on filter paper and washed twice with 150 mL ethanol, before air drying overnight. This reaction was repeated at a 10-fold increased scale for additional comparison purposes (product 6b). The specific surface areas (SSA), specific pore volumes (SPV), average pore diameters (APD) and the % C of these materials is provide on Table 7.

Figure 2:
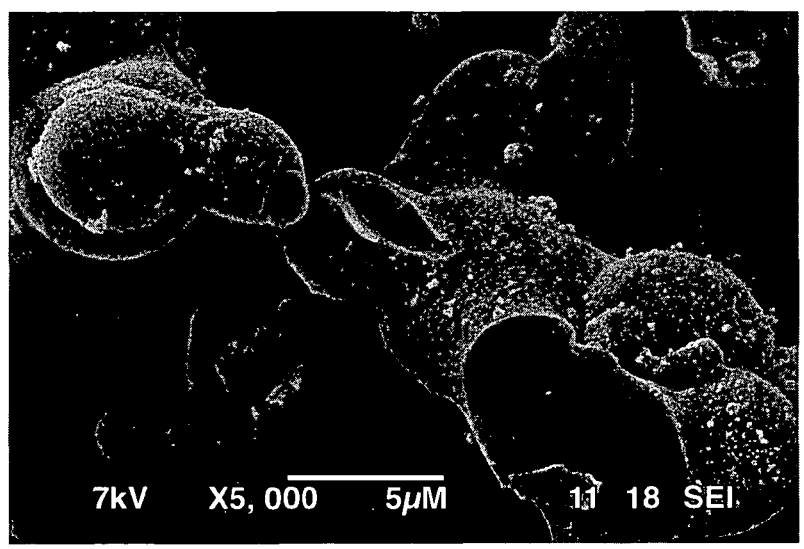
FIG. 2. SEM image of comparison product 6b; Bar=5 μm.

As shown in FIG. 2, products of this reaction are irregularly shaped materials and do not have comparable spherical morphology of materials prepared in Examples 2, 3 and 4 (compare with product 4g shown in FIG. 1). The importance of spherical particles in packing high efficiency, mechanically stable columns is well know in the field of HPLC. Products described in this example have low APD (<30 Å), which is lower than most HPLC commercial packing materials and is indicative of materials that have elevated micropore surface area (MSA).

Example 7

Comparison Example of Controlled Pore Ordered Mesoporous Particles

Figure 3:
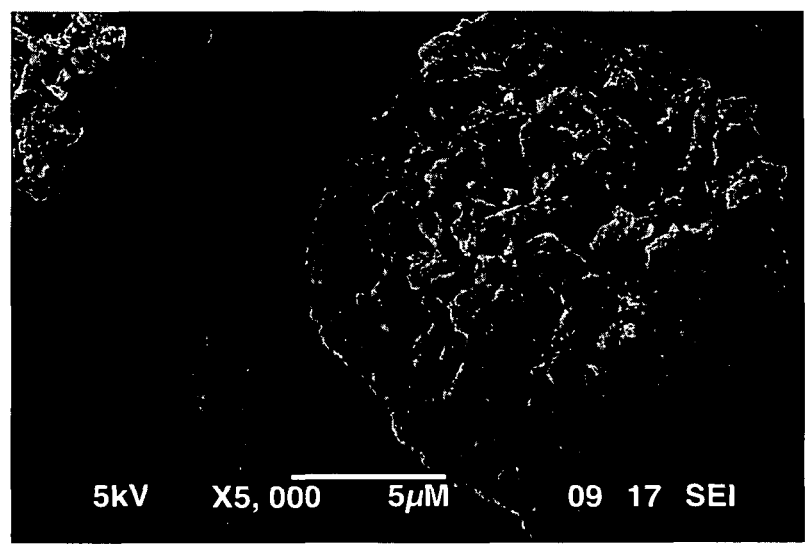
FIG. 3. SEM image of comparison product 7b; Bar=5 μm.

Surfactant extracted, porous hybrid particles of the formula $(O_{1.5}SiCH_2CH_2SiO_{1.5})_{0.2}(SiO_2)_{0.8}$ were prepared following the procedure reported by Inagaki (U.S. Pat. No. 6,248,686 B1, Sample 51). In this reaction 2.304 g of hexadecyltrimethylammonium chloride (Fluka, Aldrich, Milwaukee, Wis.), 120 g water and 6.0 g of a 6 N NaOH (Aldrich, Milwaukee, Wis.) solution were mixed in a 250 mL beaker for 2 minutes using magnetic stirring. To this beaker was added a premixed solution of 1.62 g 1,2-bis(trimethoxysilyl)ethane (Gelest, Morrisville, Pa.) and 3.65 g tetramethoxysilane (Aldrich, Milwaukee, Wis.). The reaction was vigorously stirred at ambient temperature for 3 hours. Mixing was then stopped for 14 hours and then restarted for 12.5 hours. Mixing was then stopped for 14 hours and then restarted for 6.9 hours. The product was then isolated on filter paper and washed twice with 300 mL deionized water and four times with 500 mL water before air drying. This material was then dispersed into 0.576 g hexadecyltrimethylammonium chloride in 30 g water. The pH of this mixture was measured to be 8.28. The mixture was stirred at ambient temperature for 20 hours and an additional 7 hours at 70° C. The product of this reaction was filtered and air dried overnight. 1 g of this air dried product was then added to 150 mL of ethanol (anhydrous, J. T. Baker, Phillipsburgh, N.J.) and 3.8 g concentrated HCl (J. T. Baker, Phillipsburgh, N.J.) in a round bottom flask. The mixture was then mixed using magnetic stirring and heated to 50° C. for 6 hours. The product 7a was isolated on filter paper and washed twice with 150 mL ethanol, before air drying overnight. This reaction was repeated at 3-fold increased scale for additional comparison purposes (product 7b). The specific surface areas (SSA), specific pore volumes (SPV), average pore diameters (APD), and the % C of these materials is provide on Table 7. As shown in FIG. 3, products of this reaction are irregularly shaped materials and do not have the spherical morphology of materials prepared in Examples 2, 3 and 4 (compare with product 4g shown in FIG. 1). The importance of spherical particles in packing high efficiency, mechanically stable columns is well know in the field of HPLC. Products described in this example have low APD (<40 Å), which is lower than most HPLC commercial packing materials and is indicative of materials that have elevated micropore surface area (MSA).

TABLE 7

| Product | % C | SSA ($m^2/g$) | SPV (cc/g) | APD (Å) |
|---------|------|---------------|------------|---------|
| 6a | 17.9 | 1,402 | 0.91 | 28 |
| 6b | 17.4 | 1,448 | 1.06 | 29 |
| 7a | 8.3 | 1,098 | 1.11 | 36 |
| 7b | 10.7 | 1,122 | 1.53 | 39 |

Example 8

X-Ray Powder Diffraction Analysis of Porous Hybrid Particles

Figure 4:
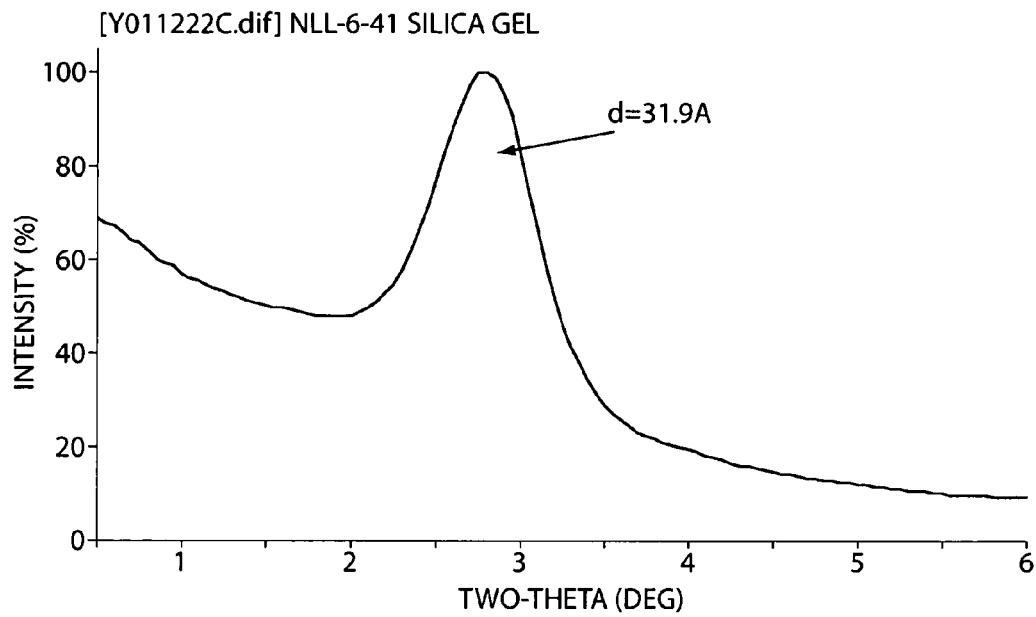
FIG. 4. Product 4g; Small Angle XRPD: Product before hydrothermal processing.
Figure 5:
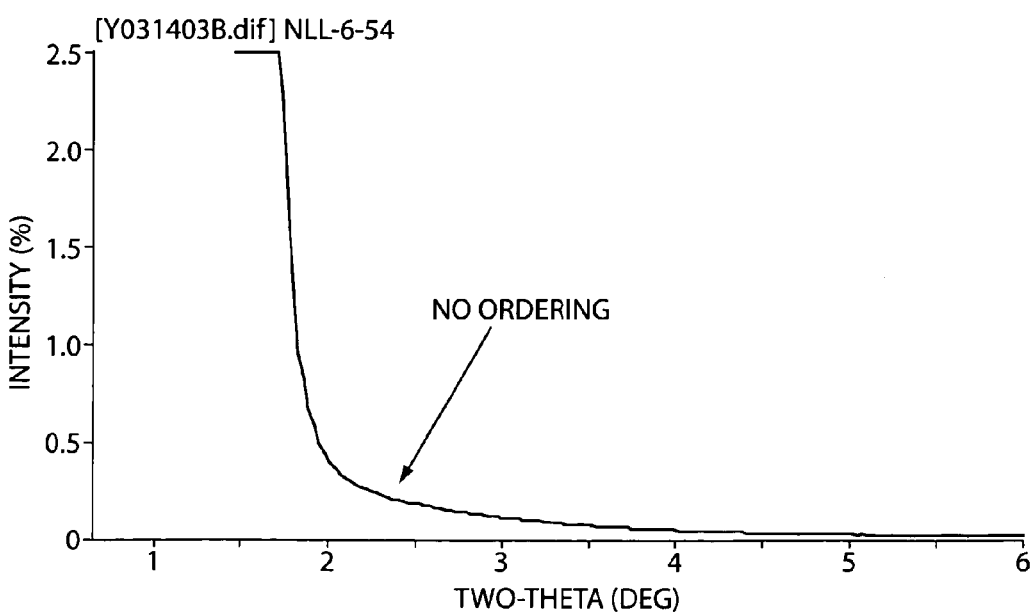
FIG. 5. Product 5h; Small Angle XRPD: Product after hydrothermal processing.

Porous particles 4g, 4h, 4i, 5f, 5h, 5i, 6a, 6b, 7a and 7b were analyzed by small angle and wide angle XRPD. Small angle XRPD data collected for samples 4g, 4h and 4i exhibited single peak maxima between 31.9-37.3 Å. The lack of any observable second or higher order peaks indicates that the periodicity is weak for these materials. The observed peak maxima data are comparable to the APD of these materials, as shown in Table 8. For example, product 4g had an APD of 33 Å, 4h had an APD of 34 Å and 4i had a APD of 35 Å. FIG. 4 shows the small angle XRPD data for compound 4g. Hydrothermally processed products 5f, 5h and 5i show no evidence of pore ordering. Accordingly, it follows that after the pore restructuring process of the instant invention, as detailed in Example 5, any weak pore ordering of these materials was removed. Considering that products 5f, 5h and 5i have increased APD (>90 Å), low MSA (<33 $m^2/g$) and d are comparable to materials that exhibit chromatographically enhanced pore geometries, the complete loss in pore ordering will not have a negative effect on chromatographic performance. FIG. 5 shows the small angle XRPD data for hydrothermally processed compound 5h.

Figure 6:
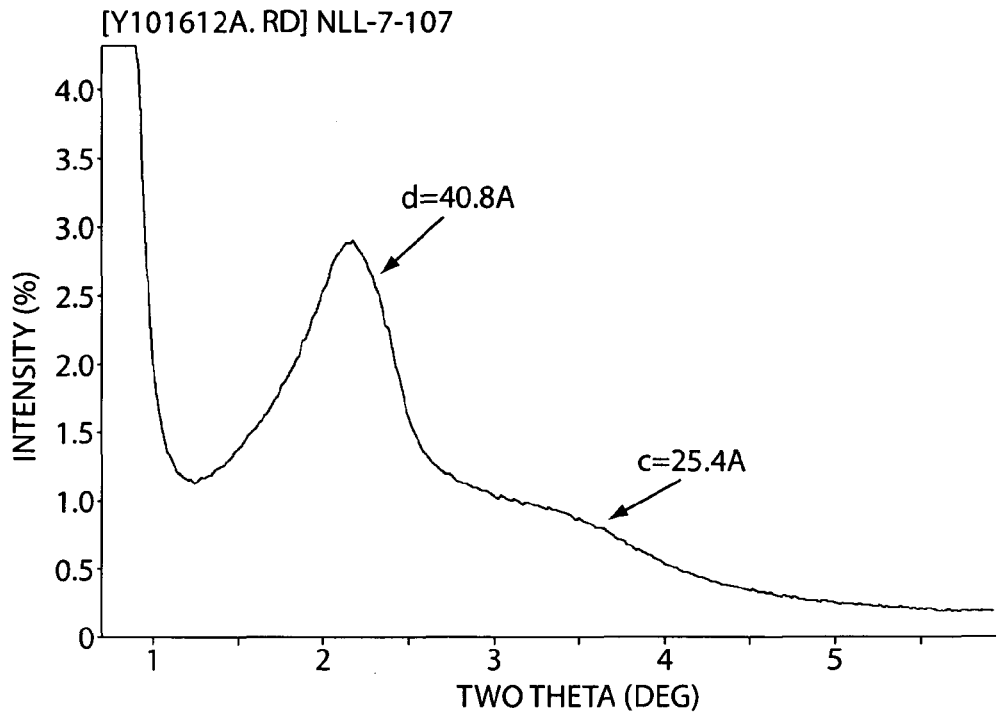
FIG. 6. Product 6b; Small Angle XRPD: Comparison pore ordered material.
Figure 7:
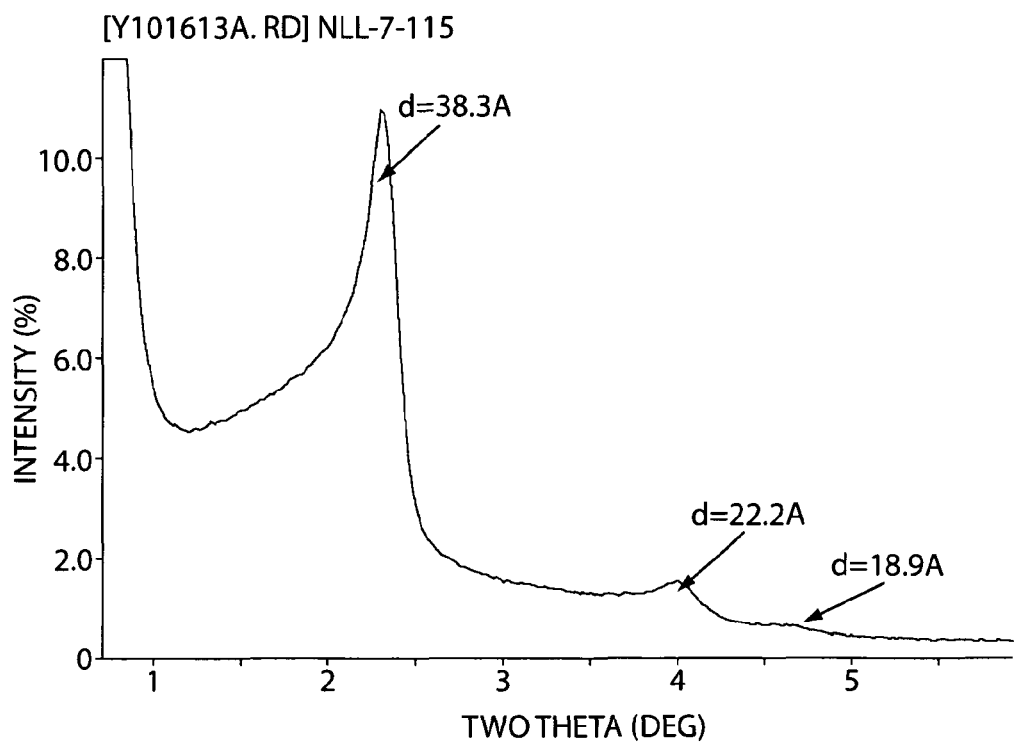
FIG. 7. Product 7b; Small Angle XRPD: Comparison pore ordered material.

Comparison samples 6a, 6b, 7a and 7b show evidence of pore ordering by small angle XRPD measurements. Products 7a and 7b show multiple peak maxima, which indicates higher level ordering. The small angle XRPD data for comparison compounds 6b and 7b are provided in FIGS. 6 and 7.

Wide angle XRPD data collected for all samples indicated no detectable amount of molecular ordering or crystallinity. Considering a wide angle XRPD minimum detection level of 0.5%, all samples can therefore be considered to be >99.5% amorphous.

TABLE 8

| Product | Small Angle XRPD Figure | Small Angle XRPD d-spacing (Å) | Wide Angle XRPD Degree of Crystallinity |
|---------|-------------------------|--------------------------------|----------------------------------------|
| 4g | 4 | 31.9 | None Detected |
| 4h |   | 34.9 | None Detected |
| 4i |   | 37.3 | None Detected |
| 5f |   | None Detected | None Detected |
| 5h | 5 | None Detected | None Detected |
| 5i |   | None Detected | None Detected |
| 6a |   | 38.2, 24.0 | None Detected |
| 6b | 6 | 40.8, 25.4 | None Detected |
| 7a |   | 40.6, 23.2, 19.9 | None Detected |
| 7b | 7 | 38.3, 22.2, 18.9 | None Detected |

Example 9

Hydrothermal Processing of Controlled Pore Ordered Mesoporous Particles

Comparison materials 6b and 7b were mixed with 0.5 M triethylamine (TEA; Aldrich, Milwaukee, Wis.) in a solution with water, yielding a suspension (pH 12.7). The resultant suspension was then transferred to a stainless steel autoclave and heated to between 150° C. for 41 hours. After the autoclave cooled to room temperature the product was isolated on 0.5 μm filtration paper and washed repeatedly using water and methanol (HPLC grade, J. T. Baker, Phillipsburgh, N.J.) and then dried at 80° C. under vacuum for 16 hours. The solvent amount, specific surface areas (SSA), specific pore volumes (SPV), average pore diameters (APD), micropore surface area (MSA) and the % C of these materials are listed in Table 9.

Product 9a and 9b had greater than 900 $m^2/g$ reduction in SSA and greater than 190 Å increase in APD, when compared to precursor 6b and 7b. The irregularly shaped morphology of 9a and 9b, as determined by SEM, was not significantly different than the precursors 6b and 7b, indicating that hydrothermal processing does not improve the morphology of irregularly shaped materials. Although the irregularly shaped morphology of 9a and 9b are not typical of materials that have chromatographically enhanced pore geometries, these products had a low MSA (<40 $m^2/g$). The MSA for precursors 6b and 7b were 1,263 $m^2/g$ and 311 $m^2/g$, respectively.

Figure 8:
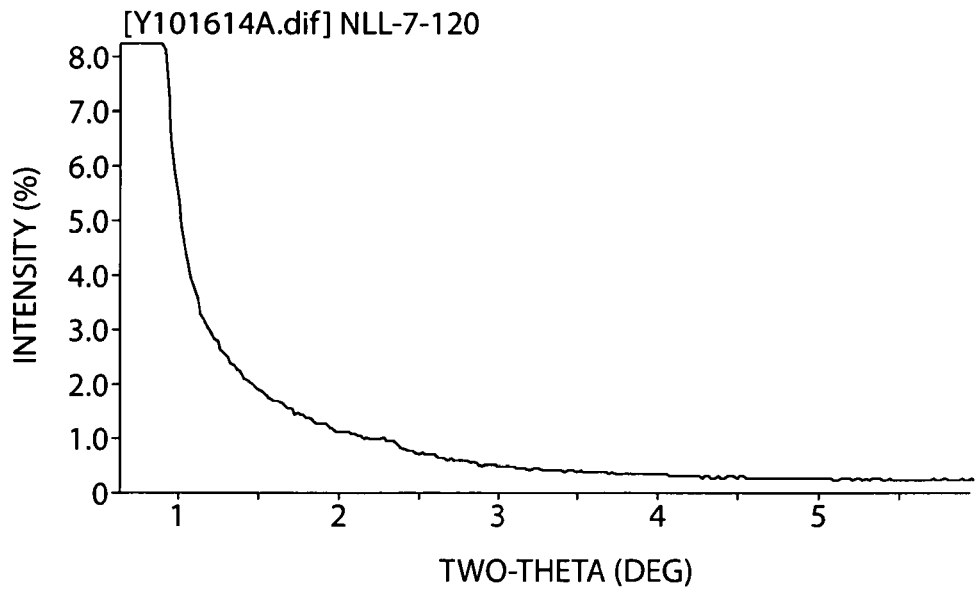
FIG. 8. Product 9a; Small Angle XRPD: Comparison product material after hydrothermal processing.
Figure 9:
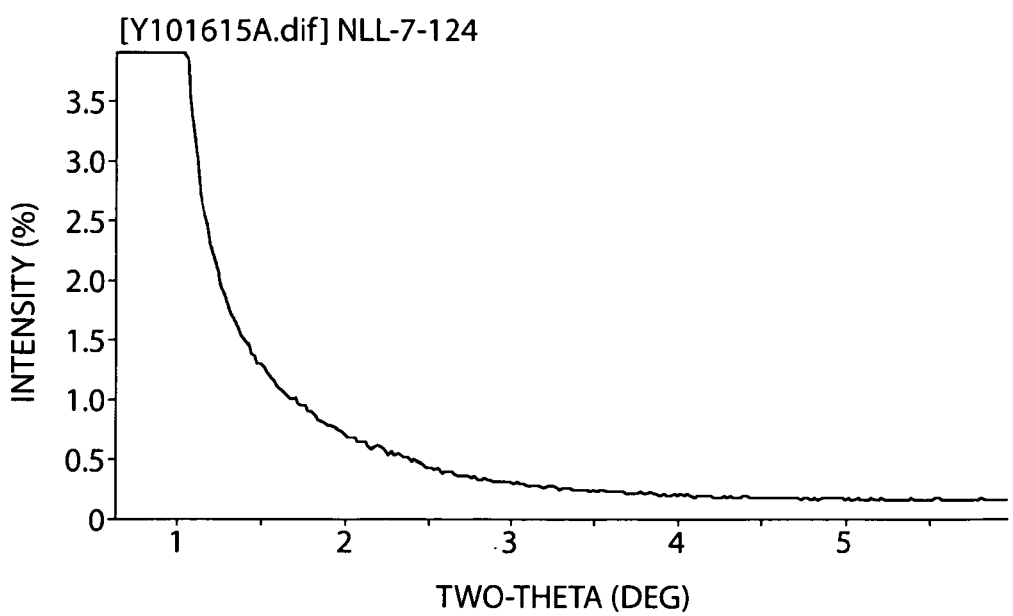
FIG. 9. Product 9b; Small Angle XRPD: Comparison product material after hydrothermal processing.

Small angle XRPD data were collected for products 9a (FIG. 8) and 9b (FIG. 9). Unlike precursor materials 6a and 7b, which had small angle peaks indicative of pore ordering, hydrothermally processed products 9a and 9b did not exhibit any pore ordering, as determined by small angle XRPD. Wide angle XRPD data collected for 9a and 9b indicated no detectable amount of molecular ordering or crystallinity. Considering a wide angle XRPD minimum detection level of 0.5%, these samples are therefore considered to be >99.5% amorphous.

TABLE 9

| Product | Precursor | Solvent Amount (mL/g) | % C | SSA ($m^2/g$) | SPV (cc/g) | APD (Å) | MSA ($m^2/g$) |
|---|---|---|---|---|---|---|---|
| 9a | 6b | 15 | 17.5 | 174 | 1.13 | 224 | 29 |
| 9b | 7b | 30 | 10.6 | 131 | 0.90 | 272 | 34 |

Example 10

Synthesis of Binary/Ternary Hybrid Freshmade Particles

An aqueous mixture of Triton® X-100 (X100, Dow Chemical, Midland, Mich.), Sodium Dodecyl Sulfate (SDS, J. T. Baker, Phillipsburgh, N.J. or Sigma Chemical Co., St. Louis, Mo.), deionized water and ethanol (EtOH, anhydrous, J. T. Baker, Phillipsburgh, N.J.) was heated at 65° C. for 0.5 h. In a separate flask, an oil phase solution was prepared by mixing POS 1b-1x from Example 1 for 0.5 hours with mesitylene (Mes; Aldrich, Milwaukee, Wis.). Under rapid agitation, the oil phase solution was added into the EtOH/water/X100/SDS mixture and was emulsified in the aqueous phase using a rotor/stator mixer (Model 100L, Charles Ross & Son Co., Hauppauge, N.Y.). Thereafter, addition of one half of 30% ammonium hydroxide ($NH_4OH$; J. T. Baker, Phillipsburgh, N.J.) was added into the emulsion. Suspended in the solution, the gelled product was transferred to a flask and stirred at 65° C. for 16 h. The second half of the 30% ammonium hydroxide was added and the reaction was mixed at 65° C. for an additional 24 hours. Formed particles in the resulting suspension were isolated on 0.5 μm filtration paper and washed twice with water. The particles were then dispersed in a 1.3 M HCl solution (8.4-9.0 mL/g) and are refluxed for 2-3 days. Reaction 10q employed an acid reflux of three days and all remaining reactions employed an acid reflux of two days. Reaction 10s was aged in water for 8 days at ambient temperature before starting the acid reflux step. The resulting particles were isolated on 0.5 μm filtration paper and were washed consecutively with copious amounts of water and acetone (HPLC grade, J. T. Baker, Phillipsburgh, N.J.). The particles were then dried at 80° C. under vacuum for 16 hours. Specific amounts of starting materials used to prepare these products are listed in Table 10. The specific surface areas (SSA), specific pore volumes (SPV), average pore diameters (APD) and the % C of these materials are listed in Table 10. The products of these reactions are spherical, as determined by SEM.

This set of experiments prepared porous hybrid particles from binary (products 10a-10i, 10k-10s) and ternary (product 10j) POS compositions. With the exception of products 10o, 10t and 10u, this set of experiments used a constant Base:POS weight ratio (denoted B:POS ratio), Porogen:POS weight ratio (denoted P:POS) and cosolvent:POS weight ratios (denoted C:POS ratio) of 1.8, 0.6 and 0.7, respectively. Product 10o was prepared using a P:POS ratio of 1.2. Product 10t and 10u were prepared using a B/POS ratio of 0.9. Products 10v, 10w, 10x, and 10y were four replicate reactions aimed at determining the reproducibility of this process. Relative standard deviations (RSD) less than 2% were determined for % C, SSA and APD data for these products, and RSD less than 5% were determined for SPV for these products.

TABLE 10

| Product | POS | POS (g) | Mes (P) (g) | Water (g) | EtOH (C) (g) | X100 (g) | SDS (g) | $NH_4OH$ (B) (mL) | % C | SSA ($m^2/g$) | SPV ($cm^3/g$) | APD (Å) |
|---|---|---|---|---|---|---|---|---|---|---|---|---|
| 10a | 1b | 23 | 14.1 | 361 | 15 | 9.3 | 0.97 | 46 | 18.4 | 816 | 0.60 | 32 |
| 10b | 1c | 23 | 14.1 | 361 | 15 | 9.3 | 0.97 | 46 | 18.1 | 849 | 0.48 | 29 |
| 10c | 1d | 23 | 14.1 | 361 | 15 | 9.3 | 0.97 | 46 | 21.8 | 1,039 | 0.62 | 29 |
| 10d | 1e | 23 | 14.1 | 361 | 15 | 9.3 | 0.97 | 46 | 24.7 | 941 | 1.13 | 83 |
| 10e | 1f | 23 | 14.1 | 361 | 15 | 9.3 | 0.97 | 46 | 18.7 | 763 | 0.51 | 33 |
| 10f | 1g | 138 | 84.7 | 2,166 | 90 | 55.6 | 5.84 | 276 | 18.4 | 1,065 | 0.93 | 34 |
| 10g | 1i | 23 | 14.1 | 361 | 15 | 9.3 | 0.97 | 46 | 16.8 | 851 | 0.66 | 33 |
| 10h | 1j | 23 | 14.1 | 361 | 15 | 9.3 | 0.97 | 46 | 17.4 | 908 | 0.60 | 30 |
| 10i | 1k | 23 | 14.1 | 361 | 15 | 9.3 | 0.97 | 46 | 19.4 | 698 | 0.38 | 33 |
| 10j | 1l | 277 | 169.4 | 4,331 | 180 | 111 | 11.7 | 552 | 21.4 | 954 | 0.89 | 36 |
| 10k | 1m | 277 | 169.4 | 4,331 | 180 | 111 | 11.7 | 552 | 20.6 | 998 | 0.82 | 33 |
| 10l | 1n | 277 | 169.4 | 4,331 | 180 | 111 | 11.7 | 552 | 18.1 | 924 | 0.81 | 34 |
| 10m | 1o | 138 | 84.7 | 2,166 | 90 | 55.6 | 5.84 | 276 | 22.0 | 911 | 0.83 | 36 |
| 10n | 1p | 138 | 84.7 | 2,166 | 90 | 55.6 | 5.84 | 276 | 25.8 | 899 | 0.69 | 31 |
| 10o | 1q | 138 | 169.4 | 2,166 | 90 | 55.6 | 5.84 | 276 | 25.6 | 960 | 1.53 | 59 |

TABLE 10-continued

| Product | POS | POS (g) | Mes (P) (g) | Water (g) | EtOH (C) (g) | X100 (g) | SDS (g) | NH4OH (B) (mL) | % C | SSA (m²/g) | SPV (cm³/g) | APD (Å) |
|---|---|---|---|---|---|---|---|---|---|---|---|---|
| 10p | 1r | 138 | 84.7 | 2,166 | 90 | 55.6 | 5.84 | 276 | 18.3 | 1,051 | 0.90 | 34 |
| 10q | 1s | 138 | 84.7 | 2166 | 90 | 55.6 | 5.84 | 276 | 20.8 | 1,080 | 0.90 | 33 |
| 10r | 1t | 277 | 169.4 | 4,331 | 180 | 111 | 11.7 | 552 | 16.9 | 1,022 | 0.99 | 36 |
| 10s | 1u | 23 | 14.1 | 361 | 15 | 9.3 | 0.97 | 46 | 19.2 | 1,134 | 0.78 | 30 |
| 10t | 1u | 277 | 169.4 | 4,331 | 180 | 111 | 11.7 | 276 | 19.9 | 846 | 0.71 | 32 |
| 10u | 1u | 383 | 243.7 | 6,000 | 249 | 154 | 16.2 | 382 | 19.2 | 879 | 0.86 | 36 |
| 10v | 1p | 350 | 214.3 | 5,479 | 228 | 141 | 14.8 | 698 | 26.2 | 958 | 0.83 | 31 |
| 10w | 1p | 350 | 214.3 | 5,479 | 228 | 141 | 14.8 | 698 | 26.0 | 941 | 0.75 | 30 |
| 10x | 1p | 350 | 214.3 | 5,479 | 228 | 141 | 14.8 | 698 | 26.0 | 941 | 0.83 | 31 |
| 10y | 1p | 350 | 214.3 | 5,479 | 228 | 141 | 14.8 | 698 | 26.0 | 932 | 0.80 | 31 |

Example 11

Hydrothermal Processing of Binary/Ternary Hybrid Fresh-made Particles

Porous particles of Examples 10 were mixed with a 0.5 M triethylamine (TEA; Aldrich, Milwaukee, Wis.) solution containing one or more of the following; water and methanol (MeOH; HPLC grade, J. T. Baker, Phillipsburgh, N.J.), yielding a suspension with a pH between 11.8-12.5. The resultant suspension was then transferred to a stainless steel autoclave and heated at 150° C. for 40-47 hours. After the autoclave cooled to room temperature the product was isolated on 0.5 μm filtration paper and washed repeatedly using water and methanol (HPLC grade, J. T. Baker, Phillipsburgh, N.J.) and then dried at 80° C. under vacuum for 16 hours. The solvent amount, methanol volume %, reaction time, specific surface areas (SSA), specific pore volumes (SPV), average pore diameters (APD), micropore surface area (MSA) and the % C of these materials are listed in Table 11.

Similar to Example 5, hydrothermal processing resulted in noticeable reductions in SSA, increases in APD and no significant loss in particle morphology (as determined by SEM), when compared with the precursor materials. It was concluded that the use of hydrothermal treatment was successful in increasing the APD of these materials and reducing the MSA. The APD for most of these products was within a range that is comparable with a commercially available packing materials for HPLC. The particle morphology and MSA for these materials was within the criteria for materials that exhibit chromatographically enhanced pore geometries.

Small angle and wide angle XRPD data were collected for samples 11a, 11g and 11f. These hydrothermally processed samples did not exhibit any pore structuring, as determined by small angle XRPD. Wide angle XRPD data collected for these samples indicated no detectable amount of molecular ordering or crystallinity. Considering a wide angle XRPD minimum detection level of 0.5%, these samples can therefore be considered to be >99.5% amorphous.

TABLE 11

| Product | Precursor | Solvent Amount (mL/g) | MeOH Vol % | Time (h) | % C | SSA (m²/g) | SPV (cc/g) | APD (Å) | MSA (m²/g) |
|---|---|---|---|---|---|---|---|---|---|
| 11a | 10a | 5 | — | 40 | 18.5 | 170 | 0.52 | 95.5 | 28 |
| 11b | 10b | 10 | — | 42 | 19.3 | 137 | 0.31 | 57 | 32 |
| 11c | 10c | 10 | — | 47 | 21.1 | 149 | 0.51 | 124 | 35 |
| 11d | 10d | 10 | — | 41 | 24.2 | 63 | 0.72 | 425 | 23 |
| 11e | 10e | 10 | — | 41 | 19.7 | 173 | 0.37 | 62 | 42 |
| 11f | 10f | 5 | — | 41 | 18.6 | 222 | 0.84 | 144 | 41 |
| 11g | 10g | 10 | — | 41 | 17.7 | 245 | 0.56 | 76 | 48 |
| 11h | 10h | 10 | — | 41 | 18.3 | 179 | 0.52 | 98 | 27 |
| 11i | 10i | 10 | — | 41 | 21.8 | 26 | 0.06 | 51 | 10 |
| 11j | 10j | 5 | — | 41 | 21.0 | 203 | 0.83 | 179 | 65 |
| 11k | 10k | 5 | — | 41 | 20.7 | 201 | 0.74 | 140 | 37 |
| 11l | 10l | 5 | — | 41 | 19.0 | 171 | 0.74 | 154 | 27 |
| 11m | 10m | 5 | — | 41 | 21.9 | 211 | 0.77 | 152 | 58 |
| 11n | 10n | 5 | — | 41 | 25.2 | 189 | 0.60 | 131 | 69 |
| 11o | 10n | 5 | 20% | 41 | 25.0 | 316 | 0.64 | 83 | 120 |
| 11p | 10o | 5 | — | 41 | 24.1 | 309 | 1.43 | 221 | 116 |
| 11q | 10p | 5 | — | 41 | 18.6 | 158 | 0.69 | 170 | 50 |
| 11r | 10q | 5 | — | 41 | 17.6 | 168 | 0.77 | 174 | 28 |
| 11s | 10r | 5 | — | 41 | 17.6 | 188 | 0.92 | 184 | 34 |
| 11t | 10s | 10 | — | 41 | 18.8 | 258 | 0.45 | 61 | 70 |
| 11u | 10u | 5 | — | 41 | 19.1 | 272 | 0.79 | 107 | 36 |
| 11v | 10u | 5 | — | 41 | 19.5 | 283 | 0.79 | 103 | 40 |
| 11w | 10v-10y | 5 | — | 41 | 25.3 | 227 | 0.82 | 119 | 38 |

Example 12

Synthesis of Porous Freshmade Hybrid Particles of the Formula $(O_{1.5}SiCH_2CH_2SiO_{1.5})_x/(SiO_2)_{1-x}$, Where x=0.54-0.90

An aqueous mixture of Triton® X-100 (X100, Dow Chemical, Midland, Mich.), Sodium Dodecyl Sulfate (SDS, J. T. Baker, Phillipsburgh, N.J. or Sigma Chemical Co., St. Louis, Mo.), deionized water and ethanol (EtOH, anhydrous, J. T. Baker, Phillipsburgh, N.J.) was heated at 45° C.-65° C. for 0.5 h. In a separate flask, an oil phase solution was prepared by mixing 1a from Example 1 for 0.5 hours with one of the following reagents: toluene (Tol; HPLC grade, J. T. Baker, Phillipsburgh, N.J.) or mesitylene (Mes; Aldrich, Milwaukee, Wis.). Under rapid agitation, the oil phase solution was added into the EtOH/water/X100/SDS mixture and was emulsified in the aqueous phase using a rotor/stator mixer (Model 100L, Charles Ross & Son Co., Hauppauge, N.Y.). Thereafter, one half the addition of 30% ammonium hydroxide (NH$_4$OH; J. T. Baker, Phillipsburgh, N.J.) was added into the emulsion. Suspended in the solution, the gelled product was transferred to a flask and stirred at 45° C.-65° C. for 16 h. The second half of the 30% ammonium hydroxide was added and the reaction was mixed at 45° C.-65° C. for an additional 24 hours. Formed particles in the resulting suspension were isolated on 0.5 μm filtration paper and washed twice with water. The particles were then dispersed in a 1.3 M HCl solution (8.4-9.0 mL/g) and are refluxed for 2 days. The resulting particles were isolated on 0.5 μm filtration paper and were washed consecutively with copious amounts of water and acetone (HPLC grade, J. T. Baker, Phillipsburgh, N.J.). The particles were then dried at 80° C. under vacuum for 16 hours. Specific amounts of starting materials used to prepare these products are listed in Table 12. The specific surface areas (SSA), specific pore volumes (SPV), average pore diameters (APD), and the % C of these materials are listed in Table 12. The products of these reactions are spherical, as determined by SEM.

This set of experiments used varied Base:POS weight ratio (denoted B:POS ratio combined over the two days), Porogen: POS weight ratio (denoted P:POS) and cosolvent:POS weight ratio (denoted C:POS ratio) from 0.7-1.8, 0.2-0.6 and 0.9-2.0, respectively.

(MeOH; HPLC grade, J. T. Baker, Phillipsburgh, N.J.), yielding a suspension with a pH between 12.1-12.7. The resultant suspension was then transferred to a stainless steel autoclave and heated at 150° C. for 41-4-d2 hours. After the autoclave cooled to room temperature the product was isolated on 0.5 μm filtration paper and washed repeatedly using water and methanol (HPLC grade, J. T. Baker, Phillipsburgh, N.J.) and then dried at 80° C. under vacuum for 16 hours. The solvent amount, specific surface areas (SSA), specific pore volumes (SPV), average pore diameters (APD), micropore surface area (MSA) and the % C of these materials are listed in Table 13.

Similar to Example 5 and 11, hydrothermal processing resulted in noticeable reductions in SSA, increases in APD and no significant loss in particle morphology (as determined by SEM), when compared with the precursor materials. The APD for these products is within a range that is comparable with commercially available packing materials for HPLC. The particle morphology and MSA for these materials are also within the criteria for materials that exhibit chromatographically enhanced pore geometries.

Small angle and wide angle XRPD data were collected for samples 13a and 13c. These hydrothermally processed samples do not exhibit any pore structuring, as determined by small angle XRPD. Wide angle XRPD data collected for these samples indicated no detectable amount of molecular ordering or crystallinity. Considering a wide angle XRPD minimum detection level of 0.5%, these samples can therefore be considered to be >99.5% amorphous.

TABLE 13

| Product | Precursor | Solvent Amount (mL/g) | % C | SSA (m$^2$/g) | SPV (cc/g) | APD (Å) | MSA (m$^2$/g) |
|---|---|---|---|---|---|---|---|
| 13a | 12a | 5 | 13.5 | 178 | 1.13 | 229 | 35 |
| 13b | 12b | 5 | 15.8 | 231 | 1.49 | 222 | 45 |
| 13c | 12d | 5 | 16.9 | 173 | 0.99 | 207 | 30 |
| 13d | 12e | 10 | 16.5 | 103 | 0.33 | 91 | 15 |
| 13e | 12f | 15 | 15.9 | 236 | 1.20 | 176 | 26 |
| 13f | 12g | 15 | 15.7 | 339 | 1.07 | 109 | 16 |
| 13g | 12h | 5 | 16.0 | 183 | 1.58 | 279 | 37 |

TABLE 12

| Product | Temp. (° C.) | POS | POS (g) | Porogen (P) | P (g) | H$_2$O (g) | EtOH (C) (g) | X100 (g) | SDS (g) | NH$_4$OH (B) (mL) | B:POS wt ratio | P:POS wt ratio | C:POS wt ratio | % C | SSA (m$^2$/g) | SPV (cm$^3$/g) | APD (Å) |
|---|---|---|---|---|---|---|---|---|---|---|---|---|---|---|---|---|---|
| 12a | 65 | 1v | 138 | Mes | 84.7 | 2166 | 90 | 55.6 | 5.85 | 276 | 1.8 | 0.6 | 0.7 | 14.6 | 701 | 1.20 | 58 |
| 12b | 65 | 1w | 138 | Mes | 84.7 | 2166 | 90 | 55.6 | 5.85 | 276 | 1.8 | 0.6 | 0.7 | 15.5 | 890 | 1.64 | 61 |
| 12c | 65 | 1w | 23 | Mes | 14.1 | 361 | 15 | 9.3 | 0.97 | 46 | 1.8 | 0.6 | 0.7 | 15.1 | 839 | 1.12 | 46 |
| 12d | 65 | 1x | 138 | Mes | 84.7 | 2166 | 90 | 55.6 | 5.85 | 276 | 1.8 | 0.6 | 0.7 | 18.4 | 987 | 1.14 | 40 |
| 12e | 45 | 1w | 58 | Tol | 9.7 | 280 | 52 | 5.6 | 0 | 44 | 0.7 | 0.2 | 0.9 | 15.4 | 1112 | 0.57 | 24.7 |
| 12f | 65 | 1w | 23 | Mes | 14.1 | 361 | 30 | 9.3 | 0.97 | 46 | 1.8 | 0.6 | 1.3 | 15.2 | 891 | 1.39 | 52 |
| 12g | 65 | 1w | 23 | Mes | 14.1 | 361 | 45 | 9.3 | 0.97 | 46 | 1.8 | 0.6 | 2.0 | 15.4 | 891 | 1.12 | 43 |
| 12h | 65 | 1w | 277 | Mes | 169 | 4,331 | 360 | 111 | 11.7 | 552 | 1.8 | 0.6 | 1.3 | 15.4 | 849 | 1.69 | 67 |

Example 13

Hydrothermal Processing of Porous Freshmade Hybrid Particles of the Formula $(O_{1.5}SiCH_2CH_2SiO_{1.5})_x/(SiO_2)_{1-x}$, Where x=0.54-0.90

Porous particles of Example 12 were mixed with a 0.5 M triethylamine (TEA; Aldrich, Milwaukee, Wis.) solution containing one or more of the following; water and methanol

Example 14

Acid Treatment of Porous Hybrid Particles

Porous particles prepared according to Examples 5 were sized to 5.1 μm (product 14a), 5.3 μm (product 14b) and 7.5 μm (product 14c) fractions. The particles were then dispersed in a 1 molar hydrochloric acid solution (Aldrich, Milwaukee, Wis.) for 20 h at 98° C. After the acid treatment was completed, the particles were washed with water to a neutral pH, followed by acetone (HPLC grade, J. T. Baker, Phillipsburgh, N.J.). The particles were then dried at 80° C. under vacuum for 16 h. Specific characterization data for these materials are listed in Table 14.

TABLE 14

| Product | Unsized Precursor | dp$_{50}$ vol % (μm) | 90/10 ratio | % C | SSA (m²/g) | SPV (cc/g) | APD (Å) | MSA (m²/g) |
|---|---|---|---|---|---|---|---|---|
| 14a | 5f | 5.1 | 1.9 | 17.8 | 442 | 1.26 | 99 | 31 |
| 14b | 5h, 5i | 5.3 | 1.6 | 17.9 | 221 | 0.87 | 144 | 34 |
| 14c | 5h, 5i | 7.5 | 1.4 | 17.9 | 207 | 0.71 | 123 | 31 |
| 14d | 11j | 6.2 | 1.5 | 20.7 | 220 | 0.88 | 174 | 61 |
| 14e | 11w | 6.5 | 1.4 | 25.2 | 231 | 0.80 | 128 | 33 |

Example 15

Initial Surface Modification of Porous Hybrid Particles with Chlorosilanes

Selected examples of surface derivatized porous particles from Example 14 were modified with octadecyltrichlorosilane (OTCS, Aldrich, Milwaukee, Wis.) using imidazole (Aldrich, Milwaukee, Wis.) in refluxing toluene (HPLC grade, J. T. Baker, Phillipsburgh, N.J.) for 4 hours. The reaction was then cooled and the product was filtered and washed successively with toluene, 1:1 v/v acetone/water and acetone (all solvents from J. T. Baker). The material was then refluxed in a acetone/aqueous 0.12 M ammonium acetate solution (Sigma Chemical Co., St. Louis, Mo.) for 2 hours. The reaction was then cooled and the product was filtered and washed successively with toluene, 1:1 v/v acetone/water and acetone (all solvents from J. T. Baker). The product was then dried at 80° C. under reduced pressure for 16 hours. Reaction data is listed in Table 15. The surface concentration of $C_{18}$-groups was determined to be 2.6-2.8 μmol/m² by the difference in particle % C before and after the surface modification as measured by elemental analysis.

TABLE 15

| Product | Precursor | Particles (g) | OTCS (g) | Imidazole (g) | Toluene (mL) | % C | $C_{18}$ Coverage (μmol/m²) |
|---|---|---|---|---|---|---|---|
| 15a | 14a | 9.0 | 15.2 | 3.2 | 45 | 31.5 | 2.58 |
| 15b | 14b | 44.5 | 38.2 | 8.0 | 223 | 26.2 | 2.76 |
| 15c | 14c | 34.0 | 27.3 | 5.8 | 170 | 25.4 | 2.62 |

Example 16

Secondary Surface Modification of Porous Hybrid Particles with Chlorosilanes

The surface of $C_{18}$-bonded hybrid materials of Example 15 were further modified with triethylchlorosilane (TECS, Gelest Inc., Morrisville, Pa.) using imidazole (Aldrich, Milwaukee, Wis.) in refluxing toluene for 4 hours. The reaction was then cooled and the product was filtered and washed successively with water, toluene, 1:1 v/v acetone/water and acetone (all solvents from J. T. Baker) and then dried at 80° C. under reduced pressure for 16 hours. The materials were then mixed with hexamethyldisilazane (HMDS, Gelest Inc., Morrisville, Pa.) yielding a slurry (concentration 1.1 g HMDS per 1.0 g particles). The resultant slurry was then enclosed to a stainless steel autoclave and heated at 200° C. for 18 hours. After the autoclave cooled to room temperature the product was isolated on filtration paper and washed successively with water, toluene, 1:1 v/v acetone/water and acetone (all solvents from J. T. Baker) and then dried at 80° C. under reduced pressure for 16 hours. Reaction data are listed in Table 16.

TABLE 16

| Product | Precursor | Particles (g) | TECS (g) | Imidazole (g) | Toluene (mL) | % C |
|---|---|---|---|---|---|---|
| 16a | 15a | 15.5 | 9.8 | 5.5 | 77.5 | 33.6 |
| 16b | 15b | 51.0 | 10.0 | 9.2 | 255 | 27.7 |
| 16c | 15c | 37.0 | 10.0 | 6.3 | 185 | 26.9 |

Example 17

Chromatographic Evaluation of Porous Hybrid Particles

Selected examples of porous particles from Example 14 and 16 were used for the separation of a mixture of the neutral, polar and basic compounds listed in Table 17. The particles were packed into 4.6×150 mm chromatographic columns using a slurry packing technique. The HPLC system consisted of an Alliance 2695 XE separations module, a model 2487 UV detector equipped with a high pressure UV cell, a Empower data management system (software build 1154, all from Waters Corporation, Milford, Mass.) and a NESLAB RTE-111 circulating water bath for column temperature control (NESLAB Instrument, Inc., Portsmouth, N.H.). Mobile phase conditions were: 20 mM $K_2HPO_4/KH_2PO_4$, pH 7.0/methanol (36:65 v/v); flow rate: 1.4 mL/min; temperature: 23.4° C.; detection: 254 nm. Naphthalene was not used in the test for Product 14d.

The separation data are set forth in Table 17. Relative retention is the retention time of the analyte divided by the retention time of acenaphthene. Therefore values less than one, indicate less retention than acenaphthene and values greater than one, indicate more retention than acenaphthene. Relative retention is a well known parameter in the field of HPLC. As can be seen from the data in Table 17, the packing materials based on hybrid porous particles provide ample retention and resolution in the separation of neutral, polar and basic compounds.

TABLE 17

| Sample | Product 16a in Table 16 | Product 16b in Table 16 | Product 16c in Table 16 | Product 14d in Table 14 |
|---|---|---|---|---|
| Retention Factor: | | | | |
| Acenaphthene | 20.69 | 13.31 | 13.84 | 4.43 |
| Relative Retention: | | | | |
| Propranolol/Acenaphthene | 0.141 | 0.139 | 0.137 | 0.090 |
| Butylparaben/Acenaphthene | 0.228 | 0.221 | 0.216 | 0.138 |
| Naphthalene/Acenaphthene | 0.433 | 0.435 | 0.436 | — |

TABLE 17-continued

| Sample | Product 16a in Table 16 | Product 16b in Table 16 | Product 16c in Table 16 | Product 14d in Table 14 |
|---|---|---|---|---|
| Dipropylphthalate/Acenaphthene | 0.412 | 0.395 | 0.392 | 0.514 |
| Amitriptyline/Acenaphthene | 1.341 | 1.300 | 1.310 | 2.672 |

Example 18

Peak Shape Evaluation of Surface Modified Porous Hybrid Particles

Selected examples of surface derivatized hybrid porous particles from Example 16 were evaluated for basic compound USP peak tailing factors using the mobile phase and test conditions of Example 17. The results are shown in Table 18.

Peak tailing factor is a well known parameter in the field of HPLC (a lower value corresponds to reduced tailing). It is evident that the peak tailing factors of the columns containing hybrid porous particles of the invention had equivalent or improved basic compound tailing factors over commercially available $C_{18}$-based materials.

TABLE 18

| | USP Tailing Factors | |
|---|---|---|
| Column | Propranolol | Amitriptyline |
| Product 16a | 0.8 | 1.0 |
| Product 16b | 0.9 | 1.1 |
| Product 16c | 1.0 | 1.1 |

Example 19

Low pH Chromatographic Stability Test

Selected examples of surface derivatized hybrid porous particles from Example 16 as well as commercial columns ($C_{18}$ Type) based on silica, which have similar alkyl silyl groups, were evaluated for stability in acidic mobile phases using the following procedure. Columns were prepared by slurry packing the materials into 2.1×50 mm steel columns and were tested on the following instrument configuration: Waters ACQUITY UPLC™ system was used for solvent delivery, sample injection (1 µL on a 5 µL loop using partial loop injection), UV detection (500 nL flow cell, Absorbance: 254 nm) and column heating at 60° C. Analysis conditions were as follows: 1) the retention time was measured for a test analyte, methyl paraben (100 µg/mL sample); 2) mobile phase conditions were 0.5% aqueous TFA at a flow of 1.4 mL/min and a column temperature of 60° C.; and 3) 20 minute run times for 61 repeated injections under the same isocratic test conditions were used. The percent changes in the retention time are reported for final injections for methyl paraben, with respect to the retention obtained on the third injection. The results are shown in Table 19.

It is evident that the lifetimes of the columns containing hybrid porous particles had improved chemical stability over the commercial columns containing silica-based materials (lower percent loss in original retention for each injection corresponds to improved chemical stability).

TABLE 19

| Column | Loss in original retention time after 20.3 h of exposure to 0.5% TFA |
|---|---|
| Commercial Column A | 16.6% |
| Commercial Column B | 13.7% |
| Commercial Column C | 9.4% |
| Product 16a | 5.0% |
| Product 16b | 2.5% |
| Product 16c | 4.2% |

Example 20

Thermal Treatment of Porous Hybrid Particles Under Argon

The hybrid particles prepared according to Example 5f were separated by particle size to a 9.0 µm fraction (Product 20a). Columns were prepared by dry packing 4.2-4.4 g of material into 19×50 mm steel chromatographic columns. These columns were thermally treated in an air muffled oven under the following conditions: (1) the columns were connected to an argon cylinder and were purged with 100 cm³/min argon for 15 minutes at ambient temperature; (2) the furnace was heated to 100° C. and was held at this temperature for 1 hour, under an argon purge; (3) the furnace was then heated to 250° C. (Product 20b), 300° C. (Product 20c), or 400° C. (Product 20d) at a ramp rate of 0.8-1° C./min; and (4) the reaction was held at the final temperature for 17.5 hours under a constant argon purge, before cooling to ambient temperature. The specific surface areas (SSA), specific pore volumes (SPV), average pore diameters (APD), micropore surface area (MSA), skeletal density ($\delta_{skeletal}$) and the % C of these materials are listed in Table 20.

Thermally treated samples of 20a under an argon atmosphere did not result in any major particle % C or porosity change (SSA, SPV, or APD) over this 250-400° C. temperature range. An increase in skeletal density (3.5%) was observed for product 21d. This increase in skeletal density is concurrent with the observation of the generation of a small amount of silicate species (<2%), as determined by $^{29}$Si CP-MAS NMR spectrum. The silicate species emerges due to the decomposition of the Si—CH$_2$CH$_2$—Si group.

TABLE 20

| Product | Atmosphere | Final Temperature (° C.) | % C | SSA (m²/g) | SPV (cc/g) | APD (Å) | $\delta_{skeletal}$ (g/mL) |
|---|---|---|---|---|---|---|---|
| 20a | — | — | 17.4 | 438 | 1.21 | 93 | 1.672 |
| 20b | argon | 250 | 17.6 | 438 | 1.21 | 93 | 1.682 |
| 20c | argon | 300 | 17.6 | 435 | 1.21 | 95 | 1.689 |
| 20d | argon | 400 | 17.5 | 429 | 1.21 | 94 | 1.731 |
| 21a | — | — | 17.4 | 206 | 0.65 | 112 | 1.669 |
| 21b | air | 300 | 8.5 | 209 | 0.61 | 110 | 1.867 |
| 21c | air | 400 | 4.6 | 202 | 0.56 | 106 | 2.009 |

Example 21

Thermal Treatment of Porous Hybrid Particles in Air

The hybrid particles prepared according to Examples 5h and 5i were blended and then separated by particle size to a 3.0 µm fraction (Product 21a). 4.4 g samples of 21a were weighed out into ceramic boats and were thermally treated in an air muffled oven under the following conditions: (1) The furnace was heated to 100° C. and was held at this temperature for 1 hour; (2) The furnace was then heated to 300° C. (Product 21b) or 400° C. (Product 21c) at a ramp rate of 0.8-1° C./min; and (3) The reaction was held at the final temperature for 17.5 hours in air, before cooling to ambient temperature. The results of this experiment are shown in Table 20.

Thermally treated samples of 21a in air resulted in a drastic reduction in % C and SPV (14% decrease for product 21c), an increase in skeletal density (20% increase for product 21c) and SSA and APD diameter remained similar. Decomposition of the Si—CH$_2$CH$_2$—Si group and formation of silicate species (>30%) was observed by multinuclear ($^{13}$C, $^{29}$Si) CP-MAS NMR spectroscopy.

Examples 22-30

Examples 22 through 30 demonstrate representative synthetic transformations of selected hybrid particles with an array of functional groups. The following table provides a brief summary of the synthetic transformations, including functional group and method of transformation (i.e., reaction class):

| Example | Hybrid Group Before Si—R | After Si—R' | Reaction Class |
|---|---|---|---|
| 22 | —(CH$_2$)$_3$SH | —(CH$_2$)$_3$SO$_3$H | Oxidation |
| 23 | —(CH$_2$)$_3$SH | —(CH$_2$)$_3$S(CH$_2$)$_7$CH$_3$ | Radical Addition |
| 24 | —(CH$_2$)$_2$C$_6$H$_5$ | —(CH$_2$)$_2$C$_6$H$_4$CH$_2$Cl | Chloromethylation |
| 25 | —(CH$_2$)$_2$C$_6$H$_4$CH$_2$Cl | —(CH$_2$)$_2$C$_6$H$_4$CH$_2$C—NC$_5$H$_{10}$ | Nucleophillic Displacement |
| 26 | —(CH$_2$)$_2$C$_6$H$_4$CH$_2$Cl | —(CH$_2$)$_2$C$_6$H$_4$CO$_2$H | Oxidation |
| 27 | —(CH$_2$)$_2$C$_6$H$_5$ | —(CH$_2$)$_2$C$_6$H$_4$SO$_3$H | Sulfonation |
| 28 | —CH═CH$_2$ | —CH(Br)CH$_2$Br | Bromination |
| 29 | —(CH$_2$)$_2$Cl | 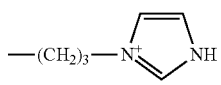 | Nucleophillic Displacement |
| 30 | —CH$_2$CH$_2$CH(CH$_3$)CN | —CH$_2$CH$_2$CH(CH$_3$)CO$_2$H | Oxidation |

It should be understood that the functional groups listed are solely used a representative examples and are not intended to limit the scope of the invention. In this respect, the present invention is intended to include derivatization by any functional group or by chemical transformation that may be chromatographically useful, e.g., the functional groups described in the table above, which may be introduced by any useful type of synthetic transformation, see, e.g., March, J. *Advanced Organic Chemistry*, 3$^{rd}$ Edition, Wiley, New York. In particular embodiments, the synthetic transformation is oxidation, nucleophillic displacement, sulfonation, chloromethylation, radical addition, and/or bromination reactions. Furthermore, the functional groups, e.g., ion-exchange groups, may be introduced at levels <2 mequiv/g, e.g., <1 mequiv/g, e.g., <0.1 mequiv/g; however, in certain embodiments, ≥0.03 mequiv/g.

Percent conversion of such reactions may range from 100% to >0%, noting, without wishing to be bound by theory, that lower conversion percentages may be the result of non-accessible hybrid groups. However, the instant application is intended to cover any desired conversion percentage by purposeful selection thereof.

Example 22

Reaction of Mercaptopropyl Hybrid Particles with Nitric Acid

Porous hydrothermally processed mercaptopropyl hybrid particles 11f (5.9 g) were dispersed in deionized water (150 mL), before drop wise addition of nitric acid (60 mL, 69-70%, J. T. Baker, Phillipsburgh, N.J.). The mixture was then stirred and heated at 60° C. for 10 hours, and then stirred at ambient temperature for 2.5 days. The oxidized product was isolated on 0.5 µm Tyvek and washed with water until the pH was greater than 5. The product was then washed with methanol (J. T. Baker, Phillipsburgh, N.J.), before drying at 80° C. under vacuum overnight. The product of this reaction, 22a, contained 18.3% C, 223 m$^2$/g SSA, 0.82 cm$^3$/g SPV, and 140 Å APD. The sulfonic acid loading was determined to be 0.121 mequiv/g (0.543 µequiv/m$^2$) by titration. As a control, the ion exchange capacity for unmodified hybrid particle 11f was 0.039 mequiv/g.

Example 23

Reaction of Mercaptopropyl Hybrid Particles with 1-octene

Porous hydrothermally processed mercaptopropyl hybrid particles 11f (1 g) were dispersed in toluene (50 mL, J. T. Baker, Phillipsburgh, N.J.), and water was removed by Dean-Stark trap at 110° C. for 2 hours under a nitrogen atmosphere. The mixture was cooled below 40° C., before addition of 1-octene (1.795 g, Aldrich, Milwaukee, Wis.) and 2,2'-azobisisobutyronitrile (0.05 g, AIBN; 98%, Aldrich, Milwaukee, Wis.). The reaction was then heated with stirring under a nitrogen atmosphere to 85° C. for 2 hours. The reaction was further heated at 110° C. overnight. The product was isolated on 0.5 µm Tyvek and washed with excess toluene (J. T. Baker, Phillipsburgh, N.J.), acetone (J. T. Baker, Phillipsburgh, N.J.), water, and methanol (J. T. Baker, Phillipsburgh, N.J.). The product, 23a, was then dried at 80° C. under vacuum overnight. Product 23a contained 19.3% C, 214 m$^2$/g SSA, 0.81 cm$^3$/g SPV, and 140 Å APD. The surface concentration of C$_8$-modified groups (e.g., CH$_3$(CH$_2$)$_7$S(CH$_2$)$_3$—) was determined to be 0.42 µmmol/m$^2$ by the difference in particle % C before and after this reaction by elemental analysis.

Example 24

Chloromethylation of Phenylethyl Hybrid Particles

Porous hydrothermally processed phenylethyl containing hybrid particles 11m (20 g) were dispersed in paraformaldehyde (11.6 g hybrid, Aldrich, Milwaukee, Wis.) and concentrated HCl (252 mL, J. T. Baker, Phillipsburgh, N.J.). The condenser of the flask was equipped with a water trap to collect any HCl fumes. The mixture was then stirred and heated to 60° C. for 16 hours, before cooling to room temperature. The mixture containing the chloromethylated product was slowly transferred and isolated on 0.5 μm Tyvek, and washed with water until the pH equaled the pH of water. The product was then washed with methanol (J. T. Baker, Phillipsburgh, N.J.), before drying at 80° C. under vacuum overnight. The product of this reaction, 24a, contained 22.0% C, 200 m$^2$/g SSA, 0.77 cm$^3$/g SPV, and 150 Å APD. Percent chlorine was determined to be 0.74% Cl by flask combustion followed by ion chromatographic analysis. As a control, no chlorine content was observed in the unmodified hybrid particle 11m.

Example 25

Reaction of Chloromethylphenylethyl Hybrid Particles with Piperidine

Product 24a (5 g) was dispersed with piperidine (50 mL, Aldrich, Milwaukee; WI). The mixture was then stirred and heated to reflux for 24 hours. The product was isolated on 0.5 μm Tyvek and washed with excess water until the pH was less than 8. The product was then washed with methanol (J. T. Baker, Phillipsburgh, N.J.), before drying at 80° C. under vacuum overnight. The product of this reaction, 25a, contained 21.8% C, 0.26% N, 190 m$^2$/g SSA, 0.75 cm$^3$/g SPV, and 151 Å APD. The amine loading was determined to be 0.078 mequiv/g (0.41 μequiv/m$^2$) by titration.

Example 26

Reaction of Chloromethylphenylethyl Hybrid Particles with Hydrogen Peroxide

Product 24a (5 g) was dispersed with 30% hydrogen peroxide (75 mL, Aldrich, Milwaukee, Wis.). The mixture was then stirred and heated to 85° C. for 16 hours. The product was isolated on 0.5 μm Tyvek and washed with excess water and methanol (J. T. Baker, Phillipsburgh, N.J.), before drying at 80° C. under vacuum overnight. The product of this reaction, 26a, contained 212 m$^2$/g SSA, 0.77 cm$^3$/g SPV, and 149 Å APD. The carboxylic acid loading was determined to be 0.099 mequiv/g (0.47 μequiv/m$^2$) by titration.

Example 27

Sulfonation of Phenylethyl Hybrid Particles

Porous hydrothermally processed phenylethyl containing hybrid particles 11m (5 g) were dispersed in concentrated sulfuric acid (50 mL, J. T. Baker, Phillipsburgh, N.J.). The mixture was then stirred and heated at 115° C. for 24 hours. The mixture was slowly added to a container of 250 mL water. Upon cooling, the sulfonated product was isolated on 0.5 μm Tyvek and washed with water until the pH was greater than 5. The product was then washed with methanol (J. T. Baker, Phillipsburgh, N.J.), before drying at 80° C. under vacuum overnight. The product of this reaction, 27a, contained 17.8% C, 186 m$^2$/g SSA, 0.70 cm$^3$/g SPV, and 147 Å APD. The sulfonic acid loading was determined to be 0.97 mequiv/g (5.20 μequiv/m$^2$) by titration.

Example 28

Bromination of Vinyl Hybrid Particles

Porous hydrothermally processed vinyl containing hybrid particles 11h (1 g) were dispersed in dichloromethane (100 mL, J. T. Baker, Phillipsburgh, N.J.). The mixture was stirred and sparged with argon before slow dropwise addition of bromine (Br$_2$, Aldrich, Milwaukee, Wis.). Bromine was added until a constant red color was present in the reaction mixture. The mixture was then stirred under ambient temperature for 7 days. The product was isolated on 0.5 μm Tyvek and washed with excess methanol (J. T. Baker, Phillipsburgh, N.J.), before drying at 80° C. under vacuum overnight. Percent bromine was determined to be 0.81% Br by flask combustion followed by ion chromatographic analysis.

Example 29

Reaction of Chloropropyl Hybrid Particles with Imidazole

Product 11l (1 g) was dispersed in o-xylene (20 mL, Aldrich, Milwaukee, Wis.) and water was removed by Dean-Stark trap at reflux for 2 hours under a argon atmosphere. The mixture was cooled below 40° C., before addition of imidazole (0.058 g, Aldrich, Milwaukee, Wis.). The mixture was then stirred and heated to 125° C. for 48 hours. The product was isolated on 0.5 μm Tyvek and washed with excess water and methanol (J. T. Baker, Phillipsburgh, N.J.), before drying at 80° C. under vacuum overnight. The product of this reaction, 29a, contained 19.2% C, 0.19% N, 170 m$^2$/g SSA, 0.75 cm$^3$/g SPV, and 155 Å APD. The imidazolium content was determined to be 0.41 μmol/m$^2$ by the difference in particle % C before and after this reaction by elemental analysis, and was determined to be 0.40 μmol/m$^2$ by the difference in particle % N before and after this reaction by elemental analysis.

Example 30

Reaction of 3-cyanobutyl Hybrid Particles with Sulfuric Acid

Product 11u and 11v from Example 11 were combined and were sized to 4.7 μm. These 3-cyanobutyl hybrid particles (10 g, 19.1% C, 277 m$^2$/g SSA, 0.76 cm$^3$/g SPV, 103 Å APD) were dispersed in deionized water (100 mL) and concentrated sulfuric acid (5.5 mL, J. T. Baker, Phillipsburgh, N.J.). The mixture was then stirred and heated to 80° C. for 20 hours. The product was isolated on 0.5 μm Tyvek and washed with water until the pH was greater than 5. The product was then washed with acetone (J. T. Baker, Phillipsburgh, N.J.), before drying at 80° C. under vacuum overnight. The product of this reaction, 30a, contained 18.9% C, 283 m$^2$/g SSA, 0.78 cm$^3$/g SPV, and 103 Å APD. The carboxylic acid loading was determined to be 0.29 mequiv/g (1.02 μequiv/m$^2$) by titration.

Example 31

Synthesis of Polyorganosiloxanes 1,2-bis(triethoxysilyl)ethane (BTEE, Gelest Inc., Morrisville Pa.) were mixed with ethanol (144.4 g, anhydrous, J. T.

Baker, Phillipsburgh, N.J.) and 0.1 N hydrochloric acid (Aldrich, Milwaukee, Wis.) in a flask. After stirring 1 hour at ambient temperature a solution of zirconium n-propoxide (ZNP, 70% in propanol, Gelest Inc., Morrisville, Pa.) in ethanol (20-32 g) was added dropwise over 10 minutes. The resulting solution was agitated at ambient temperature for 1 hour and refluxed for 16 hours in an atmosphere of argon or nitrogen. Alcohol was removed from the flask by distillation at atmospheric pressure. Residual alcohol and volatile species were removed by heating at 80° C. for 1 hour in a sweeping stream of argon or nitrogen. The resulting polyorganoalkoxy siloxanes were clear viscous liquids. The chemical formulas are listed in Table 21 for specific amounts for the starting materials used to prepare these products.

TABLE 21

| Product | BTEE (g) | ZNP (g) | 0.1N HCl (g) | % C | Viscosity (cP) | Mole Ratio ZNP:BTEE |
|---|---|---|---|---|---|---|
| 31a | 391.1 | 36.1 | 31.9 | 31.5 | 114 | 1:14.7 |
| 31b | 419.7 | 9.69 | 32.6 | 37.2 | 119 | 1:57.5 |

Example 32

Synthesis of Porous Hybrid Freshmade Particles Containing Zirconia

An aqueous mixture of Triton® X-100 (X100, Dow Chemical, Midland, Mich.), deionized water and ethanol (EtOH, anhydrous, J. T. Baker, Phillipsburgh, N.J.) was heated at 55° C. for 0.5 h. In a separate flask, an oil phase solution was prepared by mixing a POS from Example 30 for 10 minutes with toluene (Tol; J. T. Baker, Phillipsburgh, N.J.). Under rapid agitation, the oil phase solution was added into the EtOH/water/X100 mixture and was emulsified in the aqueous phase using a rotor/stator mixer (Model 100L, Charles Ross & Son Co., Hauppauge, N.Y.). Thereafter, 30% ammonium hydroxide ($NH_4OH$; J. T. Baker, Phillipsburgh, N.J.) was added into the emulsion. Suspended in the solution, the gelled product was transferred to a flask and stirred at 55° C. for 16 h. Formed particles in the resulting suspension were isolated by centrifugation (Thermo EXD, 4×1 L bottle centrifuge, Milford, Mass.) and were washed by twice resuspending the particles in water before centrifugation. The particles were then dispersed in a 1.3 M HCl solution (8.4 mL/g) and were refluxed for 2 days. The resulting particles were isolated on 0.5 μm filtration paper and washed consecutively with copious amounts of water and acetone (HPLC grade, J. T. Baker, Phillipsburgh, N.J.). The particles were then dried at 80° C. under vacuum for 16 hours. Specific amounts of starting materials used to prepare these products are listed in Table 22. The specific surface areas (SSA), specific pore volumes (SPV), average pore diameters (APD) and the % C of these materials are listed in Table 22. The theoretical Zr content for Product 32a was 4.4% Zr and for 32b was 1.2% Zr. SEM analysis of 32a indicated the formation of spheroidal particles that had a high concentration of internal voids (c.a. 1 μm in diameter). SEM analysis of 32b showed the formation of highly spherical, free flowing particles.

TABLE 22

| Product | POS | POS (g) | Tol (g) | $H_2O$ (mL) | EtOH (g) | X100 (g) | $NH_4OH$ (mL) | % C | % Zr | SSA ($m^2/g$) | SPV ($cm^3/g$) | APD (Å) |
|---|---|---|---|---|---|---|---|---|---|---|---|---|
| 32a | 31a | 75.5 | 12.1 | 350 | 65 | 7 | 55 | 18.7 | 4.6 | 963 | 0.68 | 29 |
| 32b | 31b | 151 | 24.3 | 700 | 130 | 14 | 110 | 19.2 | 1.1 | 770 | 0.41 | 26 |

Example 33

Chromatographic Evaluation of Porous Hybrid Particles

Porous particles from Example 14e was used for the separation of a mixture of neutral, polar and basic compounds listed in Table 10. The 2.1×100 mm chromatographic columns were packed using a slurry packing technique. The chromatographic system consisted of an ACQUITY HPLC® System and an ACQUITY HPLC® Tunable UV detector. Empower 2 Chromatography Data Software (Build 2154) was used for data collection and analysis. Mobile phase conditions were: 20 mM $K_2HPO_4/KH_2PO_4$, pH 7.00±0.02/methanol (36/65 v/v); flow rate: 0.25 mL/min; temperature: 23.4° C.; detection: 254 nm.

It can be seen that the packing materials based on hybrid porous particles containing nanoparticles provide sufficient retention and resolution in the separation of neutral, polar, and basic compounds. Relative retention is the retention time of the analyte divided by the retention time of acenaphthene. Therefore values less than one, indicate less retention than acenaphthene, and values greater than one, indicate more retention than acenaphthene. (Relative retention is a well known parameter in the field of HPLC.)

TABLE 23

| Sample | Product 14e in Table 14 |
|---|---|
| Retention Factor: | |
| Acenaphthene | 5.47 |
| Relative Retention: | |
| Propranolol/Acenaphthene | 0.143 |
| Butylparaben/Acenaphthene | 0.113 |
| Naphthalene/Acenaphthene | 0.442 |
| Dipropylphthalate/Acenaphthene | 0.290 |
| Amitriptyline/Acenaphthene | 3.626 |

Example 34

Hydrolytic Stability Testing of Porous Hybrid Particles

The hydrolytic stability of the columns packed with porous hybrid particles from Examples 14 and 16, as well as some comparison $C_{18}$ columns were evaluated using the following procedure. Columns (3×30 mm) were equilibrated in 1:1 acetonitrile/water (210 minutes) before initial chromatographic performance was tested using uracil and decanophenone (1:1 acetonitrile/water; 0.43 mL/min). The columns were then heated at 50° C. and were challenged with a solution of 0.02 N NaOH in water (pH 12.3, 0.85 mL/min for 60 min) before flushing with 10:90 methanol/water followed by methanol. Chromatographic performance was reassessed at regular intervals by equilibrating the columns with acetonitrile (50 minutes), followed by testing using uracil and decanophenone (1:1 acetonitrile/water, 0.43 mL/min). For 14e a test solvent of 40:60 acetonitrile/water was used. This process was repeated and the performance of the column was monitored until column failure, or up to 80 hours of exposure to 0.02 N NaOH (whichever came first). Column failure is defined as the time when the plate number drops to 50% of the initial value or when the test system shut down due to high column pressure. The results of these tests, including final reported loss in original column efficiency are shown in Table 24. Comparison Column A (repeated on three separate columns) was 5 μm BEH porous hybrid particles of the formula $(O_{1.5}SiCH_2CH_2SiO_{1.5})(SiO_2)_4$ (prepared following the method described in U.S. Pat. No. 6,686,035), that was surface modified with $C_{18}$ groups. Comparison Column B was a commercially available 3 μm silica-core particle that was surface modified with an organofunctional silane followed by $C_{18}$ surface modification.

Good column durability was observed for columns packed with products 16a, 16b, 16c, and 14e, which did not fail under these test conditions. When the test was stopped at 60-80 hours of exposure to 0.02 N NaOH, these columns had less than 15% loss in original column efficiency. Comparison Column A (which is based on a hybrid formula that is substantially enriched in silica content) failed under these test conditions between 52-64 hours exposure to 0.02 N NaOH (having 50.1-53.6% loss in original column efficiency). Comparison Column B (which is based on a silica base particle) failed under these test conditions at 4.7 hours exposure to 0.02 N NaOH due to high column pressure. It is well known in the field of HPLC that column failure resulting in high column pressure when silica based columns are exposed to alkaline solutions can result from the dissolution of the silica particle resulting in the collapse of the column bed. For Comparison Column B this packed-bed collapse was confirmed by column dissection and the measurement of a 10 mm void at the inlet of the column.

It can be concluded that the durability of the porous hybrid packing materials from Example 14 and 16 are greatly improved over the both Comparison Column A and B.

TABLE 24

| Column | Exposure Time to 0.02N NaOH (h) | Loss in original Column efficiency |
| --- | --- | --- |
| Comparison $C_{18}$ Column A (Column 1) | 64 | 53.6% |
| Comparison $C_{18}$ Column A (Column 2) | 60 | 50.1% |
| Comparison $C_{18}$ Column A (Column 3) | 52 | 53.1% |
| Comparison $C_{18}$ Column B | 4.7 | high pressure |
| Product 16a | 67 | 1.6% |
| Product 16b | 65 | 4.8% |
| Product 16c (Column 1) | 60 | 1.1% |
| Product 16c (Column 2) | 80 | 1.9% |
| Product 14e | 80 | 14% |

A second set of experiments were performed to test the hydrolytic stability of hybrid particles from Examples 14, as well as 3.5 μm BEH porous hybrid particles of the formula $(O_{1.5}SiCH_2CH_2SiO_{1.5})(SiO_2)_4$ (prepared following the method described in U.S. Pat. No. 6,686,035) that do not have surface modification. A 8.9 μm sized prototype was used for 14a. Using a similar test procedure, columns (3×30 mm) were equilibrated in 1:1 acetonitrile/water (210 minutes) before initial chromatographic performance was tested using uracil (1:1 acetonitrile/water; 0.43 mL/min). The columns were then heated at 50° C. and were challenged with a solution of 0.01 N NaOH in water (0.85 mL/min for 60 min) before flushing with 10:90 methanol/water followed by methanol. Chromatographic performance was reassessed at regular intervals by equilibrating the columns with acetonitrile (50 minutes), followed by testing using uracil (1:1 acetonitrile/water, 0.43 mL/min). This process was repeated and the performance of the column was monitored until column failure, or up to 80 hours of exposure to 0.01 N NaOH (whichever came first). The results of these tests, including final reported loss in original column efficiency are shown in Table 25. Good column durability was observed for columns packed with products 14a, 14b, and 14e, which did not fail under these test conditions. When the test was stopped at 80 hours exposure to 0.01 N NaOH, these columns had less than 30% loss in original column efficiency. Comparison Column A (which is based on a hybrid formula that is substantially enriched in silica content) twice went high pressure under these test conditions at 18 hours exposure to 0.01 N NaOH, having a 10-15 mm void formed at the inlet of the column.

It can be concluded that the durability of the porous hybrid packing materials from Example 14 are greatly improved over Comparison Column A.

TABLE 25

| Column | Exposure Time to 0.01N NaOH (h) | Loss in original Column efficiency |
| --- | --- | --- |
| Comparison Column (Column 1) | 18 | high pressure |
| Comparison Column (Column 2) | 18 | high pressure |
| Product 14a | 80 | 11% |
| Product 14b | 80 | 1.6% |
| Product 14e | 80 | 28% |

Incorporation by Reference

The entire contents of all patents, published patent applications and other references cited herein are hereby expressly incorporated herein in their entireties by reference.

Equivalents

Those skilled in the art will recognize, or be able to ascertain using no more than routine experimentation, numerous equivalents to the specific procedures described herein. Such equivalents are considered to be within the scope of this invention and are covered by the following claims.

What is claimed is:

1. A porous inorganic/organic hybrid particle, wherein the inorganic portion comprises $SiO_2$ in an amount ranging from about 25 molar % to not more than about 50 molar %, wherein the pores of the particle are substantially disordered and wherein the particle has a chromatographically enhancing pore geometry (CEPG), and wherein the porous inorganic/organic hybrid particle has formula I:

$$(SiO_2)_d/[R^2((R)_p(R^1)_qSiO_t)_m]; \qquad (I)$$

wherein,

R and $R^1$ are each independently $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; wherein each $R^2$ is attached to two or more silicon atoms;

p and q are each independently 0.0 to 3.0;

t is 0.5, 1.0, or 1.5;

d is 0 to about 0.9;

m is an integer from 1-20; wherein R, $R^1$ and $R^2$ are optionally substituted;

provided that:

m=2-20 and $$t = \frac{(3-(p+q))}{2},$$

when p+q≤2.

2. A porous inorganic/organic hybrid particle, wherein the inorganic portion comprises $SiO_2$ in an amount ranging from about 0 molar % to not more than about 25 molar %, wherein the pores of the particle are substantially disordered, and wherein the porous inorganic/organic hybrid particle has formula I:

$$(SiO_2)_d/[R^2((R)_p(R^1)_q SiO_t)_m]; \qquad (I)$$

wherein,

R and $R^1$ are each independently $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; wherein each $R^2$ is attached to two or more silicon atoms;

p and q are each independently 0.0 to 3.0;

t is 0.5, 1.0, or 1.5;

d is 0 to about 0.9;

m is an integer from 1-20; wherein R, $R^1$ and $R^2$ are optionally substituted;

provided that:

m=2-20 and $$t = \frac{(3-(p+q))}{2},$$

when p+q≤2.

3. The porous inorganic/organic hybrid particle of claim 2, wherein the particle has a chromatographically enhancing pore geometry (CEPG).

4. The porous inorganic/organic hybrid particle of claim 2, wherein the particles are spherical.

5. The porous inorganic/organic hybrid particle of claim 4, wherein the spherical particle has a non-crystalline or amorphous molecular ordering.

6. The porous inorganic/organic hybrid particle of claim 4, wherein the spherical particle has a non-periodic pore structure.

7. The porous inorganic/organic hybrid particle of claim 2, wherein said particle has micropore volumes of about 0.2 to 1.5 cm³/g.

8. The porous inorganic/organic hybrid particle of claim 7, wherein said particle has micropore volumes of about 0.6 to 1.3 cm³/g.

9. The porous inorganic/organic hybrid particle of claim 2, wherein said particle has a micropore surface area of less than about 110 m²/g, less than about 105 m²/g, less than about 80 m²/g or less than about 50 m²/g.

10. The porous inorganic/organic hybrid particle of claim 2, wherein said particle has an average pore diameter of about 20 to 1000 Å, about 30 to 300Å, about 60 to 200 Å or about 80 to 140 Å.

11. The porous inorganic/organic hybrid particle of claim 2, wherein said particle has an average size of about 0.1 μm to about 300 μm or about 0.1 μm to about 30 μm.

12. The porous inorganic/organic hybrid particle of claim 2, wherein said particle is hydrolytically stable at a pH of about 1 to about 14, a pH of about 10 to about 14 or a pH of about 1 to about 5.

13. The porous inorganic/organic hybrid particle of claim 2, wherein the organic content is from about 10 to about 40% carbon, about 25 to about 40% carbon, about 15 to about 35% carbon or about 25 to about 35% carbon.

14. The porous inorganic/organic hybrid particle of claim 2, wherein R is $C_1$-$C_{18}$ alkoxy, or $C_1$-$C_{18}$ alkyl.

15. The porous inorganic/organic hybrid particle of claim 2, wherein $R^1$ is $C_1$-$C_{18}$ alkoxy, or $C_1$-$C_{18}$ alkyl.

16. The porous inorganic/organic hybrid particle of claim 2, wherein $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl.

17. The porous inorganic/organic hybrid particle of claim 2, wherein p is 0, q is 0, t is 1.5, m is 2, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; and wherein each $R^2$ is attached to two or more silicon atoms.

18. The porous inorganic/organic hybrid particle of claim 17, wherein d is 0, 0.11, 0.33 or 0.83.

19. The porous inorganic/organic hybrid particle of claim 2, wherein d is 0, q is 0, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; and wherein each $R^2$ is attached to two or more silicon atoms.

20. The porous inorganic/organic hybrid particle of claim 19, wherein p is 0, 1, or 2.

21. The porous inorganic/organic hybrid particle of claim 19, wherein t is 1.0 or 1.5.

22. The porous inorganic/organic hybrid particle of claim 19, wherein m is 1 or 2.

23. The porous inorganic/organic hybrid particle of claim 2, wherein the particle is formed by hydrolytic condensation of one or more monomers selected from the group consisting of:

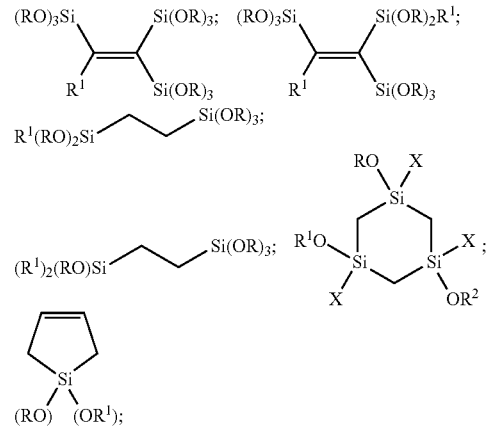

-continued

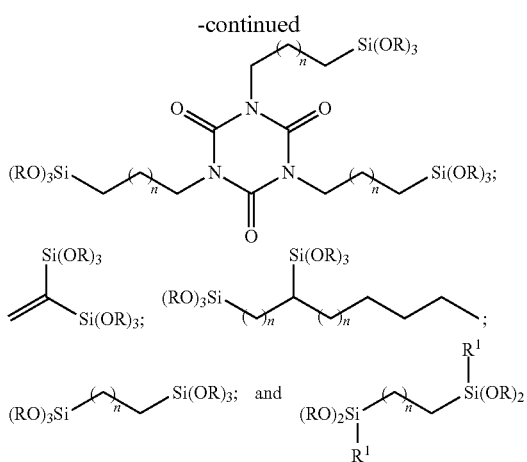

wherein R, $R^1$ and $R^2$ are as defined in claim 4;
X is $C_1$-$C_{18}$ alkoxy or $C_1$-$C_{18}$ alkyl; and
n is 1-8.

24. The porous inorganic/organic hybrid particle of claim 23, wherein the monomer is 1,2-bis(triethoxysilyl)ethane:

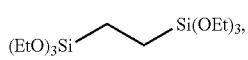

1,2-bis(methyldiethoxy silyl)ethane:

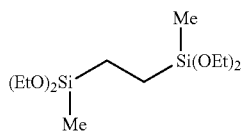

or 1,8- bis(triethoxysilyl)octane:

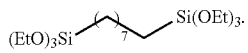

25. The porous inorganic/organic hybrid particle of claim 2, wherein said particles have been surface modified with a surface modifier having the formula $Z_a(R')bSi$—R", where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R" is a functionalizing group or have been surface modified by coating with a polymer.

26. The porous inorganic/organic hybrid particle of claim 25 wherein R' is selected from the group consisting of methyl, ethyl, propyl, isopropyl, butyl, t-butyl, sec-butyl, pentyl, isopentyl, hexyl and cyclohexyl and wherein the functionalizing group R" is selected from the group consisting of alkyl, alkenyl, alkynyl, aryl, cyano, amino, diol, nitro, ester, a cation or anion exchange group, an alkyl or aryl group containing an embedded polar functionality and a chiral moiety.

27. The porous inorganic/organic hybrid particle of claim 26, wherein said functionalizing group R" is a $C_1$- $C_{30}$ alkyl group.

28. The porous inorganic/organic hybrid particle of claim 27, wherein said functionalizing group R" comprises a chiral moiety or said functionalizing group R" is a $C_1$-$C_{20}$ alkyl group.

29. The porous inorganic/organic hybrid particle of claim 25, wherein said surface modifier is selected from the group consisting of octyltrichlorosilane, octadecyltrichlorosilane, octyldimethylchlorosilane and octadecyldimethylchlorosilane.

30. The porous inorganic/organic hybrid particle of claim 29, wherein said surface modifier is selected from the group consisting of octyltrichlorosilane and octadecyltrichlorosilane.

31. The porous inorganic/organic hybrid particle of claim 25, wherein said particles have been surface modified by silanol group modification, by a combination of organic group and silanol group modification, by a combination of organic group modification and coating with a polymer, by a combination of silanol group modification and coating with a polymer, via formation of an organic covalent bond between the particle's organic group and the modifying reagent or by a combination of organic group modification, silanol group modification and coating with a polymer.

32. The porous inorganic/organic hybrid particle of claim 31, wherein said organic group comprises a chiral moiety.

33. The porous inorganic/organic hybrid particle of claim 2, wherein said particles have been surface modified by organic group modification.

34. The porous inorganic/organic hybrid particle of claim 33, wherein said particles have been surface modified by a combination of organic group and silanol group modification.

35. A porous inorganic/organic hybrid material, comprising the porous inorganic/organic hybrid particle of claim 2.

36. The porous inorganic/organic hybrid material of claim 35, wherein said material is a monolith.

37. A method for producing a porous inorganic/organic hybrid particle of claim 2, comprising the steps of:
a) hydrolytically condensing one or more monomers selected from the group consisting of organoalkoxysilanes and tetraalkoxysilanes, with one or more monomers selected from the group consisting of organoalkoxysilanes, tetraalkoxysilanes, metal oxide precursors and ceramic precursors, to produce a polyorganoalkoxysiloxane;
b) further condensing the polyorganoalkoxysiloxane to form a spherical porous particle; and
c) subjecting the resulting particle to hydrothermal treatment;
to thereby produce a porous inorganic/organic hybrid particle of claim 2.

38. A method for producing a porous inorganic/organic hybrid particle of claim 2, comprising the steps of:
a) hydrolytically condensing one or more monomers selected from the group consisting of organoalkoxysilanes and tetraalkoxysilanes, to produce a polyorganoalkoxysiloxane;
b) further condensing the polyorganoalkoxysiloxane to form a spherical porous particle; and
c) subjecting the resulting particle to hydrothermal treatment;
to thereby produce a porous inorganic/organic hybrid particle of claim 2.

39. A separations device having a stationary phase comprising porous inorganic/organic hybrid particles of claim 2.

40. The separations device of claim 39, wherein said device is selected from the group consisting of chromatographic columns, thin layer plates, filtration membranes, sample cleanup devices and microtiter plates.

41. A chromatographic column having improved lifetime, comprising a) a column having a cylindrical interior for accepting a packing material and
b) a packed chromatographic bed comprising porous inorganic/organic hybrid particles of claim 2.

42. A kit comprising the porous inorganic/organic hybrid particle of claim 2 and instructions for use.

* * * * *